United States Patent
Tan et al.

(10) Patent No.: US 10,327,159 B2
(45) Date of Patent: Jun. 18, 2019

(54) AUTONOMOUS, CLOSED-LOOP AND ADAPTIVE SIMULATED ANNEALING BASED MACHINE LEARNING APPROACH FOR INTELLIGENT ANALYTICS-ASSISTED SELF-ORGANIZING-NETWORKS (SONS)

(71) Applicant: Futurewei Technologies, Inc., Plano, TX (US)

(72) Inventors: Yongxi Tan, Hillsborough, NJ (US); Jin Yang, Bridgewater, NJ (US); Nandu Gopalakrishnan, Chatham, NJ (US); Yan Xin, Princeton, NJ (US); James Mathew, Bellemead, NJ (US); Kamalaharan Dushyanthan, Metuchen, NJ (US); Iyad Alfalujah, Bedminster, NJ (US); Yanjie Fu, Harrison, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 583 days.

(21) Appl. No.: 14/988,359

(22) Filed: Jan. 5, 2016

(65) Prior Publication Data
US 2016/0162783 A1 Jun. 9, 2016

Related U.S. Application Data

(63) Continuation-in-part of application No. 14/971,870, filed on Dec. 16, 2015, now Pat. No. 9,578,530, (Continued)

(51) Int. Cl.
*G06N 20/00* (2019.01)
*H04W 24/02* (2009.01)

(52) U.S. Cl.
CPC ............ *H04W 24/02* (2013.01); *G06N 20/00* (2019.01)

(58) Field of Classification Search
CPC ............................. H04W 16/22; H04W 24/06
(Continued)

(56) References Cited

U.S. PATENT DOCUMENTS

| | | |
|---|---|---|
| 5,216,591 A | 6/1993 | Nemirovsky et al. |
| 6,400,335 B1 | 6/2002 | Weaver et al. |

(Continued)

FOREIGN PATENT DOCUMENTS

| | | |
|---|---|---|
| CN | 101557654 A | 10/2009 |
| CN | 102202330 A | 9/2011 |

(Continued)

OTHER PUBLICATIONS

Arieso, "The Critical Importance of Subscriber-centric Location Data for SON Use Cases," Version 1.0, Dec. 27, 2012, 13 pages.
(Continued)

*Primary Examiner* — Simon Nguyen
(74) *Attorney, Agent, or Firm* — Slater Matsil, LLP

(57) ABSTRACT

Convergence times associated with simulated annealing based (SA-based) optimization in wireless networks can be reduced by introducing an additional local or cell-level evaluation step into the evaluation of global solutions. In particular, new local solutions may be evaluated based on local performance criteria when the new solutions are in a global solution deemed to have satisfied a global performance criteria. New local solutions that satisfy their corresponding local performance criteria remain in the new global solution. New local solutions that do not satisfy their corresponding local performance criteria are replaced with a corresponding current local solution from a current global solution, thereby modifying the new global solution. The resulting modified global solution includes both new local solutions and current local solutions prior to being accepted as the current global solution for the next iteration.

20 Claims, 34 Drawing Sheets

Related U.S. Application Data which is a continuation-in-part of application No. 14/963,062, filed on Dec. 8, 2015, now Pat. No. 9,769,689.

(60) Provisional application No. 62/089,654, filed on Dec. 9, 2014, provisional application No. 62/096,439, filed on Dec. 23, 2014, provisional application No. 62/093,283, filed on Dec. 17, 2014, provisional application No. 62/099,854, filed on Jan. 5, 2015, provisional application No. 62/100,003, filed on Jan. 5, 2015.

(58) Field of Classification Search
USPC .................................. 455/405, 446, 67.11
See application file for complete search history.

(56) References Cited

U.S. PATENT DOCUMENTS

| | | | |
|---|---|---|---|
| 8,214,526 | B2 | 7/2012 | Wu et al. |
| 8,332,247 | B1 | 12/2012 | Bailey et al. |
| 9,489,479 | B2 | 11/2016 | Liu |
| 2004/0198234 | A1 | 10/2004 | Wacker et al. |
| 2004/0201526 | A1 | 10/2004 | Knowles et al. |
| 2005/0192015 | A1* | 9/2005 | Abusch-Magder ... H04W 16/18 455/446 |
| 2006/0199545 | A1* | 9/2006 | Abusch-Magder ... H04W 16/22 455/67.11 |
| 2007/0021151 | A1 | 1/2007 | Mori et al. |
| 2007/0220522 | A1* | 9/2007 | Coene .................. G06F 9/5066 718/104 |
| 2008/0076408 | A1 | 3/2008 | Katayama et al. |
| 2009/0291692 | A1 | 11/2009 | Kazmi et al. |
| 2011/0258591 | A1 | 10/2011 | Keerthi et al. |
| 2012/0002567 | A1* | 1/2012 | Sun ....................... H04W 28/16 370/252 |
| 2012/0088491 | A1 | 4/2012 | Deng et al. |
| 2012/0327909 | A1 | 12/2012 | Koike et al. |
| 2013/0165108 | A1 | 6/2013 | Xu et al. |
| 2013/0218499 | A1* | 8/2013 | Lemer ................... G06F 17/509 702/85 |
| 2013/0252620 | A1* | 9/2013 | Kobayashi .......... H04W 52/325 455/446 |
| 2013/0310095 | A1* | 11/2013 | El-Najjar .............. H04W 24/04 455/507 |
| 2014/0329528 | A1 | 11/2014 | Zhao et al. |
| 2015/0009857 | A1* | 1/2015 | Rath ..................... H04W 16/18 370/254 |
| 2015/0223143 | A1 | 8/2015 | Celebi et al. |
| 2015/0365180 | A1 | 12/2015 | Bjorken et al. |
| 2016/0080061 | A1 | 3/2016 | Yang et al. |
| 2016/0323753 | A1* | 11/2016 | Zhang .................. G01S 5/0252 |
| 2017/0078937 | A1* | 3/2017 | El-Najjar ............. H04W 24/02 |

FOREIGN PATENT DOCUMENTS

| | | |
|---|---|---|
| CN | 102300221 A | 12/2011 |
| CN | 103152755 A | 6/2013 |
| CN | 103906073 A | 7/2014 |
| KR | 20110014806 A | 2/2011 |
| WO | 2014190472 A1 | 12/2014 |

OTHER PUBLICATIONS

Chen, S., et al., "Adaptive Simulated Annealing for Optimization in Signal Processing Applications." Signal Processing vol. 79, May 1999, pp. 117-128.

Garcia-Lozano, M., et al., "UMTS Optimum Cell Load Balancing for Inhomogeneous Traffic Patterns," 2004 IEEE 60th Vehicular Technology Conference, vol. 2, Sep. 26-29, 2004, pp. 909-913.

Reverb Networks, "Antenna Based Self Optimizing Networks for Coverage and Capacity Optimization," 2012, 17 pages.

Vakil-Baghmisheh, M.-T., et al., "A Modified Very Fast Simulated Annealing Algorithm," International Symposium on Telecommunications, Aug. 27-28, 2008, pp. 61-66.

Roberts, D., "'optpart' Optimal Partitioning of Similarity Relations," R Package version 2.1-1, Dec. 22, 2014, 45 pages.

* cited by examiner

START NEW ROUND WITHOUT WAITING FOR OTHER CELLS TO FINISH THEIR CURRENT ROUND (MAX # OF ROUND = 3)

| ITERATION NUMBER | CELL 1 | | | | CELL 2 | | | | CELL 3 | | | |
|---|---|---|---|---|---|---|---|---|---|---|---|---|
| | ROUND NUMBER | NEW eTILT DIRECTION | GAIN | ACCEPT eTILT DIRECTION? | ROUND NUMBER | NEW eTILT DIRECTION | GAIN | ACCEPT eTILT DIRECTION? | ROUND NUMBER | NEW eTILT DIRECTION | GAIN | ACCEPT eTILT DIRECTION? |
| 1 | 1 | UPTILT | POSITIVE | YES | 1 | UPTILT | NEGATIVE | NO | 1 | UPTILT | POSITIVE | YES |
| 2 | 1 | UPTILT | POSITIVE | YES | 1 | DOWNTILT | NEGATIVE | NO | 1 | UPTILT | POSITIVE | YES |
| 3 | 1 | UPTILT | POSITIVE | YES | 2 | UPTILT | POSITIVE | YES | 1 | UPTILT | NEGATIVE | NO |
| 4 | 1 | UPTILT | NEGATIVE | YES | 2 | UPTILT | NEGATIVE | YES | 1 | DOWNTILT | POSITIVE | YES |
| 5 | 1 | UPTILT | POSITIVE | YES | 2 | UPTILT | NEGATIVE | NO | 1 | DOWNTILT | NEGATIVE | YES |
| 6 | 1 | UPTILT | POSITIVE | YES | 3 | DOWNTILT | POSITIVE | YES | 1 | DOWNTILT | NEGATIVE | NO |
| 7 | 1 | UPTILT | NEGATIVE | YES | 3 | DOWNTILT | NEGATIVE | YES | 2 | UPTILT | POSITIVE | YES |
| 8 | 1 | UPTILT | NEGATIVE | NO | 3 | DOWNTILT | POSITIVE | YES | 2 | UPTILT | NEGATIVE | NO |
| 9 | 1 | DOWNTILT | POSITIVE | YES | 3 | DOWNTILT | NEGATIVE | NO | 2 | DOWNTILT | POSITIVE | YES |
| 10 | 1 | DOWNTILT | POSITIVE | YES | 3 | NO CHANGE | | | 2 | DOWNTILT | NEGATIVE | NO |
| 11 | 1 | DOWNTILT | POSITIVE | YES | 3 | NO CHANGE | | | 3 | UPTILT | NEGATIVE | NO |
| 12 | 1 | DOWNTILT | NEGATIVE | NO | 3 | NO CHANGE | | | 3 | DOWNTILT | NEGATIVE | NO |

FIG. 21

START NEW ROUND ONLY IF ALL OTHER CELLS FINISH THEIR CURRENT ROUND

| ITERATION NUMBER | CELL 1 | | | | CELL 2 | | | | CELL 3 | | | |
|---|---|---|---|---|---|---|---|---|---|---|---|---|
| | ROUND NUMBER | NEW eTILT DIRECTION | GAIN | ACCEPT eTILT DIRECTION? | ROUND NUMBER | NEW eTILT DIRECTION | GAIN | ACCEPT eTILT DIRECTION? | ROUND NUMBER | NEW eTILT DIRECTION | GAIN | ACCEPT eTILT DIRECTION? |
| 1 | 1 | UPTILT | POSITIVE | YES | 1 | UPTILT | NEGATIVE | NO | 1 | UPTILT | POSITIVE | YES |
| 2 | 1 | UPTILT | POSITIVE | YES | 1 | DOWNTILT | NEGATIVE | NO | 1 | UPTILT | POSITIVE | YES |
| 3 | 1 | UPTILT | NEGATIVE | YES | 1 | NO CHANGE | | | 1 | UPTILT | NEGATIVE | YES |
| 4 | 1 | UPTILT | POSITIVE | YES | 1 | NO CHANGE | | | 1 | UPTILT | NEGATIVE | NO |
| 5 | 1 | UPTILT | NEGATIVE | YES | 1 | NO CHANGE | | | 1 | DOWNTILT | POSITIVE | YES |
| 6 | 1 | UPTILT | NEGATIVE | NO | 1 | NO CHANGE | | | 1 | DOWNTILT | POSITIVE | YES |
| 7 | 1 | DOWNTILT | POSITIVE | YES | 1 | NO CHANGE | | | 1 | DOWNTILT | NEGATIVE | NO |
| 8 | 1 | DOWNTILT | POSITIVE | YES | 1 | NO CHANGE | | | 1 | NO CHANGE | | |
| 9 | 1 | DOWNTILT | NEGATIVE | NO | 1 | NO CHANGE | | | 1 | NO CHANGE | | |
| 10 | 2 | UPTILT | POSITIVE | YES | 2 | UPTILT | NEGATIVE | NO | 2 | UPTILT | NEGATIVE | YES |
| 11 | 2 | UPTILT | POSITIVE | YES | 2 | DOWNTILT | NEGATIVE | NO | 2 | UPTILT | POSITIVE | YES |
| 12 | 2 | UPTILT | POSITIVE | YES | 2 | NO CHANGE | | | 2 | UPTILT | NEGATIVE | NO |

FIG. 22

| CASE NAME | COVERAGE STATUS | QUALITY STATUS | INTERFERENCE STATUS | OVERSHOOTER STATUS | CURRENT TILT (ESTIMATE) | CURRENT RS POWER (ESTIMATE) | TILT ACTION | RS POWER ACTION |
|---|---|---|---|---|---|---|---|---|
| OVERSHOOTER | GOOD | GOOD | DON'T CARE | YES | SMALL OR MODERATE | DON'T CARE | DOWN LARGE STEP | NO CHANGE |
| | GOOD | POOR | DON'T CARE | YES | SMALL OR MODERATE | DON'T CARE | DOWN LARGE STEP | NO CHANGE |
| | GOOD | GOOD | DON'T CARE | YES | LARGE | LARGE OR MODERATE | NO CHANGE | DOWN |
| | GOOD | POOR | DON'T CARE | YES | LARGE | LARGE OR MODERATE | NO CHANGE | NO CHANGE |
| | GOOD | GOOD | DON'T CARE | YES | LARGE | SMALL | DOWN SMALL STEP | NO CHANGE |
| | GOOD | POOR | DON'T CARE | YES | LARGE | SMALL | UP SMALL STEP | UP |
| | WEAK EDGE ONLY | DON'T CARE | DON'T CARE | YES | SMALL OR MODERATE | DON'T CARE | DOWN SMALL STEP | NO CHANGE |
| | WEAK EDGE ONLY | DON'T CARE | DON'T CARE | YES | LARGE | DON'T CARE | NO CHANGE | NO CHANGE |
| | WEAK INTERIOR/ INSUFFICIENT | DON'T CARE | DON'T CARE | YES | DON'T CARE | DON'T CARE | NO CHANGE | NO CHANGE |

FROM FIG. 24A

| | | | | | | | |
|---|---|---|---|---|---|---|---|
| GOOD | GOOD | MULTI-INTERFERER | NO | SMALL OR MODERATE | LARGE | DOWN LARGE STEP | DOWN |
| GOOD | GOOD | MULTI-INTERFERER | NO | SMALL OR MODERATE | SMALL OR MODERATE | DOWN LARGE STEP | NO CHANGE |
| GOOD | POOR | MULTI-INTERFERER | NO | SMALL OR MODERATE | DON'T CARE | DOWN LARGE STEP | NO CHANGE |
| GOOD | GOOD | MULTI-INTERFERER | NO | LARGE | LARGE OR MODERATE | DOWN SMALL STEP | DOWN |
| GOOD | POOR | MULTI-INTERFERER | NO | LARGE | LARGE | NO CHANGE | DOWN |
| GOOD | POOR | MULTI-INTERFERER | NO | LARGE | MODERATE | DOWN SMALL STEP | DOWN |
| GOOD | GOOD | MULTI-INTERFERER | NO | LARGE | SMALL | DOWN SMALL STEP | NO CHANGE |
| GOOD | POOR | MULTI-INTERFERER | NO | LARGE | SMALL | DOWN SMALL STEP | NO CHANGE |
| WEAK EDGE ONLY | DON'T CARE | MULTI-INTERFERER | NO | SMALL OR MODERATE | DON'T CARE | DOWN SMALL STEP | NO CHANGE |
| MULTI-INTERFERER | | | | | | | |

FROM FIG. 24B

| MULTI-INTERFERER | WEAK EDGE ONLY | DON'T CARE | MULTI-INTERFERER | NO | LARGE | DON'T CARE | NO CHANGE | DOWN |
|---|---|---|---|---|---|---|---|---|
| | WEAK INTERIOR/ INSUFFICIENT | DON'T CARE | MULTI-INTERFERER | NO | DON'T CARE | DON'T CARE | NO CHANGE | NO CHANGE |
| GOOD | GOOD | POOR | NON-INTERFERER | NO | MODERATE OR LARGE | SMALL OR MODERATE | UP SMALL STEP | UP |
| | GOOD | POOR | NON-INTERFERER | NO | LARGE | LARGE | UP SMALL STEP | NO CHANGE |
| | GOOD | POOR | NON-INTERFERER | NO | MODERATE | LARGE | DOWN LARGE STEP | NO CHANGE |
| | GOOD | POOR | NON-INTERFERER | NO | SMALL | LARGE | DOWN LARGE STEP | NO CHANGE |
| | GOOD | POOR | NON-INTERFERER | NO | SMALL | SMALL OR MODERATE | DOWN SMALL STEP | UP |

FIG. 24C

| CASE NAME | COVERAGE STATUS | QUALITY STATUS | INTERFERENCE STATUS | OVERSHOOTER STATUS | CURRENT TILT (ESTIMATE) | CURRENT RS POWER (ESTIMATE) | TILT ACTION | RS POWER ACTION |
|---|---|---|---|---|---|---|---|---|
| SINGLE INTERFERER | GOOD | GOOD | SINGLE INTERFERER | NO | SMALL OR MODERATE | DON'T CARE | DOWN SMALL STEP | NO CHANGE |
| | GOOD | POOR | SINGLE INTERFERER | NO | SMALL OR MODERATE | LARGE | DOWN LARGE STEP | NO CHANGE |
| | GOOD | POOR | SINGLE INTERFERER | NO | SMALL OR MODERATE | SMALL OR MODERATE | DOWN SMALL STEP | NO CHANGE |
| | GOOD | GOOD | SINGLE INTERFERER | NO | LARGE | LARGE OR MODERATE | NO CHANGE | DOWN |
| | GOOD | POOR | SINGLE INTERFERER | NO | LARGE | LARGE | NO CHANGE | DOWN |
| | GOOD | POOR | SINGLE INTERFERER | NO | LARGE | MODERATE | UP SMALL STEP | NO CHANGE |
| | GOOD | GOOD | SINGLE INTERFERER | NO | LARGE | SMALL | DOWN SMALL STEP | NO CHANGE |
| | GOOD | POOR | SINGLE INTERFERER | NO | LARGE | SMALL | DOWN SMALL STEP | NO CHANGE |
| | WEAK EDGE ONLY | DON'T CARE | | | LARGE | SMALL | UP SMALL STEP | UP |

| | | | | | | |
|---|---|---|---|---|---|---|
| WEAK EDGE ONLY | DON'T CARE | SINGLE INTERFERER | NO | LARGE | MODERATE OR LARGE | UP SMALL STEP | NO CHANGE |
| WEAK EDGE ONLY | DON'T CARE | SINGLE INTERFERER | NO | SMALL OR MODERATE | SMALL | UP SMALL STEP | UP |
| WEAK EDGE ONLY | DON'T CARE | SINGLE INTERFERER | NO | SMALL OR MODERATE | LARGE OR MODERATE | UP SMALL STEP | NO CHANGE |
| WEAK INTERIOR/ INSUFFICIENT | DON'T CARE | SINGLE INTERFERER | NO | LARGE | SMALL | UP SMALL STEP | UP |
| WEAK INTERIOR/ INSUFFICIENT | DON'T CARE | SINGLE INTERFERER | NO | LARGE | LARGE OR MODERATE | UP SMALL STEP | NO CHANGE |
| WEAK INTERIOR/ INSUFFICIENT | DON'T CARE | SINGLE INTERFERER | NO | SMALL OR MODERATE | SMALL OR MODERATE | DOWN SMALL STEP | UP |
| WEAK INTERIOR/ INSUFFICIENT | DON'T CARE | SINGLE INTERFERER | NO | SMALL OR MODERATE | LARGE | DOWN SMALL STEP | NO CHANGE |
| WEAK EDGE ONLY | DON'T CARE | NON- INTERFERER | NO | MODERATE OR LARGE | LARGE | UP SMALL STEP | UP |
| WEAK EDGE ONLY | DON'T CARE | NON- INTERFERER | NO | LARGE | SMALL OR MODERATE | UP SMALL STEP | UP |
| WEAK EDGE ONLY | DON'T CARE | NON- INTERFERER | NO | MODERATE | SMALL OR MODERATE | NO CHANGE | UP |

FROM FIG. 25A

TO FIG. 25C

SINGLE INTERFERER

WEAK EDGE ONLY COVERAGE

FIG. 25B

FROM FIG. 25B

| | | | | | | |
|---|---|---|---|---|---|---|
| WEAK EDGE ONLY | DON'T CARE | NON-INTERFERER | NO | SMALL | SMALL OR MODERATE | NO CHANGE | UP |
| WEAK EDGE ONLY | DON'T CARE | NON-INTERFERER | NO | SMALL | LARGE | NO CHANGE | UP |
| WEAK INTERIOR/ INSUFFICIENT | DON'T CARE | NON-INTERFERER | NO | LARGE | SMALL OR MODERATE | UP SMALL STEP | UP |
| WEAK INTERIOR/ INSUFFICIENT | DON'T CARE | NON-INTERFERER | NO | SMALL OR MODERATE | SMALL OR MODERATE | DOWN SMALL STEP | UP |
| WEAK INTERIOR/ INSUFFICIENT | DON'T CARE | NON-INTERFERER | NO | LARGE | LARGE | UP SMALL STEP | UP |
| WEAK INTERIOR/ INSUFFICIENT | DON'T CARE | NON-INTERFERER | NO | SMALL OR MODERATE | LARGE | DOWN SMALL STEP | UP |

WEAK EDGE ONLY COVERAGE / WEAK INTERIOR/ INSUFFICIENT COVERAGE

FIG. 25C

| CELL ID | 1 | 2 | ... | j | ... | ROW SUM = NUMBER OF PROBLEM UEs/MRs SERVED BY ROW INDEX CELL |
|---|---|---|---|---|---|---|
| 1 | B(1,1) | B(1,2) | | | | |
| 2 | B(2,1) | | | | | |
| ... | | | | | | |
| i | | | B(i,i) | B(i,j) | | |
| ... | | | | | | |
| ... | | | | | | |
| COLUMN SUM = NUMBER OF PROBLEM UEs/MRs CAUSED BY COLUMN INDEX CELL = BLAME METRIC | | | | BM(j) | | TOTAL NUMBER OF PROBLEM UEs IN THE SYSTEM |

ORIGINAL NETWORK | BLUE UPTILT CANDIDATES | INTERACTION BETWEEN BLUE UPTILT CANDIDATES | A MAXIMUM SET OF NON-INTERACTING RED UPTILT CANDIDATES

AUTONOMOUS, CLOSED-LOOP AND ADAPTIVE SIMULATED ANNEALING BASED MACHINE LEARNING APPROACH FOR INTELLIGENT ANALYTICS-ASSISTED SELF-ORGANIZING-NETWORKS (SONS)

The present application is a Continuation-In-Part of and claims priority to U.S. Non-Provisional patent application Ser. No. 14/757,764 filed on Dec. 23, 2015, which is a Continuation-In-Part of U.S. Non-Provisional patent application Ser. No. 14/971,870 filed on Dec. 16, 2015, which is a continuation-in-part of and claims priority to U.S. non-provisional patent application Ser. No. 14/963,062 filed on Dec. 8, 2015, which claims priority to the following U.S. provisional applications:

U.S. Provisional Application No. 62/089,654 filed Dec. 9, 2014;

U.S. Provisional Application No. 62/096,439 filed Dec. 23, 2014;

U.S. Provisional Application No. 62/093,283 filed Dec. 17, 2014;

U.S. Provisional Application No. 62/099,854 filed Jan. 5, 2015; and

U.S. Provisional Application No. 62/100,003 filed Jan. 5, 2015.

All of these are hereby incorporated herein by reference

TECHNICAL FIELD

The present invention relates to telecommunications, and, in particular embodiments, to techniques for autonomous, closed-loop and adaptive simulated annealing based machine learning approach for intelligent analytics-assisted Self-Organizing-Networks (SONs).

BACKGROUND

Modern mobile telecommunication networks are becoming larger and more complex, as the industry migrates towards densely-deployed networks including large numbers of highly concentrated cells capable of providing near-ubiquitous coverage, as well as heterogeneous networks (Het-Nets) capable of supporting different air-interface technologies. As mobile networks grow larger and more complex, they become increasingly difficult to manage and operate, as control decisions are oftentimes made based on incomplete, stale, and, in some cases, inaccurate information. Due to their increased scale and complexity, it may also be more challenging to identify, diagnose, and troubleshoot quality and performance related issues, such as those related to coverage and capacity, interference, and mobility. To make these challenges more manageable, Self-Organizing-Network (SON) automation technology is being developed.

SUMMARY OF THE INVENTION

Technical advantages are generally achieved, by embodiments of this disclosure which describe techniques for autonomous, closed-loop and adaptive simulated annealing based machine learning approach for intelligent analytics-assisted Self-Organizing-Networks (SONs).

In accordance with an embodiment, a method for adjusting communication parameters in a multi-cell wireless network is provided. In this example, the method iteratively generates and evaluates global solutions for a wireless network over a sequence of iterations. Each of the global solutions includes multiple local solutions that specify wireless configuration parameters for local coverage areas in the wireless network. Each of the global solutions is evaluated using a simulated annealing based (SA-based) optimization algorithm. At least some of the local solutions are evaluated separately from their corresponding global solution. The method further includes selecting one of the global solutions when an output condition is reached, and sending local solutions in the selected global solution to access points (APs) in the wireless network.

In one example, iteratively generating and evaluating the global solutions comprises evaluating each of the global solutions during a corresponding iteration using the SA-based optimization algorithm, and evaluating local solutions in corresponding global solutions that satisfy a global performance criteria. In such an example, evaluation of the local solutions may include determining whether the local solutions satisfy a local performance criteria, and replacing, in the corresponding global solutions, local solutions that fail to satisfy the local performance criteria with previous local solutions. The local solutions may satisfy a local performance criteria when a cost of the local solution is less than a threshold or when a function of a cost of the local solution and a local temperature parameter of the SA-based optimization algorithm is less than a threshold.

In an example, iteratively generating and evaluating the global solutions further comprises updating a global temperature parameter of the SA-based optimization algorithm based on an evaluation of a global solution during an instant iteration, and updating one or more local temperature parameters of the SA-based optimization algorithm based on evaluations of one or more local solutions during the instant iteration.

In another example, iteratively generating and evaluating the global solutions over the sequence of iterations further comprises generating a first new global solution during a first iteration by finding neighbors of current local solutions in a current global solution, identifying one or more new local solutions in the first new global solution that fail to satisfy local performance criteria, and replacing, in the first new global solution, the one or more new local solutions with corresponding ones of the current local solutions from the current global solution. In such an example, iteratively generating and evaluating the global solutions over the sequence of iterations further comprises generating a second new global solution during a second iteration by finding neighbors of local solutions in the modified global solution. An apparatus for performing these methods is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 21 illustrates a graph depicting simulation results obtained by performing the method described in FIG. 20;

FIG. 22 illustrates another graph depicting additional simulation results obtained by performing the method described in FIG. 20;

FIGS. 24A-24C illustrates an embodiment table for mapping status labels to actions;

FIGS. 25A-25C illustrates another embodiment table for mapping status labels to actions;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
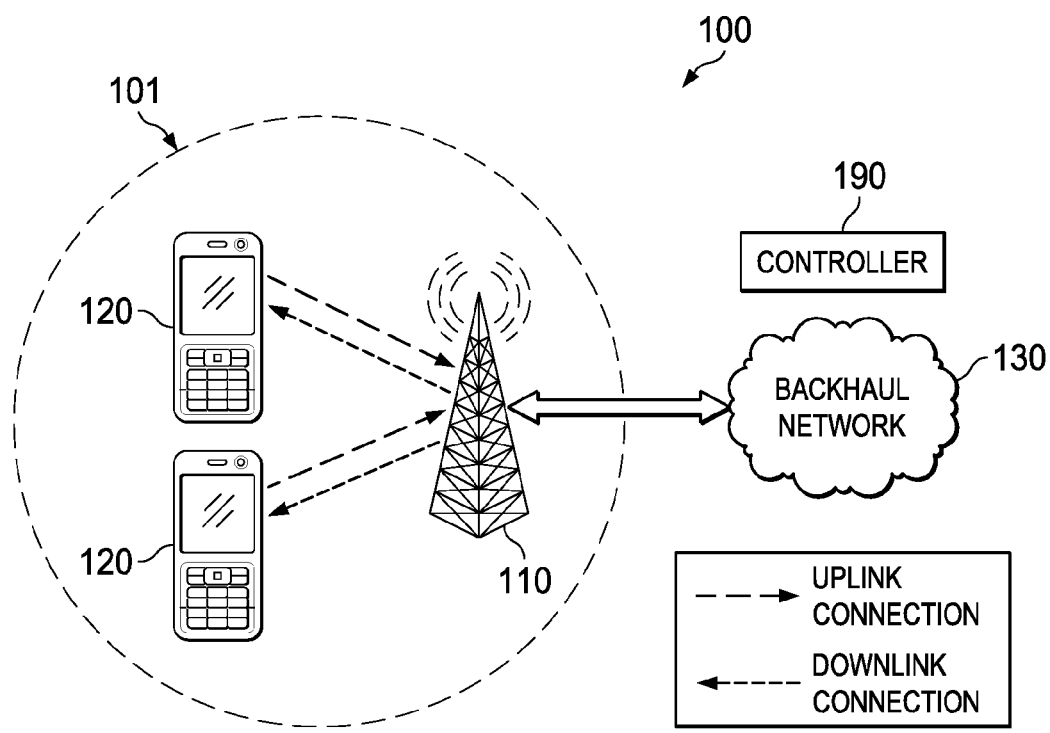
FIG. 1 illustrates a diagram of an embodiment wireless communications network.

The making and using of embodiments of this disclosure are discussed in detail below. It should be appreciated, however, that the present disclosure provides many applicable inventive concepts that can be embodied in a wide variety of specific contexts. The specific embodiments discussed are merely illustrative of specific ways to make and use the various embodiments disclosed herein, and do not limit the scope of the disclosure.

Simulated annealing based (SA-based) optimization algorithms may be used to evaluate global solutions for multi-cell wireless networks. As used herein, the term "global solution" refers to a set of local solutions for two or more wireless network coverage areas in a wireless network. Each "local solution" specifies one or more wireless configuration parameters for a particular wireless network coverage area. For example, in the context of coverage and capacity optimization (CCO), a local solution may specify an antenna tilt of an access point in a wireless network coverage area and/or a transmit power level (e.g., uplink, downlink, or otherwise) for the wireless network coverage area.

When conventional SA-based optimization is used in a wireless network, global solutions are generated and evaluated over a sequence of iterations. In particular, a new global solution is generated during each iteration by finding neighbors of a current global solution using the SA-based algorithm, and then evaluated to determine whether the new global solution satisfies the global performance criteria. If so, the new global solution is accepted, thereby replacing the current global solution for the next iteration. If not, the new global solution is discarded, and the current global solution stays the same for the next iteration.

Evaluation of the new global solution generally entails determining whether a function of a cost of the new global solution and an acceptance probability of the SA-based algorithm is below a threshold. The function of the cost and the acceptance probability may generally be referred to as the acceptance probability functions, and the threshold for evaluating the new global solution is typically set based on a cost of the current global solution. The acceptance probability allows a new global solution to be accepted even if the cost of the new global solution exceeds the cost of the current global solution. This allows the SA-based optimization to avoid being trapped in local maximums. Conventional SA-based optimization schemes have been found to have long convergence times when used in multi-cell wireless networks. Additionally, conventional SA-based optimization schemes often introduce significant performance/quality degradation (e.g., KPI/KQI reduction) when used online during runtime operation of the wireless network.

Aspects of this disclosure provide several techniques for reducing convergence times of SA-based optimization. One such technique introduces an additional local or cell-level evaluation step into the evaluation of the global solutions. More specifically, embodiments of this disclosure evaluate new local solutions in a new global solution when the new global solution is deemed to have satisfied the global performance criteria. Throughout this disclosure, local solutions in a new global solution generated during an instant iteration are referred to as "new local solutions," while local solutions from a current global solution brought into the instant iteration are referred to as "current local solutions." The new local solutions are evaluated based on local performance criteria. New local solutions that satisfy their corresponding local performance criteria remain in the new global solution. New local solutions that do not satisfy their corresponding local performance criteria are replaced with a corresponding current local solution from the current global solution, thereby modifying the new global solution. The resulting global solution, referred to herein as a "modified global solution," therefore includes both new local solutions that satisfy their corresponding local performance criteria and current local solutions that replaced new local solutions that failed to satisfy their local performance criteria. In this way, the modified global solution includes both new local solutions generated during the instant iteration and current local solutions from the current global solution brought into the instant iteration. The modified global solution is then accepted as the current solution for the next iteration. Once a new or modified global solution is accepted, it replaces the current global solution, and all local solutions therein transition into "current local solutions" for the next iteration.

Various techniques can be used to evaluate new local solutions in qualifying global solutions. In one example, a cost for a new local solution is calculated using an objective function, and then compared against a local cost threshold. New local solutions whose cost is less than the cost threshold remain in the new global solution, while new local solutions whose cost exceeds the local cost threshold are replaced by corresponding current local solutions from the current global solution. In another example, new local solutions are evaluated based on an acceptance probability function. In such an example, each new local solution in a qualifying global solution is evaluated by determining whether a function of a cost of the new local solution and a local acceptance probability exceeds a threshold. In both examples, the threshold for evaluating the new local solutions may be based on a cost of a corresponding current local solution from the current global solution or an absolute/predefined cost (e.g., a cost associated with a minimum level of acceptable performance). In yet another example, kPIs and/or KQIs (e.g., call drop rates, radio access bearer (RAB) success rates, handover success rates, interference indicators) relevant to a new local solution and/or other new neighboring local solution (e.g., local solutions for neighboring cells) may be used to evaluate the new local solution.

Another technique for reducing convergence times during SA-based optimization generates and evaluates local solutions for fewer than all coverage areas in a wireless network during at least some iterations. This may target the optimization to a smaller group of local coverage areas exhibiting a common characteristic (e.g., cost, etc.). In one example, local coverage areas exhibiting a cost that exceeds a threshold during a previous period are selected for inclusion in a subset of local coverage areas for which local solutions are generated, evaluated, and optimized during one or more iterations. This may focus the SA-based optimization on improving the performance of the worst-performing coverage areas.

Yet another technique for reducing convergence times during SA-based optimization utilizes an iterative learning approach to exploit knowledge and experience obtained from evaluating global and local solutions during previous iterations. This may be achieved by using the evaluation results to update parameters (e.g., global/local access probability, global/local temperature parameters, etc.) of an SA-based optimization algorithm, which is then used to generate and/or evaluate global and/or local solutions in subsequent iterations. In one example, a local step size is decreased when the cost of an evaluated local solution is below a certain threshold. In another example, a local step size is decreased when interference indicators (e.g., blame, interference factors calculated form MRs) for neighboring local solutions increases above a certain threshold. In another example, a local step size is increased when neighboring local solutions exhibit similar costs, or when the cost increase/decrease after a certain number of iterations is below a threshold. This may increase the rate in which the SA-based algorithm climbs out of a local maximum. In another example, an access probability is modified when neighboring local solutions exhibit similar costs, or when the cost increase/decrease after a certain number of iterations is below a threshold. This may allow higher cost local solutions to be accepted as a normal solution, which in turn may increase the rate in which the SA-based algorithm climbs out of a local maximum. The step size and/or access probabilities may be modified indirectly by modifying a local temperature parameter. Some of the aforementioned techniques may also reduce the likelihood of introducing significant performance degradation during online iterative optimization of the wireless network. These and other aspects are explained in greater detail below.

FIG. 1 is a diagram of a wireless network 100 for communicating data. The wireless network 100 includes a base station 110 having a wireless coverage area 101, a plurality of mobile devices 120, a backhaul network 130, and a controller 190. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), relay, device engaging in machine type communications, or other wirelessly enabled devices. The controller 190 may be any component, or collection of components, adapted to perform network optimization for the wireless coverage area 101. The controller 190 may be co-located with the base station 110. Alternatively, the controller 190 may be separate and distinct from the base station 110, in which case the controller 190 may communicate with the base station over the backhaul network 130. In some embodiments, the network 100 may comprise various other wireless devices, such as low power nodes, etc.

Figure 2:
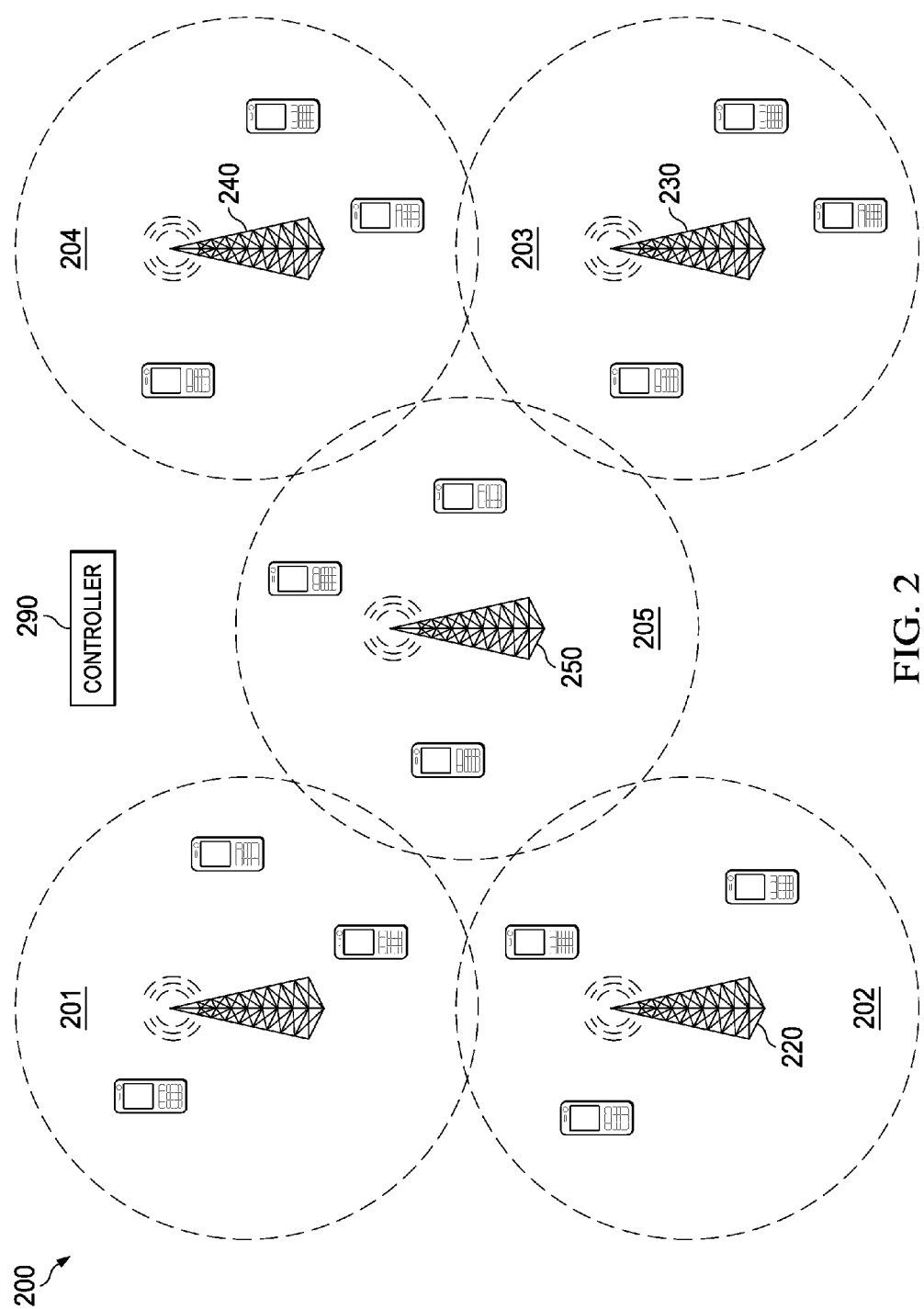
FIG. 2 illustrates a diagram of another embodiment wireless communications network comprising a cluster of cells.

FIG. 2 illustrates a wireless network 200 comprising local coverage areas 201, 202, 203, 204, 205 within which wireless access is provided to mobile devices by base stations 210, 220, 230, 240, 250 (respectively). It should be appreciated that the wireless network 200 is shown as including five local coverage areas 201, 202, 203, 204, 205 for purposes of brevity and clarity, and that inventive aspects provided can be used in wireless network having any number of local coverage areas. It should also be appreciated that, in some implementations, the wireless network 200 may be a heterogeneous network (Het-Net) in which at least some of the base stations 210, 220, 230, 240, 250 communicate using different wireless access technologies.

Modifying wireless configuration parameters in one of the local coverage areas 201, 202, 203, 204, 205 may affect another performance in that local coverage area as well as the other local coverage areas. For example, increasing a transmit power level in the local coverage area 205 may improve coverage and capacity in the local coverage area 205, while also increasing inter-cell-interference in the local coverage areas 201, 202, 203, 204. Wireless configuration parameters in the local coverage areas 201, 202, 203, 204, 205 may also complement one another in a manner that affects the overall performance of the wireless network. By way of example, the hysteresis margins of neighboring local coverage areas 201, 202, 203 204, 205 may affect mobility load balancing (MLB) and mobility robustness optimization (MRO) performance over the entire wireless network 200.

The controller 290 may generate global solutions for the wireless network 200 using an SA-based optimization algorithm. In some embodiments, the controller 290 performs on-line SA-based optimization such that the new global solutions are implemented in the network 200 during test periods, and then the global solutions and/or local solutions are evaluated based on information (e.g., measurement report (MR) information, etc.) associated with wireless transmission in the wireless network 200 during the test period.

Figure 3:
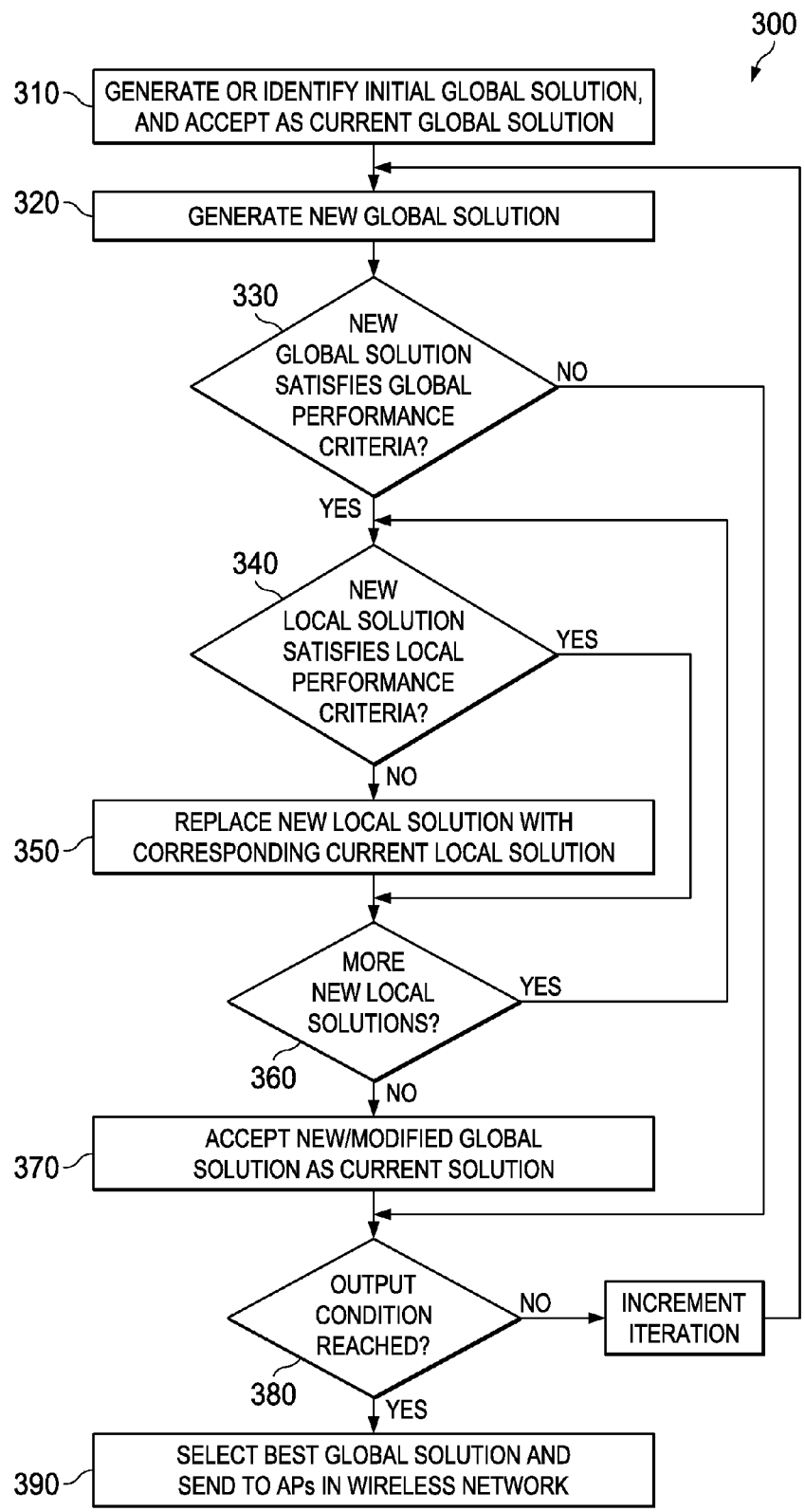
FIG. 3 illustrates a flowchart of an embodiment method for adjusting wireless configuration parameters in a wireless network using an SA-based optimization algorithm.

Aspects of this disclosure provide embodiment SA-based optimization techniques that evaluate global solutions at both the global level and local level. FIG. 3 illustrates an embodiment method 300 for adjusting communication parameters in a multi-cell wireless network using an SA-based optimization algorithm, as may be performed by a controller. At step 310, the controller generates or identifies an initial global solution, and accepts it as the current global solution. In some embodiments, the initial global solution is the global solution that was used to operate the wireless network prior to the initial iteration of the SA-based optimization. In other embodiments, the initial global solution is a predefined solution. In yet other embodiments, the initial global solution is generated based on initial parameters (e.g., initial global temperature, etc.) of the SA-based optimization algorithm. Other techniques may also be used to generate the initial global solution, e.g., random search, heuristic, etc.

At step 320, the controller generates a new global solution based on the SA-based optimization algorithm. The new global solution may be generated in various ways. In one embodiment, new global solution is generated by finding neighbors of current local solutions in the current global solution according to parameters (e.g., temperature, etc.) of the SA-based optimization algorithm. For example, a neighbor of a current local solution may be found by modifying one or more wireless parameters specified by the local solution according to a step size and direction defined by a local temperature parameter of the SA-based optimization algorithm. In other embodiments, the direction and step size in a local solution may be generated based on domain or system knowledge (e.g., based on the labels or problematic types of the cell). In yet another embodiments, the direction and step size in a local solution may be generated based on a guided random search (e.g., multivariate Gaussian or Cauchy distribution) by iteratively adapting the relevant key parameters (e.g., covariances) used in guided random search to the cost of individual local solution based on the feedback from the real network. In yet another embodiment, offline simulation may be updated and used to select the step size and direction for a local solution based on the feedback from the real network per iteration. In yet another embodiment, reinforcement learning techniques may be used to generate the step size and direction for local solution based on the feedback from the network.

At step 330, the controller determines whether the new global solution satisfies a global performance criteria. In some embodiments, this is achieved by evaluating an online performance of the new global solution in the wireless network during a test period. For example, new local solutions in the new global solution may be communicated to APs in the wireless network, and used to transmit or receive wireless transmissions during the test period. Information (e.g., measurement reports (MRs), etc.) associated with the wireless transmissions may then be communicated to the controller, and used to calculate a global cost for the global solution based on an objective function. Details regarding objective functions are provided below. The controller then may determine whether the new global solution satisfies the global performance threshold based upon whether an acceptance probability function of the cost of the new global solution is below a global threshold. The global threshold may be based on a cost of the current global solution. If the new global solution satisfies the global performance criteria, then the method 300 proceeds to step 340. Otherwise, if the new global solution does not satisfy the global performance criteria, then the new global solution is discarded, and the method 300 proceeds to step 380.

At step 340, the controller determines whether one of the new local solutions in the new global solution satisfies a local performance criteria. Various evaluation techniques may be used to determine whether the local solutions satisfy the local performance criteria, and different local performance criteria may be used to evaluate new local solutions for different local coverage areas in a wireless network. In an embodiment, new local solutions are evaluated on a cost-basis. In such an embodiment, a new local solution is deemed to satisfy the local performance criteria if a cost of the local solution is below a cost threshold. In another embodiment, new local solutions are evaluated using an SA-based criteria. In such an embodiment, a new local solution is deemed to satisfy the local performance criteria if an access probability function of the cost of the new local solution is below a cost threshold. In both embodiments, the cost of new local solutions may be computed using an objective function. The cost thresholds may be based on an absolute threshold (e.g., a minimum performance level for each cell). Alternatively, the cost thresholds may be based on a relative threshold. For example, a cost threshold may be based on a cost (or adjusted cost) of a corresponding current or previous local solution. As another example, the cost threshold may be based on costs associated with a certain percentage of current or previous local solutions (e.g., cost of bottom ten percent of local solutions, etc.).

If the new local solution is deemed to satisfy the local performance criteria at step 340, then the method 300 proceeds to step 360. Otherwise, if the new local solution does not satisfy the local performance criteria, then the method proceeds to step 350, where the controller replaces the new local solution with a corresponding current local solution. At step 360, the controller determines whether there are more new local solutions to evaluate. If so, the method 300 reverts back to step 340. Once all new local solutions in a new global solution have been evaluated, the method proceeds to step 370, where the controller accepts the new or modified global solution as the current solution.

At step 380, the controller determines whether an output condition has been reached. Various criteria could be used to determine whether an output condition has been reached. In one embodiment, the output condition is reached after a threshold number of iterations have been performed. In other embodiments, the output condition is reached when an optimization criteria is satisfied. For example, the output condition may be reached when an optimization parameter (e.g., stop temperature, stop probability) reaches or crosses a threshold. As another example, the output condition may be reached when a maximum or minimum cost crosses a threshold. As yet another example, the output condition may be reached when the amount of improvement (e.g., cost reduction) over a threshold number of iterations does not exceed a threshold (e.g., less than two percent cost reduction in best solution over twenty iterations). As yet another example, the output condition may be reached when no improvement occurs over a threshold number of iterations (e.g., best global solution remains the same for ten iterations). If the output condition has not been reached, the instant iteration is incremented to the next iteration, and the method 300 reverts back to step 320. If the output condition has been reached, then the controller selects the best global solution, and sends local solutions in the best global solutions to APs in the wireless network at step 390.

In some embodiments, parameters of the SA-based optimization algorithm are updated after incrementing an iteration based on the evaluation of global and local solutions during one or more previous iterations. In one example, a local step size is decreased when the cost of local solution exhibit relative low cost or when the cost is below a certain threshold. In another example, a local step size is decreased when interference indicators (e.g., blame, interference factors calculated form MRs) for neighboring local solutions increases above a certain threshold. In another example, a local step size is increased when neighboring local solutions exhibit similar costs, or when the cost increase/decrease after a certain number of iterations is below a threshold. This may increase the rate in which the SA-based algorithm climbs out of a local maximum. In another example, an access probability is modified when neighboring local solutions exhibit similar costs, or when the cost increase/decrease after a certain number of iterations is below a threshold. This may allow higher cost local solutions to be accepted as a normal solution, which in turn may increase the rate in which the SA-based algorithm climbs out of a local maximum. The step size and/or access probabilities may be modified indirectly by modifying a local temperature parameter.

Aspects of this disclosure provide embodiment SA-based optimization techniques that generate and evaluate local solutions for fewer than all subsets of local coverage areas in a wireless network during at least some iterations. This allows the optimization to focus on fewer numbers of local coverage areas during a given iteration, thereby increasing the rate of improvement in those local coverage areas.

Figure 4:
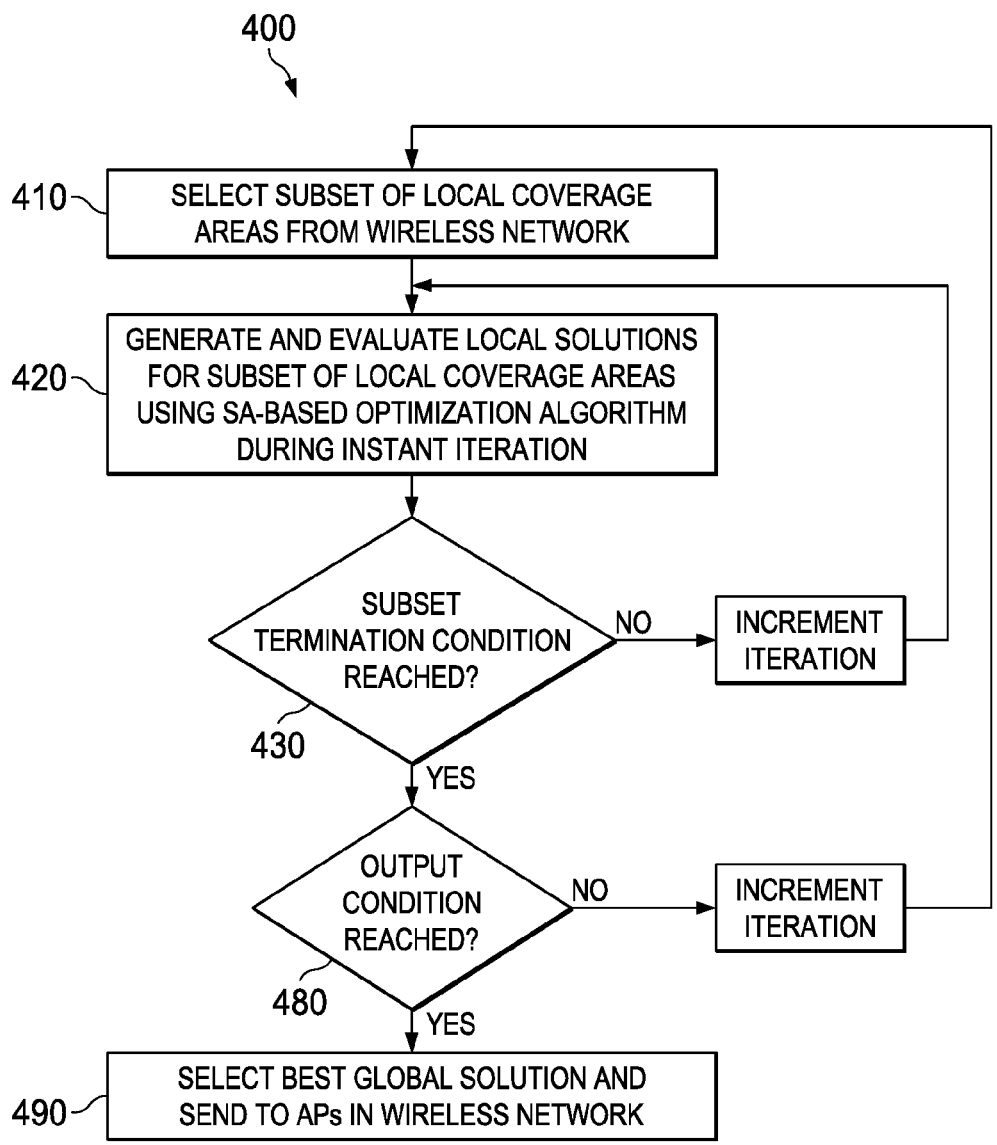
FIG. 4 illustrates a flowchart of another embodiment method for adjusting wireless configuration parameters in a wireless network using an SA-based optimization algorithm.

FIG. 4 illustrates an embodiment method 400 for adjusting communication parameters in a multi-cell wireless network using an SA-based optimization algorithm, as may be performed by a controller. At step 410, the controller selects a subset of local coverage areas in a wireless network for which to generate local solutions during one or more iterations. The subset of local coverage areas may be selected based on different criteria. In one embodiment, local coverage areas are selected for inclusion in the subset of wireless coverages based on a cost associated with wireless transmissions in the local coverage areas. For example, the controller may rank the local coverage areas based on cost, and then select the top K coverage areas for inclusion in the subset (where K is an integer greater than one). In such an example, the same number of local solutions would be generated and evaluated during each iteration. As another example, the controller may select any local coverage area having a cost that is above a threshold for inclusion in the subset of local coverage areas.

At step 420, the controller generates and evaluates local solutions for the subset of local coverage areas using an SA-based optimization algorithm during an instant iteration. During step 420, the controller may generate a subset of local solutions for the subset of coverage areas in a manner similar to that used to generate the global solution in step 320, and then evaluate them on the group level, the local level, or both.

In some embodiments, the controller evaluates the subset of local solutions at the group level without evaluating them at the local level. For example, the controller may evaluate the subset of local solutions to determine whether they collectively satisfy a group or global performance criteria in a manner similar to that used to evaluate the new global solution in step 330. In such embodiments, the subset of local solutions stand or fall together.

In other embodiments, the controller evaluates local solutions in the subset of local solutions at the local level without evaluating the subset of local solutions at the group level. For example, the controller may evaluate local solutions in the subset of local solutions individually based on local performance criteria in a manner similar to that used to evaluate the new local solutions in step 360. In such embodiments, local solutions in the subset of local solutions may stand or fall by themselves.

In yet other embodiments, the controller evaluates the subset of local solutions at both the group level and the local level. For example, the controller may evaluate the subset of local solutions in a manner similar to that described in steps 330-370.

At step 430, the controller determines whether a subset termination condition has been reached. The criteria used to determine whether the subset termination condition may be similar to those used to determine whether the output condition was reached in step 380. For example, the subset termination condition may be reached after local solutions for the subset of local coverage areas have been generated and evaluated for a threshold number of iterations. As another example, the subset termination condition may be reached when an optimization parameter (e.g., stop temperature, stop probability, etc.) associated with the subset of coverage areas reaches or crosses a threshold or when an output condition (e.g., cost reduction) associated with the subset of coverage areas experiences marginal or no improvement over a certain number of iterations, e.g., less than two percent cost reduction in best subset of local solutions over twenty iterations, best subset of local solutions remains the same for ten iterations, etc.

If the subset termination condition has not been reached, then the iteration is incremented, and the method 400 reverts back to step 420. Once the subset termination condition has been reached, the method proceeds to step 480, where the controller determines whether an output condition has been reached. The criteria used to determine whether the output condition has been reached in step 480 may be similar to those used to determine whether the output condition was reached in step 380. If the output condition has not been reached, then the iteration is incremented, and the method 400 reverts back to step 410, where the controller selects a new subset of local coverage areas for optimization during the next subset of iterations. Once the output condition has been reached, the controller selects the best local solutions, and sends them to APs in the wireless network at step 490.

Embodiments of this disclosure discuss computing costs for global and local solutions based on objective functions. Throughout this disclosure, the term "objective function" is primarily discussed in the context of a loss function, in which lower resulting values (e.g., lower costs) are indicative of better solutions than higher resulting values. It should be appreciated that inventive aspects may also use utility functions, in which higher resulting values (e.g., higher utilities) are indicative of better solutions than lower resulting values.

Objective functions may be any function that computes a cost or utility associated with a local coverage area, a subset of local coverage areas, or a wireless network. An example of a generic objective function for computing a local, group, or global cost is as follows: $\text{Cost} = \sum_{i=1}^{n} w_i * C_i$, where $C_i$ is an $i^{th}$ component and $w_i$ is a weighting factor for the $i^{th}$ component. Objective function components can be a function of a key performance indicator (KPI) or a key quality indicator (KQI). Examples of possible KPIs and KQIs for various optimization problems are provided in Table 1.

Objective functions for calculating global or group costs may include statistical components. For example, a generic global objective function is as follows: $\text{Cost} = w_i * \text{cells(result\_x}_i)$, where $w_i$ is a weighting factor, cells(result_$x_i$) is a number, percentage, or ratio of cells experiencing a given result (result_$x_i$). In such an example, the given result(s) could include the number or percentage of cells experiencing a relative result (e.g., cost reduction exceeding threshold, cost increase exceeds threshold, etc.) or an absolute result (e.g., overall cost below a threshold, overall cost below a threshold, overall cost within or outside a range, etc.).

TABLE 1

| Optimization Problem | KPIs/KQIs |
|---|---|
| Coverage Capacity Optimization (CCO) | Reference signal received power (RSRP), RSRQ, RSSINR, RRC Success Rate, RAB Success Rate, Handover Success Rate, Call Drop Rate |
| Inter-cell-interference Coordination (ICIC) | RSRP, RSRQ, RSSINR, , RRC Success Rate, RAB Success Rate, Handover Success Rate, Call Drop Rate |
| Mobility Load Balancing (MLB) | RSRP, RSRQ, RSSINR, RB Utilization, RRC Success Rate, RAB Success Rate, Handover Success Rate, Call Drop Rate |
| Mobility Robustness Optimization (MRO) | RSRP, RSRQ, RSSINR, RRC Success Rate, RAB Success Rate, Handover Success Rate, Call Drop Rate |
| Cell Outage Compensation (COD) | RSRP, RSRQ, RSSINR, , RRC Success Rate, RAB Success Rate, Handover Success Rate, Call Drop Rate |

The following provide some illustrative examples of objective functions for various optimization problems. These examples represent only some of the possible examples, and should not be interpreted as limiting.

One example of an objective function for calculating a local, group, or global cost during coverage capacity optimization or cell outage compensation is as follows: $\text{Cost} = w_1 * \text{Num\_MRs}(\text{RSRP} \leq \text{Thr\_rsrp}) + w_2 * \text{Num\_MRs}(\text{INT} \geq \text{thr\_int})$, where $w_1$ and $w_2$ are weighting factors, Num_MRs (RSRP≤Thr_rsrp) is the number of measurement reports (MR) indicating RSRP level below an RSRP threshold during a fixed period, and Num_MR(INT≥thr_int) is the number of measurement reports (MR) indicating an interference level below an interference threshold during the fixed period. In such an example, the interference levels may correspond to signal to interference plus noise (SINR) levels obtained by measuring reference signals.

Another example of an objective function for mobility load balancing problem may be a certain weighted function of the following measured values: RSRP and interference (SINR or RSRQ) for each MR, and RB utilization and/or throughput for each cell, with some constraints (e.g., threshold for RSRP or RSRQ, etc).

Another example of the objective function for inter-cell interference reduction may be a certain weighted function of the received interference at the subcarrier of the user that is caused by interfering cell.

Different wireless configuration parameters may be adjusted for different SA-based optimization algorithms. Examples of wireless configuration parameters for different optimization problems are provided in Table 2.

TABLE 2

| Optimization Problem | Wireless configuration parameters |
|---|---|
| Coverage Capacity Optimization (CCO) | RFs (e.g., antenna tilt, azimuth), transmit power |
| Inter-cell-interference Coordination (ICIC) | sub-band power factor edge-to-center boundary, power, RF (e.g., tilt) |
| Mobility Load Balancing (MLB) | pilot power, RFs (e.g., tilt), Handover parameters (e.g., hysteresis, cell individual offset) |
| Mobility Robustness Optimization (MRO) | pilot power, RFs (e.g., tilt), Handover parameters (e.g., hysteresis, cell individual offset) |
| Cell Outage Compensation (COD) | RFs (e.g., antenna tilt, azimuth), transmit power |

Aspects of this disclosure provide autonomous adaptive simulated annealing algorithms. An embodiment algorithm is described by the following ten steps. The first step comprises obtaining an initial solution (S) and an initial temperature ($T_0$). In one embodiment, the starting temperature ($T_0$) is selected based on an objective or cost function according to the online feedback from the network or from an offline simulation. In another embodiment, the starting temperature ($T_0$) is selected by increasing the starting temperature ($T_0$) until an acceptance ratio exceeds a threshold, e.g., ninety percent, etc.

The second step comprises evaluating the cost of the initial solution using constraints (e.g., thresholds and weights for parameters (e.g., RSRP, SINR) used in objective function). This may include a normalization process that considers the cost per cell, the ratio of total cost to the total number of MRs, and the ratio of cost to number of MRs per cell. The second step may also consider the cost per cell or per area (e.g., all cells or partial group of cells such as neighbors), cost percentage (e.g., ratio of cost per cell to MR number per cell), and distribution (e.g., weighted by cell).

The third step comprises generating a new solution ($S_{new}$). The new solution may be generated using various adaptive (e.g., on-line) algorithm algorithms, including a uniform algorithm, a guided random search (e.g., Gaussian, Cauchy). The new solution may also be generate via an offline simulation combined with reinforcement learning. Generating the new solution may include selecting which cell(s) are to be adjusted. The cells may be chosen randomly, using a heuristic approach, e.g., sorted by cost to MR no per cell, first m, exponential probability), or a using a hybrid approach (e.g., part random and part heuristic). The number of cells that are optimized may fixed (e.g., X number of cells), or adaptive (e.g., based on the priority or severity of problematic cells). One or more parameters may be adjusted per iteration. Various change/action/perturbation mechanisms may be used to applied to adjust the parameters to be adjusted. For example, parameters may be adjusted in the positive or negative direction. The adjustments can use different step size adjustment parameters, e.g., small step, large step, absolute step size, relative step size, fixed step-size/range, adaptive step-size/range depending on the temperature at system/cell level or offline simulation, etc.

The fourth step includes evaluating the cost of the new solution. The fifth step includes determining whether to select the new solution as the current solution. This decision may consider various criteria, and may be probability-based and/or threshold based. For example, the decision may consider criteria related to the cost of the new solution, e.g., difference between the cost of new solution and optimal cost, cost per MR or per cell, etc.

The sixth step determines whether an equilibrium condition (# of iterations carried out before update T) has not been reached. If not, then the technique reverts back to step three. The seventh step comprises learning from experience gained during the first six steps, e.g., feedback from the system, mistake, reward, etc. This step may update models and/or parameters, such as control parameters (e.g., system/cell level temperate Tn), propagation models used by simulators, engineering parameters, parameters/models for identifying problematic cells, generating new solution and accepting new solution, etc.

The eight step determines whether a backward/safeguard condition has been met. If so, the technique back-steps to a previous solution according to some criteria. This step may be helpful in avoiding locally optimal solutions. The ninth step determines whether a termination criterion has been reached according to some criteria. If not, then the technique reverts back to step three. The tenth step returns all solutions and relevant parameters, e.g., best solution and cost so far, current solution and cost, etc.

Figure 5:
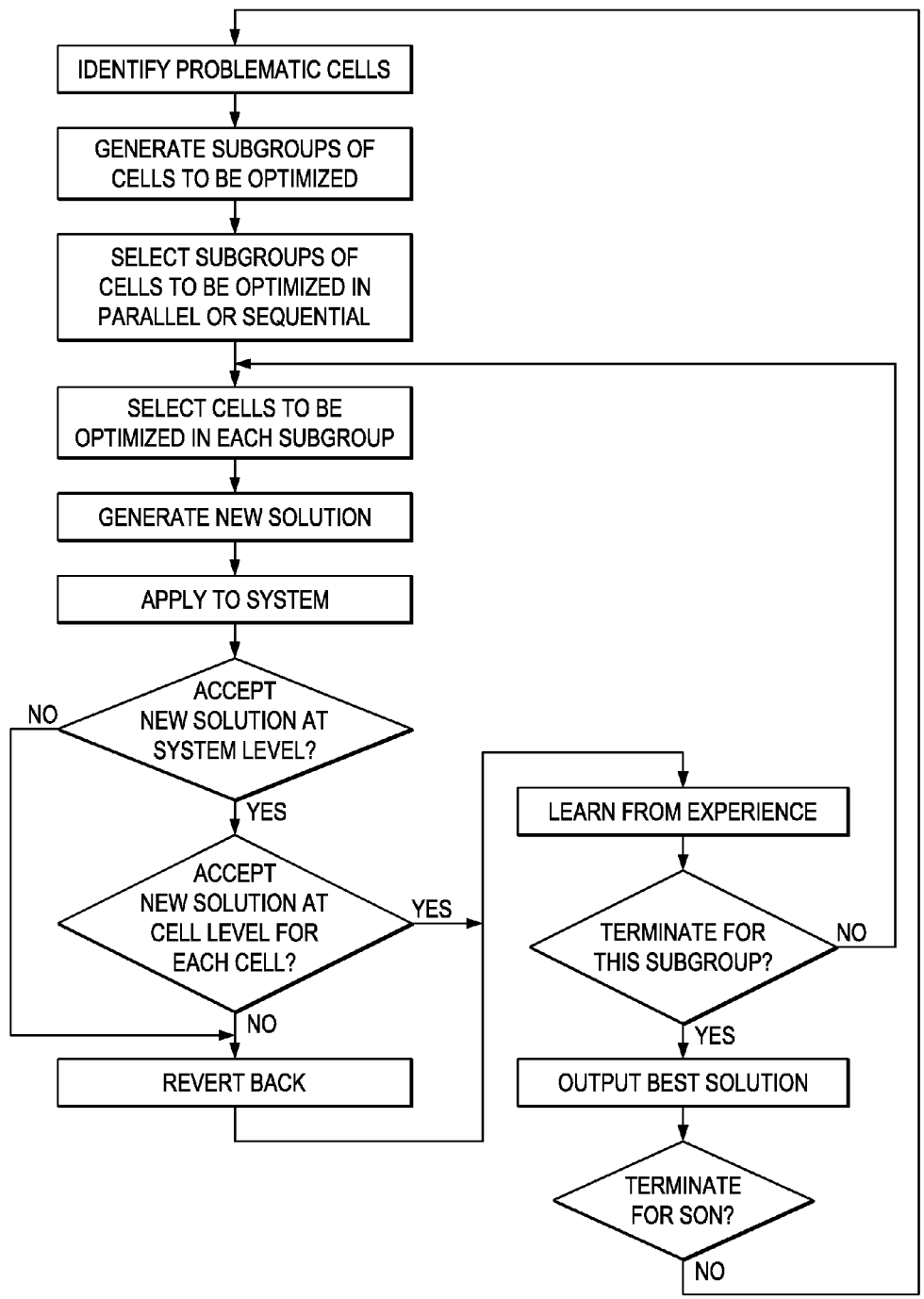
FIG. 5 illustrates a flowchart of an embodiment method for adjusting communication parameters for a cluster of cells using an autonomous adaptive simulated annealing algorithm.

FIG. 5 illustrates an embodiment flowchart for adjusting communication parameters for a cluster of cells using an autonomous adaptive simulated annealing algorithm. As shown, the method begins by identifying all problematic cells. Next, the method generates subgroups of cells to be optimized. Thereafter, the method selects subgroups of cells to be optimized in parallel and/or subgroups of cells to be optimized sequentially. Subsequently, the method selects cells to be optimized in each subgroup. Next, the method generates a new solution. Thereafter, the method determines whether or not to select the new solution at the system level.

If the new system is rejected at the system level according to some criteria (e.g., metropolis criterion, threshold, difference between objective function for new solution and that for best/current solution), then the method reverts back to another solution, e.g., most recent "best" solution, current solution, etc. If the new solution is accepted at the system level, then the method determines whether or not to accept the new solution at the cell level for each cell according to some criteria (e.g., metropolis criterion, threshold, difference between objective function for new solution and that for best/current solution at cell level). If the new solution is accepted for all the cells at the cell level, then the method proceeds to learn from its experience. If the new solution is rejected for some cells at cell level, then the method reverts back to some other solution (e.g., latest best RF parameter, current RF), for those rejected cells, prior to learning from the experience. When learning from the experience, the method may record the solution, and update the models/parameters/statistics accordingly. After learning from the experience, the method determines whether to terminate the optimization of the subgroup. If the optimization for the subgroup is not terminated, then the method re-selects cells to be optimized in this subgroup. If the optimization for this subgroup is terminated according to some criteria (e.g., threshold, KPIs), then the method outputs the best solution, and then determines whether to terminate the SON session.

Aspects of this disclosure provide techniques for dynamically adjusting cell-specific radio frequency (RF) configuration parameters (e.g., electrical antenna tilt, reference symbol (RS) pilot power, etc.) to optimize an objective function. In one embodiment, RF parameters of a single cell are adjusted to maximize a per-cell performance metric. In another embodiment, RF parameters for two or more cells are jointly adjusted to maximize a network performance metric, e.g., QoE in terms of coverage, capacity, etc. Cell-specific RF configuration parameters may be adjusted by prompting, or sending, the parameters to at least one cell.

In some embodiments, parameters are adjusted incrementally online. Parameters may be adjusted jointly for the different cells in a cluster, and the resultant feedback from UE measurement reports (MRs) may be observed continually in a closed loop for long term optimization. Real UE feedback (e.g., no propagation model estimate) in MRs to update the objective function, to identify cell state indicators, and to make step-wise parameter adjustments. In some embodiments, the objective function does not depend on UE location information.

As long as MRs (RSRP, RSSINR or RSRQ) from representative UEs are available for a given parameter change, the objective function can be evaluated accurately. As such, the objective function may not require correct antenna tilt and power information. System objective functions and cell level metrics may be aggregations of UE state information (e.g., MRs, etc.) that don't require individual UE location for evaluation. Even if initial configuration parameters are inaccurate, they can be still adjusted in a meaningful direction using the fact that parameter changes lead to measurable changes in cell/system metrics.

Aspects of this disclosure provide adaptive simulated annealing (SA) techniques that combine online optimization of the real network via closed-loop SA-based guided random search and proactive offline optimization of relevant parameters and/or actions by efficiently exploring the solution space via simulated networks (e.g., Netlab, Unet) iteratively, in order to, learn from experiences, such as mistakes and rewards. This may allow actions to be selected based on the real-time feedback from the system. Embodiments may dynamically select and evolve the best possible actions for online optimization, which may allow the system to adapt to new unforeseen conditions or situations. Embodiments may also update the models and parameters used by SA and/or simulators based on online feedback from the system in real time, to provide fast convergence and to escape the trap of local optimization.

In some embodiments, labels are assigned to the plurality of cells based on the MRs and configuration parameters of the plurality of cells are adjusted according to the labels. In one embodiment, each of the plurality of cells are assigned two or more status labels based on one or more MRs collected in the wireless network. The two or more status labels are associated with different cell status categories. In one embodiment, a cell status may be categorized as a coverage status, a quality status, an overshooter status, or an interference status. Each of the cell status categories may be further classified into different cell status types. For example, a quality status is classified into types of {good, bad}, or an interference status is classified into types of {strong, medium, weak}. A cell may be mapped to one of the cell status types corresponding to a cell status category based on MRs and is labeled by that type and category. A combination of the labels assigned to each of the cells in the wireless network reflects the current status of each corresponding cell with respect to different cell status categories, and is used to determine adjustment of one or more configuration parameters of each corresponding cell, for improving cell performance. In one embodiment, domain expertise, knowledge and experience are used to determine what actions to take to adjust the cells' configuration parameters based on the combinations of labels.

In some embodiments, blames are assigned to the plurality of cells based on the MRs, and the configuration parameters of the plurality of cells are adjusted according to the blames. Blames are associated with MRs that do not satisfy a pre-defined set of performance criteria, which are referred to as bad or unsatisfactory MRs, and indicate responsibilities that one or more cells should take for the bad MRs. In one embodiment, bad MRs are identified from the collected MRs, and each bad MR is associated with one unit of blame. For each bad MR identified in the wireless network, fractional units of blame are assigned to responsible cells. If one cell is fully responsible for a bad MR, the cell is assigned a unit of blame. Thus the joint impacts of cell performance issues, such as problems related to coverage, quality or interference, resulted from cell's configuration is captured into the blames assigned to the cell corresponding to bad MRs in the wireless network. Blames assigned to each of the plurality of cells are used to determine adjustment of one or more configuration parameters of each corresponding cell, in order to improve status of each corresponding cell. In one embodiment, domain expertise, knowledge and experience are used to determine what actions to take to adjust the cells' configuration parameters based on the blames assigned to the cells.

In some embodiments, blames are classified into different blame categories for determining configuration parameter adjustment of the cells. The different blame categories indicate different manners to adjust one or more configuration parameters of the cells in order to reduce the values of blames. In one embodiment, a blame is classified into an up-blame or a down-blame, indicating an increase or a decrease of a configuration parameter is needed in order to reduce the blame value. In one embodiment, blames assigned to each of the cells are classified into an up-blame or a down-blame, and a sub-total up-blame value and a sub-total down-blame value are calculated by summing all up-blames and all down-blames, respectively, assigned to each corresponding cell. In one embodiment, the sub-total up-blame value and the sub-total down-blame value of a cell are used to calculate an up-action probability and a down-action probability of the cell. A configuration parameter of the cell may be increased when the up-action probability is greater than a first threshold, and may be decreased when the down-action probability is greater than a second threshold.

Figure 6:
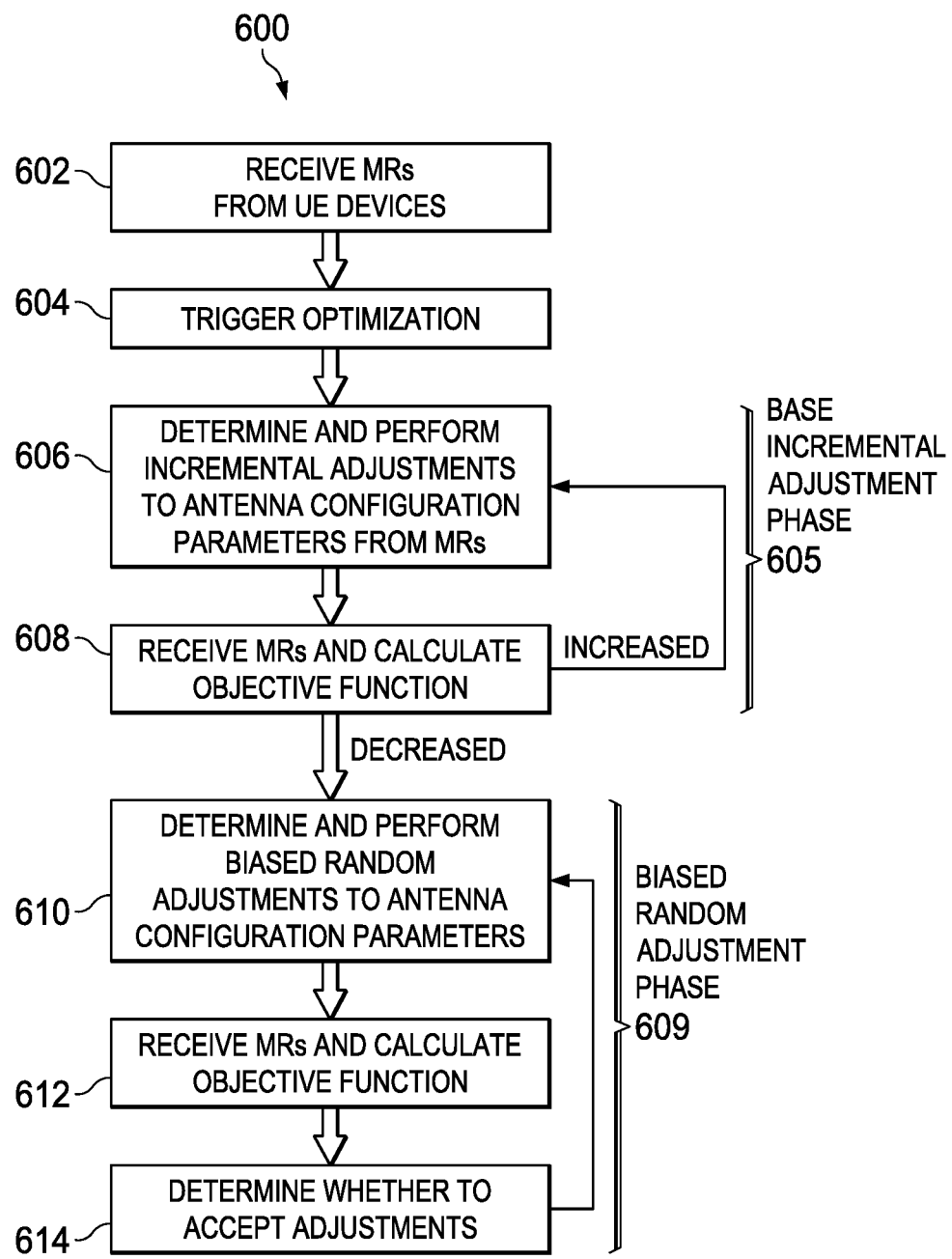
FIG. 6 illustrates an example process for optimizing cell specific antenna configuration parameters.

FIG. 6 shows a process 600 for optimizing performance in a network. In general, process 600 adjusts antenna configuration parameters incrementally online, jointly, and per cluster. Process 600 observes the resultant feedback from measurement reports (MRs) transmitted by UE devices and continues in a closed loop to optimize over the long run. Antenna configuration parameters include electronic tilt, azimuth, and reference symbol power. Feedback from actual UE devices is used in the form of MRs, as opposed to propagation model estimates. As known in the art, the MRs can include multiple UE-related and cell-related parameters, such as cell ID, reference signal received power (RSRP), reference signal received quality (RSRQ), serving cell ID, and timing advance parameters. The information in the MRs is used to update an objective function representing network performance, identify cell state indicator metrics/labels, and make step-wise antenna configuration parameter adjustments for performance progress. As known in the art, an objective function can be used for optimization of a measurable quantity, parameter, or feature, such as network performance. As used herein, the disclosed objective function can be used for optimization of network performance.

Process 600 does not need to know where UE devices are located within a network nor the exact antenna configuration parameter values in order to optimize performance. This contrasts with propagation model aided solutions (such as ACP) that require accurate user location and correct antenna configuration parameter values for each cell. Because correct configuration parameter values are not known, even if initial configuration parameters are erroneous, the antenna configuration parameter values can still be adjusted in a meaningful direction due to the fact that parameter changes lead to measurable change in cell/system metrics. As long as MRs (including RSRP, RS-SINR RSRQ, or the like) from representative UE devices (e.g., UE devices selected by unbiased random sampling) are available for a given antenna configuration parameter change, the objective function can be evaluated accurately.

In the disclosed embodiments, every MR that is adjudged to have "failed" a coverage criterion (e.g., by virtue of a reported reference channel signal strength not meeting a pre-defined threshold) or a quality criterion (e.g., by virtue of a reported reference channel quality, i.e., signal to interference plus noise, not meeting another pre-defined threshold) assigns a notional unit of "blame" for such failure to a "responsible" cell or cells. If multiple cells are held responsible, fractional units of "blame" (or "shares of blame") are assigned to each responsible cell. When aggregated over all "failed" MRs, blame metrics can be calculated for each cell, and a base incremental action (e.g., antenna tilt or transmit power adjustment) can be taken by the cell in accordance with such blame metrics in order to reduce the rate of occurrence of MR failures.

Process 600 employs two closed loop phases—a base incremental adjustment phase 605 and a biased random adjustment phase. In the base incremental adjustment phase 605, cell level features or blame metrics are calculated from the MRs and, alternatively or in addition, cells are labeled according to a coverage, quality, interference, or overshooter state (described in greater detail below with respect to FIGS. 4A-4E) that map to "intuitively correct" adjustment directions for the antenna configuration parameters based on domain knowledge applied simultaneously on multiple cells in order to quickly grab big initial gains. Embodiments for determining cell states are described in greater detail later in this disclosure. MRs are processed to derive cell level metrics accounting for every cell's share of blame for measurement reports indicating inadequate coverage or quality. The cell level metrics determine what base incremental adjustments are made to that cell's antenna configuration parameters. Alternatively or in addition, MRs are processed to derive intuitive cell labels or combinations of cell labels indicating any of coverage, quality, interference, and overshooter state of each cell. The one or more labels attached to a cell determine the base incremental adjustments made to that cell's antenna configuration parameters.

The biased random adjustment phase represents a mathematical search procedure that performs explorative techniques and chooses oppositional or random initial directions. Adjustments are accepted when the objective function is improved and accepted with decreasing probability as the objective function worsens and with passage of time (cooling) to steadily improve the solution. Over time, exploration direction can be conditioned to learn from mistakes and, in a later explorative pass, the action learned to be best (in the sense of maximizing instantaneous or cumulative rewards) for a given cell state is chosen. The key facts being exploited are that the system objective function and cell level metrics are aggregations of UE state information (MR) that don't require individual UE locations for evaluation, and that parameter changes matter but not the absolute value.

Process 600 begins at block 602 with the receipt of MRs from UE devices. Initiation of the optimization process is triggered at block 604. Optimization may be triggered manually, by network conditions, or automatically based on key performance indicators (KPIs) within a network. Examples of KPIs include call drop rate and call block rate. Other KPIs are known to those of skill in the art. If analysis of KPIs identify a degradation in network performance, then optimization is triggered. Upon triggering of optimization, process 600 proceeds to the base incremental adjustment phase 605, which includes blocks 606 and 608.

In the base incremental adjustment phase 605, MRs are used in block 606 to determine a direction of adjustment to the antenna configuration parameters (i.e., whether to adjust an antenna configuration parameter up or down). Only the direction of change is determined and not the specific current or starting values of the antenna configuration parameters. The direction of adjustment may be determined in several ways. In one example, the direction of change for each antenna configuration parameter is determined by a blame action metric where a majority rule of UE devices provide MRs indicating a certain change in a direction (up or down) for a respective parameter. In another example, each cell is labeled with a cell state based on the MRs received from UE devices. A cell may be given one or more labels identifying a state of the cell, such as an interferer, non-interferer, good/weak coverage, good/weak quality, overshooter, and non-overshooter. Here, interference refers to downlink interference in the cell. These labels are typically determined based on a comparison with one or more thresholds. The exact determination of these thresholds is beyond the scope of this disclosure. The labels given to a particular cell determine the change in direction for the antenna configuration parameters associated with that particular cell.

After each change in the antenna configuration parameters of the cells, the objective function for network optimization is calculated upon receiving new MRs in block 608 to determine if network performance improves. The objective function is based on a coverage parameter such as RSRP and a quality parameter such as signal to interference and noise ratio of the reference signal (RS-SINR). The objective function is determined by identifying those MRs having their RSRP parameter greater than a first threshold value and identifying those MRs having their RS-SINR parameter greater than a second threshold value. In some embodiments, the objective function is calculated according to the equation:

$$k1*\text{number of (RSRP>threshold1)}+k2*\text{number of (RS-SINR>threshold2)},$$

where k1 and k2 are non-negative numbers that sum to 1.0 and are determined in advance, e.g., by a system user (such as a network engineer) or automatically in a configuration routine. As long as network performance improves as indicated by an increase in the objective function, process 600 will loop through the base incremental adjustment phase 605 in blocks 606 and 608.

Upon identifying a decrease in the objective function in block 608, the base incremental adjustment phase 605 ends and the biased random adjustment phase 609 including blocks 610, 612, and 614 begins. In the biased random adjustment phase 2609, simulated annealing is performed where random direction changes are made to the antenna configuration parameters and chaotic jumps are made to escape local minima positions in order to steadily improve the objective function toward a global optimum level. The biased random direction changes are accepted upon obtaining an improvement in the objective function. If the objective function decreases, a probability factor is used in determining whether to accept the random direction changes. Table I shows an example of a simulated annealing algorithm.

TABLE I

| | |
|---|---|
| 1. | Obtain initial solution S and position T |
| 2. | Determine C as the cost of S |
| 3. | Generate new solution S' |
| 4. | Determine C' as the cost of S' |
| 5. | Accept S' as the current solution S with probability p: $p = \exp[(C - C')/T]$ if $C' \geq C$; $p = 1$ if $C' < C$ |
| 6. | If equilibrium level has not been reached, go to 3. |
| 7. | Update position T |
| 8. | If termination criterion has not been reached, go to 3. |

In terms of the present disclosure, biased random adjustments are determined and performed in block 610. After the biased random adjustments have been made, new MRs are received and used to calculate the objective function in block 612. A determination is made as to whether to accept or discard the adjustments based at least on the recalculated objective function in block 614. If the biased random adjustments are discarded, alternative biased random adjustments may be determined when the process 600 returns to block 610. The biased random adjustment phase continues to loop through blocks 610, 612, and 614 and fine tune the parameters until a convergence to a global maximum is reached.

Figure 7:
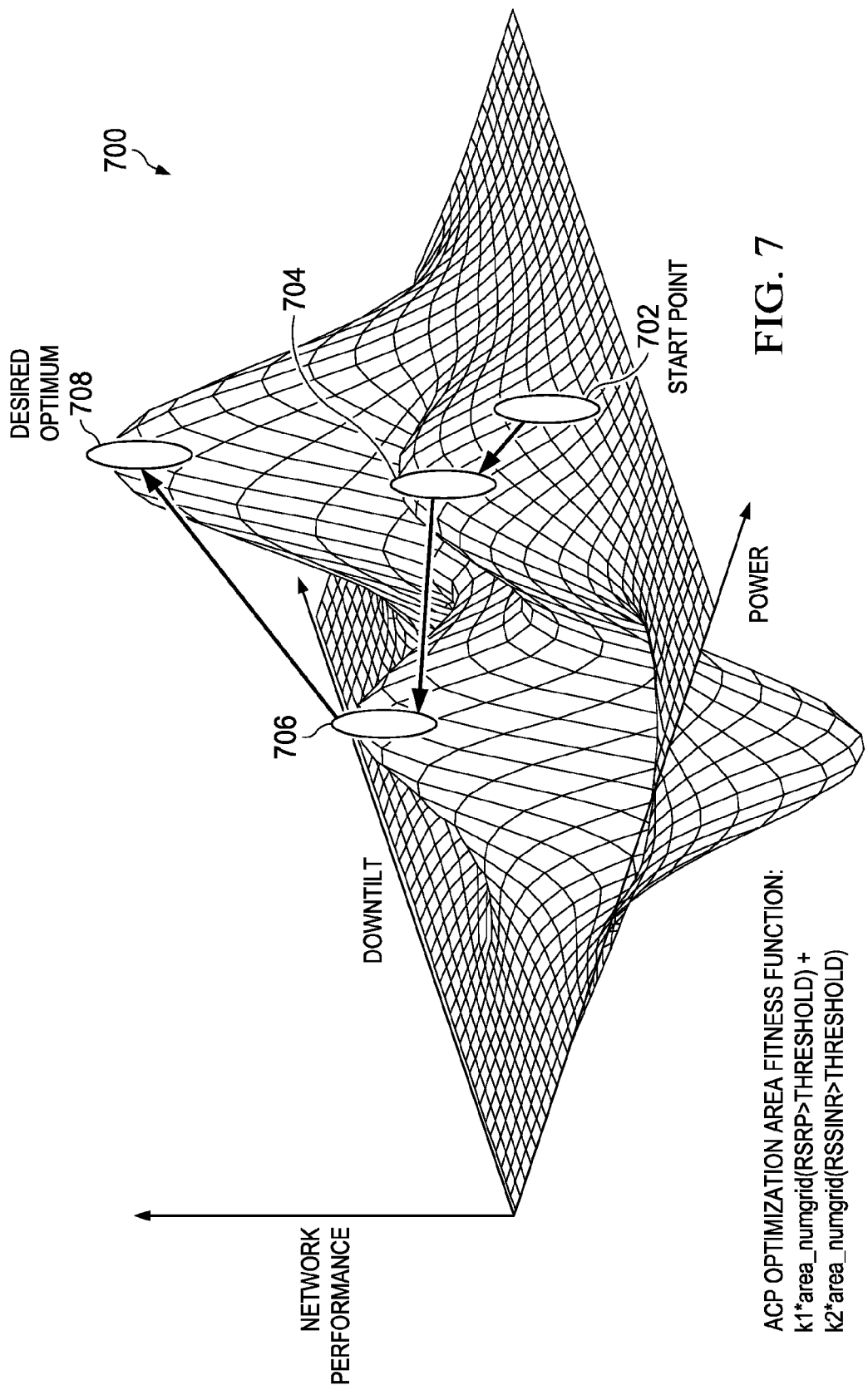
FIG. 7 illustrates a graph depicting network performance as a function of power and downtilt parameters.

FIG. 7 shows a graph 700 of how the antenna configuration parameters of power and downtilt affect network performance (as measured by the objective function). The goal of process 600 is to identify a desired optimum network performance level 708 from a starting point 702. Process 600 is not aware of the particular starting point 702. Iterating through the base incremental adjustment phase 605 will attain a first intermediate network performance level 704. The biased random adjustment phase will then kick in to perform chaotic jumps to identify the desired optimum network performance level 708, possibly through one or more second intermediate network performance levels 706.

As described above, an analytics assisted fully automatic closed loop self-organizing network provides a general framework for solving large scale near real time network optimization problems (SON use cases) The optimization process disclosed herein learns online the environment via real-time feedback of UE MRs and cell KPIs using machine learning analytics to assign actionable metrics/labels to cells. The optimizing process self-adapts internal algorithm parameters (like metric thresholds) to changing circumstances (data) and learns the correct action rule for a given cell in a given state. Domain expertise and sophisticated processes (explorative and learning based optimization) are combined in phases for deciding joint corrective actions. This approach contrasts to other approaches that use ad hoc engineering knowledge based rules and unreliable models. The optimization process is robust to engineering parameter database errors and lack of knowledge of UE locations and has minimal modeling assumptions in contrast to expensive and unreliable UE location based optimization techniques.

The optimization process is self-driving in that it uses machine learned cell labels or blame metrics with engineering knowledge guided small step actions to extract quick initial gains in network performance. For further optimization, action is taken in a biased random manner that balances reward with exploration risk. The optimization process learns from mistakes or wrong decisions with time to eventually pick a best action for a given cell state. As a result, the overall process is fast and outperforms engineers fazed by multi-cellular complex interactions. The optimization process provides a cost effective solution by reducing the need for an army of optimization engineers and expensive drive testing and model calibration. The optimization process may be readily extended to optimize additional CCO parameters like channel power offsets and CCO & Load Balancing (CCO+LB) scenarios. The optimization process works for diverse scenarios, including adapting to changes in the cellular network and traffic, and is readily transferable and scalable to other communication domains and deployments.

Determining Cell States to Adjust Antenna Configuration Parameters

The process for optimizing cell specific antenna configuration parameters described above can use various cell states to perform base incremental adjustments. Discussed below are embodiments for determining such cell states according to this disclosure.

Figure 8:
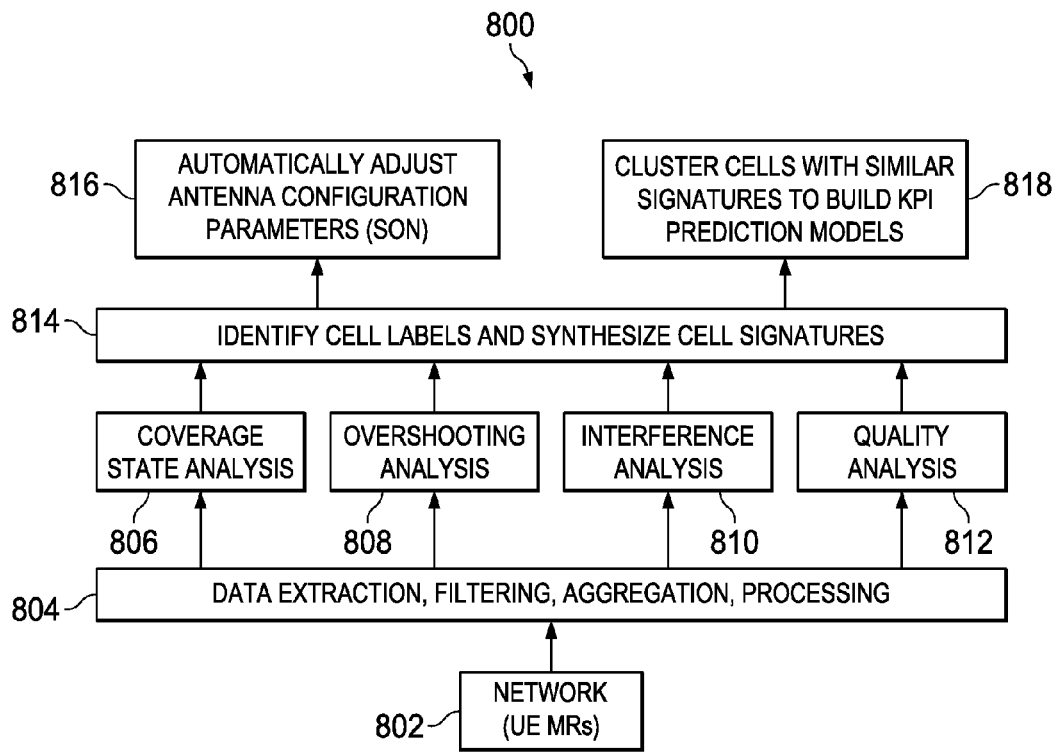
FIG. 8 illustrates an example process for determining cell states to adjust antenna configuration parameters.

FIG. 8 shows a process 800 for determining cell states to adjust antenna configuration parameters. Process 800 begins at block 802 where MRs are received over the network from UE devices. As described above, the MRs can include multiple UE-related and cell-related parameters, such as cell ID, reference signal received power (RSRP), reference signal received quality (RSRQ), serving cell ID, and timing advance parameters. Data extraction, filtering aggregation, and processing are performed on the MRs at block 804 to obtain values associated with network performance. Values analyzed for network performance include reference signal strength values such as RSRP used in a network, reference signal quality values, such as Reference Signal Signal-To-Interference-Noise Ratio (RS-SINR) or RSRQ for a network may also be included in the analysis effort.

Though discussed in terms of a network, process 800 may be implemented in other network types including a Universal Mobile Telecommunications System (UMTS) network. The reference signal strength values in a UMTS network can include a Received Signal Code Power (RSCP) or Energy per Chip and Interference Level (Ec/Io). Other values derived from the MRs may also be used in the cell state determinations. Though MR information and especially periodic MR information offer the best sampling of the network, other sources of network data may be used including, but not limited to, channel quality indicator (CQI), key performance indicators (KPI), Performance Monitoring (PM) counters, and key quality indicator (KQI) metrics.

The values derived from MRs transmitted by UE devices are used to perform several cell state determinations for each cell in the network. A coverage state analysis is performed at block 806 to determine whether the cell provides good or weak coverage. An example of such a coverage state analysis is described in detail below with respect to FIGS. 9-11B. An overshooting analysis is performed at block 808 to determine whether the cell is an overshooter or a non-overshooter. An interference analysis is performed at block 810 to determine whether the cell is an interferer or non-interferer. A quality analysis is performed at block 812 to determine whether the cell is of good or bad quality. At block 814, cell labels are identified from the cell state determinations and each cell synthesized by combining the set of cell state labels assigned to the cell to create a cell signature.

The cell signature (i.e., the combination of cell labels) for each cell may be used in block 816 to automatically perform adjustments to the antenna configuration parameters in order to optimize for coverage, quality, and capacity, making use of domain knowledge for actions. For example, a network component may instruct a cluster of cells to adjust their cell configuration parameters (e.g., their antenna tilts, transmit power, or both) based on the cell signature assigned to each cell. As a particular example, if a cell is labeled as "good" coverage and "bad" quality, the transmit power of the cell may be increased. In another example, if a cell is labeled as "good" coverage and "strong" interference, the antenna tilt and/or transmit power of the cell may be decreased. In some embodiments, a combination of labels assigned to each cell and the current antenna tilt and/or RS power level of each corresponding cell are used to determine cell configuration adjustment. In the example where the cell is labeled as "good" coverage and "strong" interference, if the current antenna tilt level of the cell is "small", then the antennal tilt of the cell may be decreased by a small amount, which is a pre-defined level of antenna tilt amount. In some embodiments, the network component may map a combination of the status labels assigned to a cell and the current antenna tilt and/or RS power levels of the cell to an action and assign the action to the cell. An action represents a change of one or more of a cell's configuration parameters, such as increase or decrease of the antenna tilt and/or RS power of the cell. An action may be assigned based on domain knowledge, experience or expertise in consideration of status labels assigned to a cell, current configuration of the cell, and other factors that may affect its cell status.

In some embodiments, instead of a network component controlling automatic adjustments, the adjustments may be performed semi-automatically by providing the cell signatures to field optimization engineers to guide them in making adjustments to the antenna configuration parameters in the correct direction.

In addition, cells with similar signatures may be clustered in block 818 to build KPI models for predictive analysis. In general, KPI predictive models are algorithms that identify which KPIs are likely to be a root cause of a poor key quality indicator (KQI), such as packet loss rate. For example, in the context of Coverage Capacity Optimization (CCO), antenna uptilt may be increased when a poor KQI is associated with an RSRP level, as that would indicate the root cause is poor coverage, while antenna downtilt may be increased when a poor KQI is associated with interference, as that would indicate the root cause is poor coverage. KPI predictive models for groups of similar cells can predict network performance given predictors such as traffic and resource consumption variables. KPI predictive models may also predict gains/losses due to the application of a new feature on a given type or group of cells. KPI predictive models are built based on actual historic/field trial data and have demonstrated value for use in feature recommendations, analysis, and improvement. Additional information regarding KPI predictive models can be found in commonly-owned U.S. patent application Ser. No. 14/810,699 filed Jul. 28, 2015, the contents of which are incorporated herein by reference. Cell labels and signatures generated from MRs transmitted by UE devices offer a way of grouping like cells to pool data together in building more powerful predictive analytics models.

Figure 9:
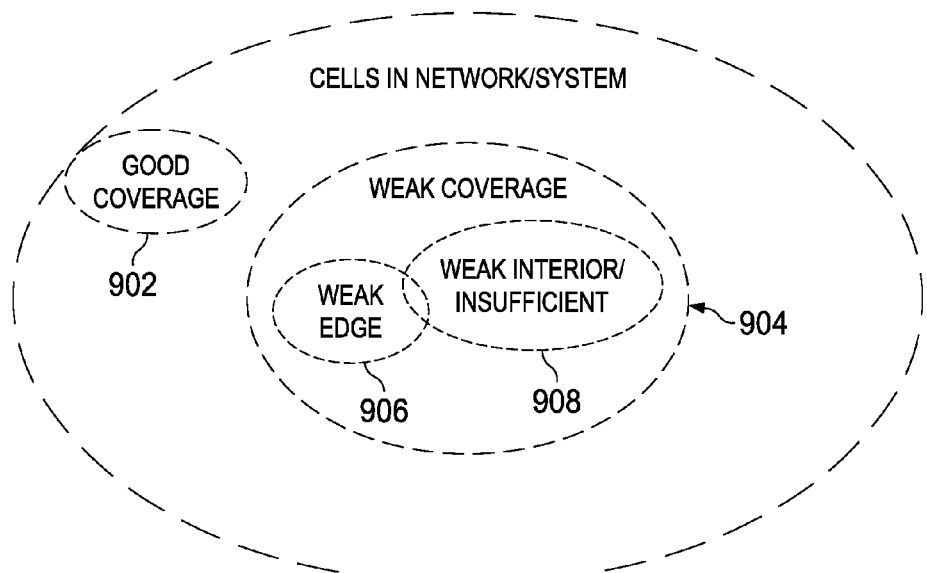
FIG. 9 illustrates the coverage states that can be assigned to a cell.

FIG. 9 shows the coverage states that can be assigned to a cell as determined in block 806 of FIG. 8. A cell may have a state of good coverage 902 or weak coverage 904. If a cell is considered in a weak coverage state 904, the cell may be further assigned a weak edge state 906 or a weak interior/insufficient state 908. A cell assigned a weak coverage state 904 may also be assigned both a weak edge state 906 and a weak interior/insufficient state 908. In addition, it is possible that a cell assigned a weak coverage state 904 may not be considered either in a weak edge state 906 or a weak interior/insufficient state 908. The assignment of a cell to a weak coverage state 904, a weak edge state 906, and/or a weak interior/insufficient state 908 is based on RSRP values in MRs transmitted by UE devices 104. Of course, the coverage states 902-908 shown in FIG. 9 are merely one example. In other embodiments, there may be additional, intermediate coverage states. For example, there may be one or more additional weak coverage states based on ranges of RSRP values.

Figure 10:
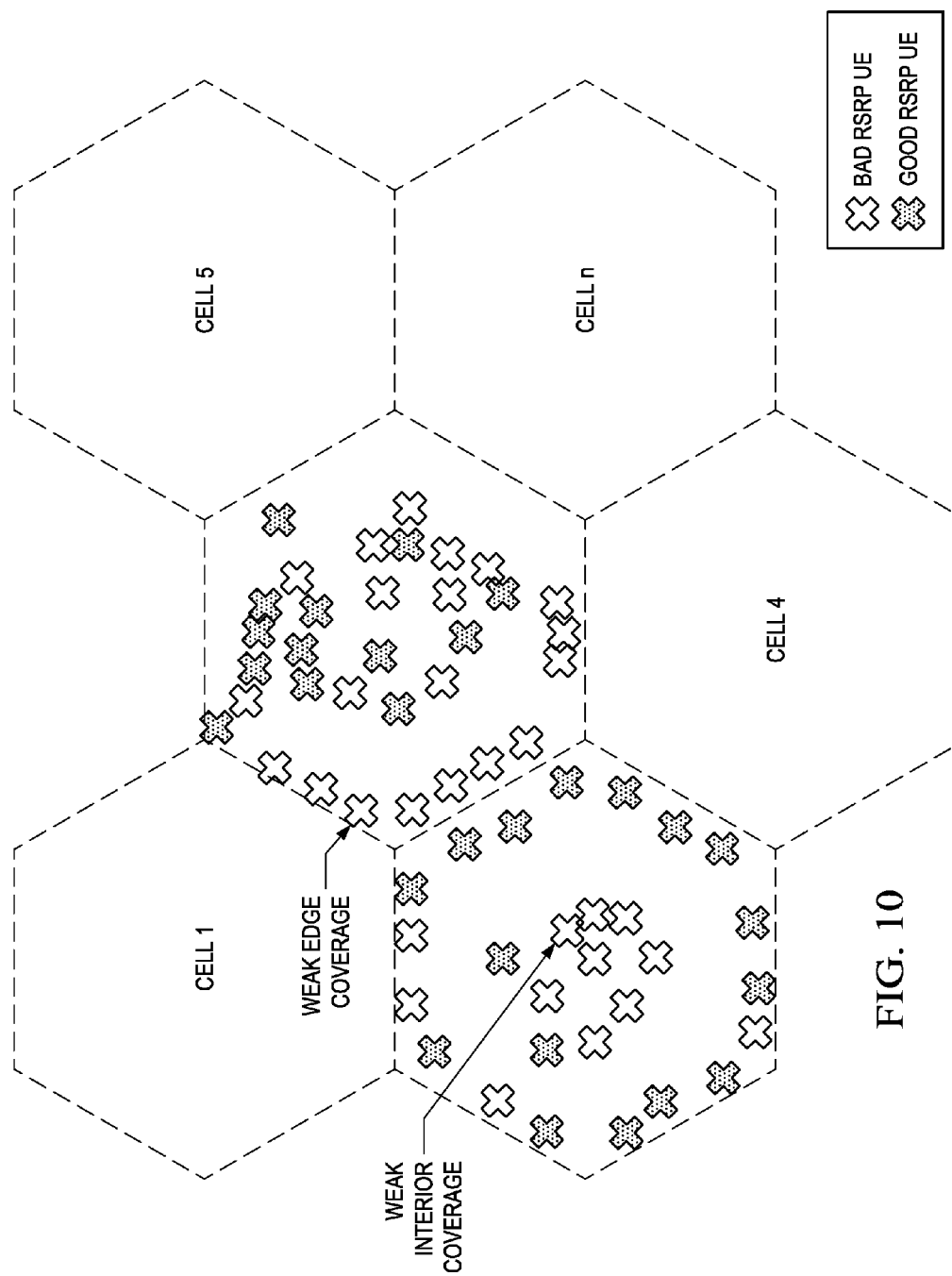
FIG. 10 illustrates additional coverage states of a weak edge state and a weak interior/insufficient state that can be assigned to a cell.

FIG. 10 shows an example of how a cell may be considered in a weak edge state 906 and/or a weak interior/insufficient state 908. A cell in a weak edge state 906 has a certain number/percentage of UE devices that it serves with corresponding RSRP values below a coverage threshold. In addition, a cell in weak edge state 906 has a certain number/percentage of UE devices that it serves with RSRP values associated with one or more neighboring cells within a coverage reference range of an average RSRP value for the cell. In this scenario, a UE device with a low RSRP value corresponding to the best serving cell coupled with a high enough RSRP value associated with a neighboring cell is most likely located near the edge of coverage provided by the best serving cell.

To be considered in a weak interior/insufficient state 908, the cell has a certain number/percentage of UE devices that are served by the cell RSRP values below a coverage threshold. In addition, these UE devices do not report a RSRP value associated with a neighboring cell that is within the coverage reference range. A UE device with a low RSRP value for the best serving cell coupled with no significant RSRP value for a neighboring cell is most likely located near the interior of the cell.

Figure 11A:
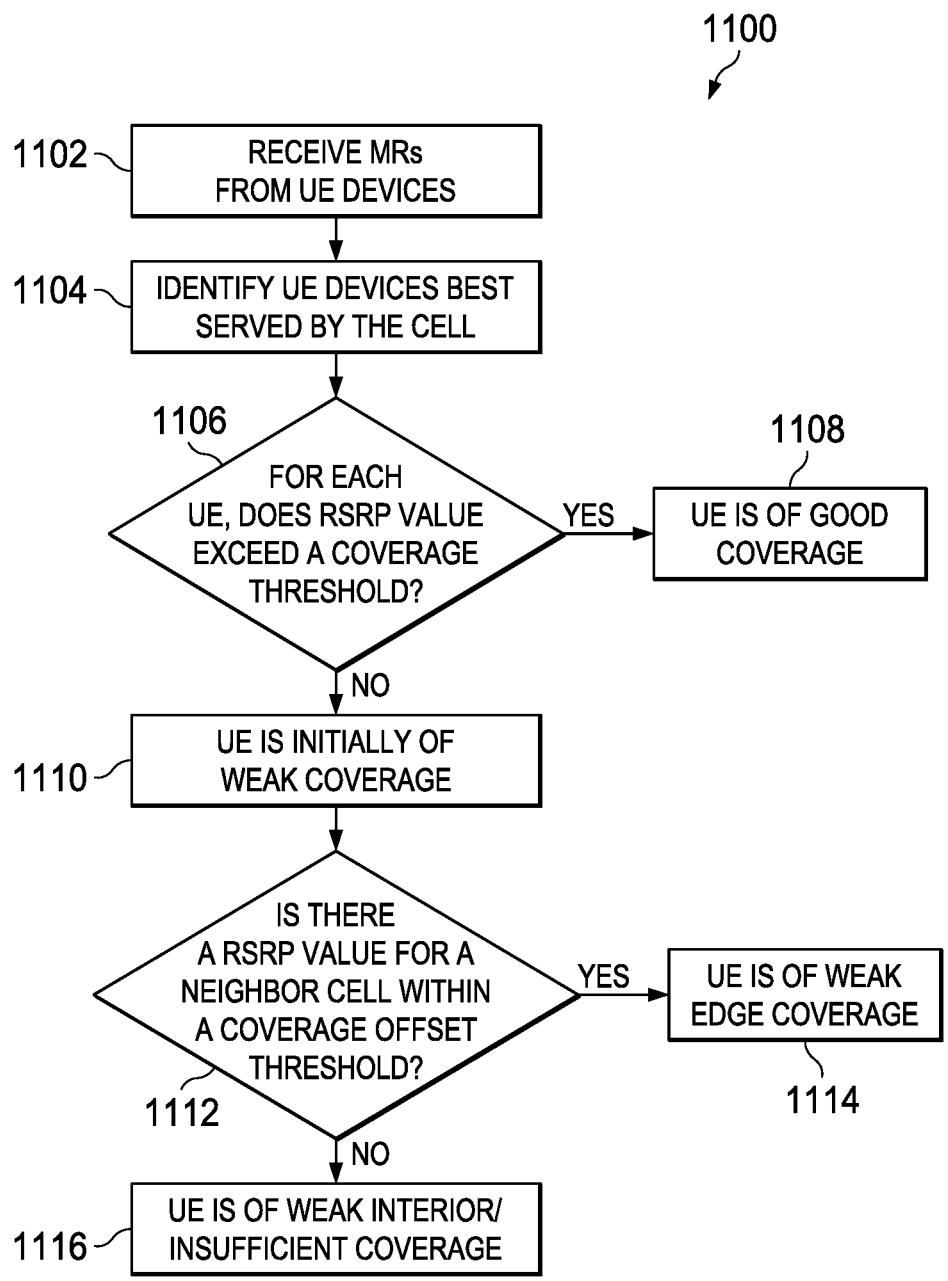
FIGS. 11A-11B illustrate a process for determining the coverage state for a cell.
Figure 11B:
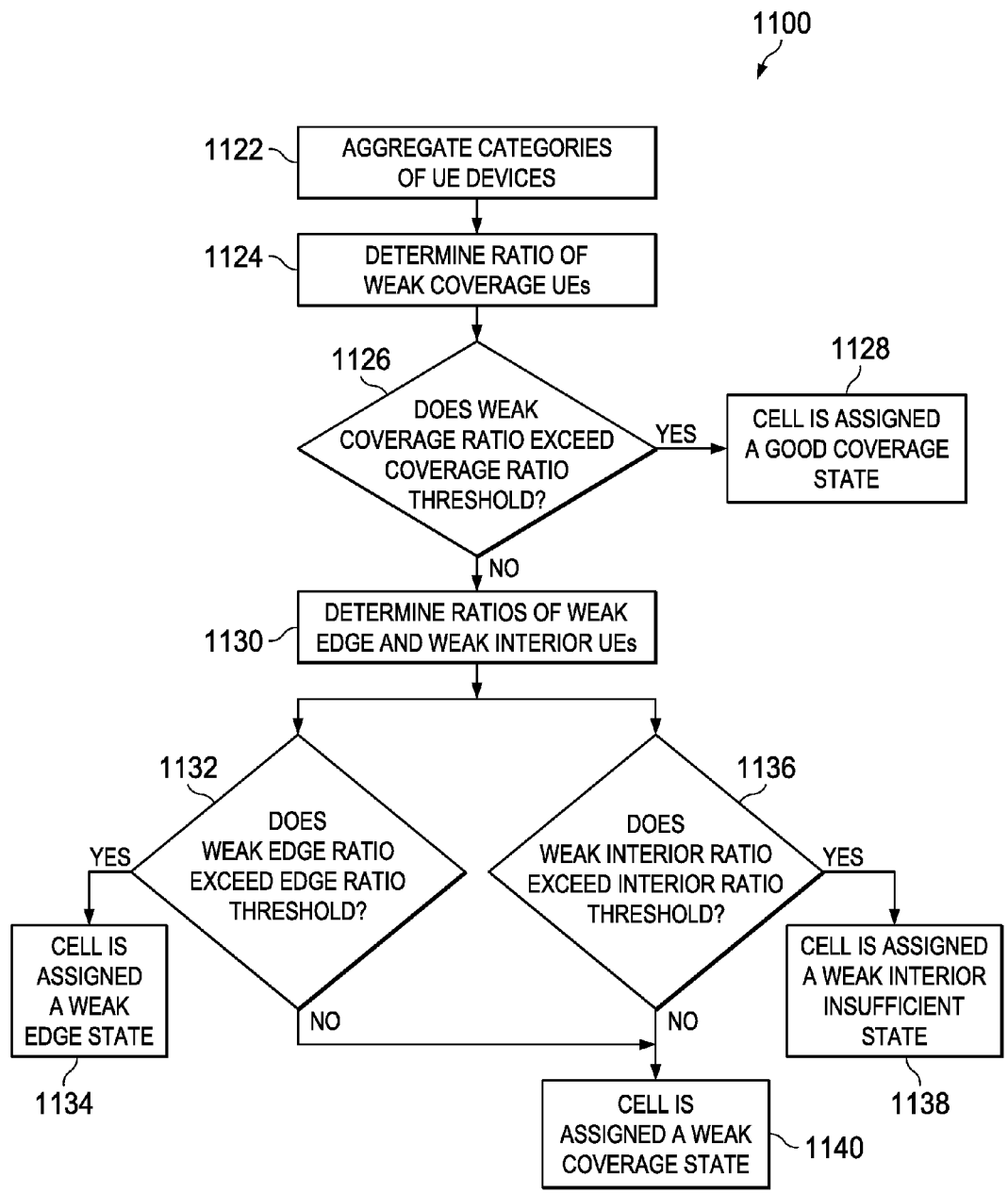

FIGS. 11A-11B show a process 1100 for determining a coverage state for a cell. In FIG. 11A, process 1100 first performs individual analysis of each UE device best served by the cell and categorizes each UE device as one of good coverage or weak coverage. Those UE devices of weak coverage are further categorized as being of weak edge coverage or weak interior/insufficient coverage. In FIG. 11B, process 1100 then aggregates the categories of the UE devices, determines ratios of UE devices belonging to the cell with weak coverage, and compares the ratio to thresholds in order to assign a coverage state to the cell.

In FIG. 11A, process 1100 begins at block 1102 with the receipt of MRs from UE devices. From the MRs, those UE devices best served by the cell are identified in block 1104. For each UE device, the RSRP value from the MR corresponding to the cell is compared to a coverage threshold value in block 1106. If this RSRP value exceeds the coverage threshold, the UE device is assigned to a good coverage category at block 1108. If this RSRP value does not exceed the coverage threshold value, the UE device is initially assigned to a weak coverage category at block 1110. At block 1112, the RSRP values associated with neighbor cells in the MR of the UE device are compared to a coverage offset threshold range. If at least one RSRP value associated with a neighbor cell is within the coverage offset threshold range, the UE device is assigned to a weak edge category at block 1114. If there are no RSRP values associated with neighbor cells within the coverage offset threshold range, the UE device is assigned to a weak interior/insufficient category at block 1116. Unlike a cell that can be assigned to either, both, or neither of a weak edge state and a weak interior/insufficient state, a UE device of weak coverage is categorized as only one of weak edge or weak interior.

In FIG. 11B, process 1100 continues at block 1122 with the aggregation of the categories for the UE devices determined in FIG. 11A. At block 1124, a ratio of weak coverage UEs is determined from the aggregation. The ratio of weak coverage UEs is compared to a coverage ratio threshold at block 1126. If the ratio of weak coverage UEs does not exceed a coverage ratio threshold, then the cell is assigned a good coverage state at block 1128. If the ratio of weak coverage UEs does exceed the coverage ratio threshold at block 1126, the ratios for weak edge UEs and weak interior/insufficient UEs are determined at block 1130. At block 1132, the ratio of weak edge UEs is compared to an edge ratio threshold. If the ratio of weak edge UEs exceeds the edge ratio threshold, then the cell is assigned to a weak edge state at block 1134. In addition, the ratio of weak interior/insufficient UEs is compared to an interior ratio threshold at block 1136. If the ratio of weak interior/insufficient UEs exceeds the interior ratio threshold, then the cell is assigned to a weak interior/insufficient state at block 1138. If neither the ratios of weak edge UEs nor weak interior/insufficient UEs exceed their respective ratio thresholds, the cell is assigned a weak coverage state in block 1140.

Figure 12:
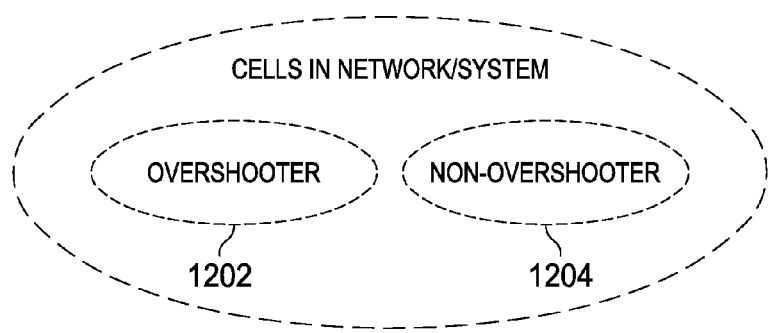
FIG. 12 illustrates the overshooting states that can be assigned to a cell.

FIG. 12 shows the overshooting states that can be assigned to a cell as determined in block 808 of FIG. 8. A cell may be assigned an overshooter state 1202 or a non-overshooter state 1204. A cell may be considered to be in an overshooter state 1202 if its associated RSRP value in a MR of a UE device served by a distant cell in another region ranks within a certain number of top RSRP values for the distant cell.

Figure 13:
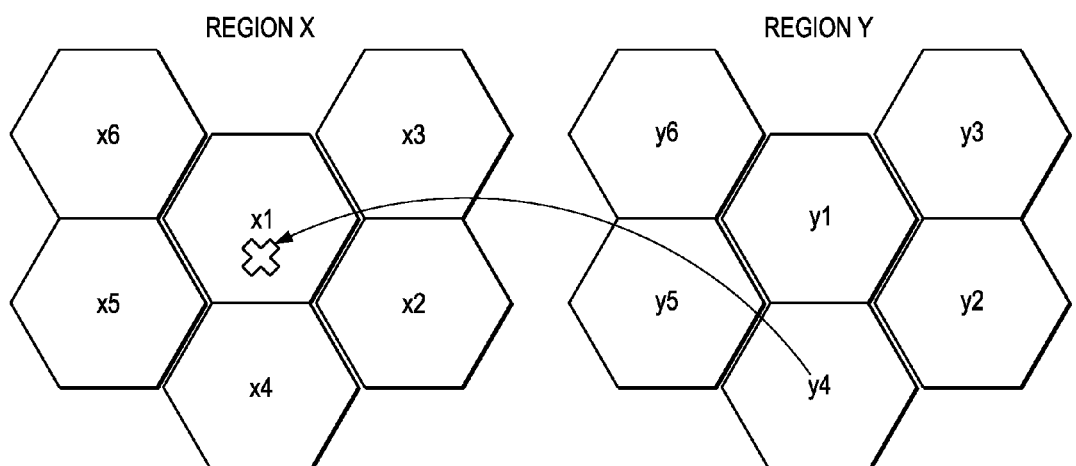
FIG. 13 illustrates an example of a cell in an overshooter state.

FIG. 13 shows an example of a cell in an overshooter state. UE device located in and best served by cell x1 of Region X transmits a MR to eNB radio access node providing coverage for cell x1. Note that the exact location of UE device is unknown and does not need to be known. The parameter values in the MR transmitted by UE device provide an indication that UE device is served by cell x1 which is all that is needed for analysis purposes. The parameter values in the MR transmitted by UE device may indicate a potential overshooter cell. In this example, cell y4 of Region Y may potentially be in an overshooter state. Cell y4 may be in an overshooter state if a RSRP value associated therewith is in a certain top number of reported RSRP values and/or within a certain threshold of the RSRP value corresponding to cell x1. For example, a MR report transmitted by UE device in cell x1 includes multiple RSRP values associated with different cells. Table II shows a ranked list of the top six RSRP values reported by UE device in its MR.

TABLE II

| RSRP Value Rank | Cell |
|---|---|
| 1 | x1 (overshootee) |
| 2 | x2 |
| 3 | x3 |
| 4 | y4 (overshooter) |
| 5 | x4 |
| 6 | x5 |

Cell y4, being in Region Y, is relatively far away from cell x1 as compared to the other cells in Region X. Typically, a cell that is relatively far away would not tend to be ranked near the top of the RSRP value list. Thus, it would be typical for cell y4 to be ranked much lower in Table II (e.g., at least below cells x4 and x5, which are much nearer to cell x1). By being in the top six of RSRP values for UE device, cell y4 is a potential overshooter. In addition, a UE device is considered in an overlapped state if a pair of cells appears in the top k values of the RSRP value list determined from the transmitted MR and/or the difference between RSRP values is less than a certain threshold. An example threshold value is 3 dB, though any threshold value may be used as desired. Consideration of multiple overlapped UE devices in an area or network is given to identify potential overshooters as overshooters or not overshooters, which will now be described.

Figure 14:
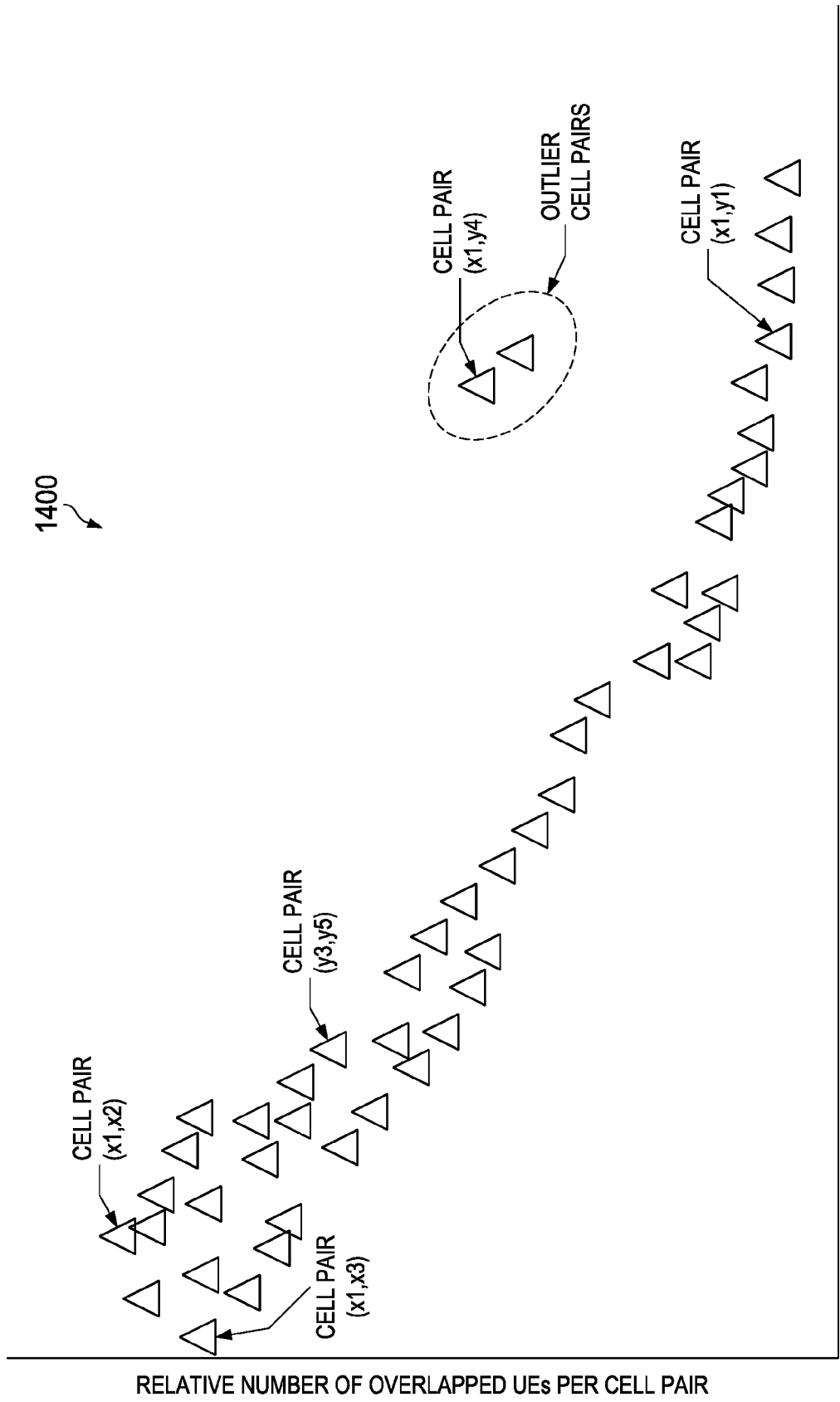
FIG. 14 illustrates a graph depicting a relationship between overlapped UE devices and overshooting identification.

FIG. 14 shows a graph 1400 depicting a relationship between overlapped UE devices and overshooting identification. Each point in graph 1400 is a cell pair where the distance between cells in a cell pair increases along the y-axis. Ideally, a larger inter site distance between cells in a cell pair should lead to less overlapped UE devices for the cell pair. A relatively high number of overlapped UE devices exist for cell pair x1,x2; cell pair x1,x3; and cell pair y3,y5, which is expected since there is a relatively short distance between the respective cells of each cell pair. A relatively low number of overlapped UE devices exist for cell pair x1,y1 and cell pair x1,y2 as there is a relatively large distance between the cells of each cell pair.

Outlier cell pairs from the norm indicate an overshooter potential. The outlier cell pairs, such as cell pair x1,y4, have an abnormally high number of overlapped UE devices as compared to cell pairs of a similar inter site distance. Identification of an outlier cell pair indicates that at least one cell in the cell pair may be in an overshooter state. Thus, cells x1 and y4 are both overshooter candidates; however, it is not clear just from looking at FIG. 14 if cell x1 is the overshooter and cell y4 is the overshootee, or if cell y4 is the overshooter and cell x1 is the overshootee. To determine the overshooter among the overshooter candidates, the ranked RSRP value lists such as shown in Table II are also considered. From Table II, it can be seen that cell y4 is a candidate for an overshooter state as its associated RSRP value is in an unexpected position in the RSRP value list of a UE device being served by cell x1 in a different region than cell y4. However, an examination of a similar RSRP value list of a UE device being served by cell y4 may reveal that cell x1 is not in an unexpected position in the RSRP value list. For example, cell x1 may rank below all of the cells y1-y6 and rank among the cells x1-x6, as would be expected if cell x1 is not an overshooter. Thus, by examining RSRP values lists for UE devices served by cell x1 and UE devices served by cell y4, it can be determined that cell y4 is an overshooter and cell x1 is not an overshooter.

Figure 15:
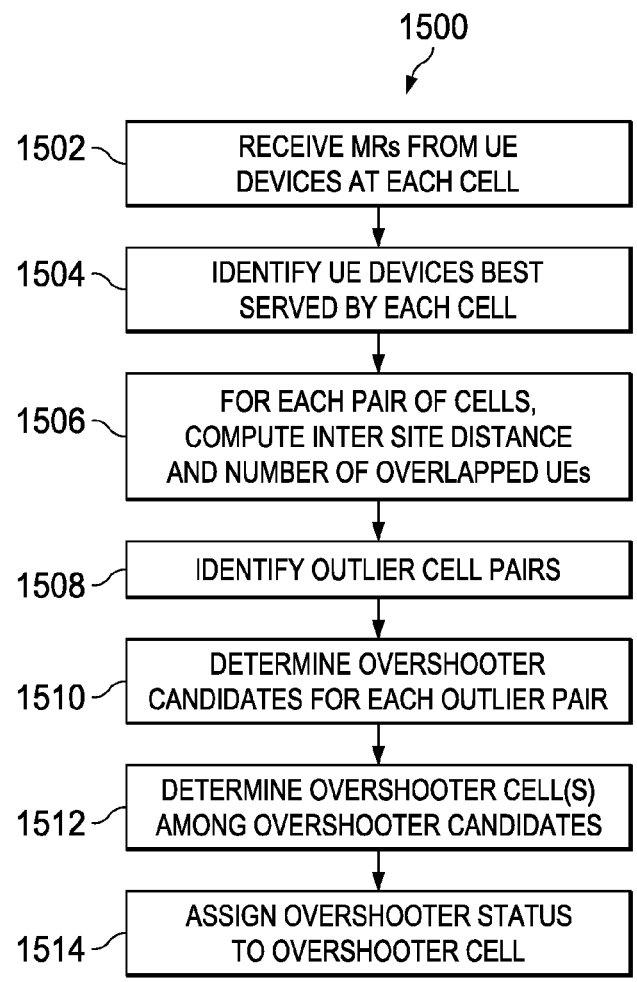
FIG. 15 shows a process for determining an overshooter state of a cell.

FIG. 15 shows a process for determining an overshooter state of a cell. Process 1500 begins at block 1502 with the receipt of MRs from UE devices for each cell. From the MRs, those UE devices best served by each cell are identified in block 1504. Cells are then paired up with every other cell at block 1506 and an inter site distance and number of overlapping UE devices are computed for each cell pair. Inter site distance may be normalized by the median inter site distance of a cell with its top neighbors. Normalization may be performed by dividing the inter site distance of a reference cell (such as x1) in the pair to its top n closest tier neighbor cells. Normalization is performed to standardize a picture across cells and create a global database of real world or well simulated examples. Outlier cell pairs are then identified in block 1508. An outlier cell pair may have an abnormal number of overlapping UE devices in relation to the inter site distance between the cells in the cell pair. For each outlier pair, the overshooter candidate cells are determined at block 1510. Then, in block 1512, the overshooter(s) among the overshooter candidates are determined by examining ranked lists of RSRP values. For example, as described above, the overshooter cell will have its associated RSRP value near the top of the RSRP values of the other cell in the outlier cell pair. The overshooter state is assigned to the overshooter cell in block 1514.

In accordance with another embodiment, an algorithm for determining an overshooter state will now be described. The algorithm uses quantities termed NO, Serving_Radius( ) and Planned_Radius( ) which are defined as follows.

N(s) is the set of all neighbor cells in an "estimated" neighbor list of a given serving cell s. The set N(s) can be inferred or estimated (either making use of cell azimuth information or without it) based on information extracted from one or more MRs. At a later point in the algorithm, N(s) can also be used to calculate a feature normalization factor, which is the sum of all MRs served by cell s and its neighbors.

Serving_Radius(s,o) maps one or more topology parameters involving a pair of cells (serving cell s and neighbor cell o) to a radius of serving cell s in the direction of cell o.

Planned_Radius(s) of a cell s is the average or median of Serving_Radius(s,o) over a predetermined most-related subset of cells o in the neighbor list of s, i.e., all o in N(s).

The algorithm performs overshooter detection as follows. In one or more cell-level variables for cell c, a counter for the algorithm counts the following values:

(1) The number of MRs served by a cell c with bad serving cell RSRQ (e.g., worse than T3 dB) and with no other significant overlapping cells (i.e., RSRPs in the MR list that are within T2 dB of the serving cell) that are "far away," as determined by the TA distance from c. Here, T3 is a predetermined RSRQ threshold separating good RSRQ of an MR (for the serving cell) from bad RSRQ and may be in a range of, e.g., [−20,0]. T2 is a predetermined RSRP offset to determine whether a pair of cells have significant overlap in an MR and may be in a range of, e.g., [9, 20]. TA distance is a parameter that is found in the MR and represents an estimated distance of a UE device that submits the MR from its serving cell.

(2) The number of MRs served by cell c with bad serving cell RSRQ (e.g., worse than T3 dB) and other significant overlapping cells present that are "far away" in terms of TA distance from c and such that the number of significant "far away" non-neighbor overlapping cells form a significant fraction (e.g., larger than Tn threshold) of the total number of overlapping cells. Here, Tn represents a threshold of a proportion of neighbors to the total number of cells seen in an MR for overshooter detection. As this is a ratio of small integers, only certain quantized values (e.g., between 0 and 1) make sense as threshold choices.

(3) The number of MRs not served by cell c with bad serving cell RSRQ (e.g., worse than T3 dB) and in which cell c is a significant overlapper and also a "far away" non-neighbor of the serving cell (that itself has been judged to be "not far away" from the MR).

This counter is then normalized with a blame normalization factor of c (i.e., the number of MRs served by c and all of its neighbors) and compared with a threshold Tos. Here, Tos is a predetermined threshold and may be between 0 and 1.

The cell c is declared an overshooter if the normalized overshoot counter of cell c exceeds Tos AND the fraction of MRs served by cell c with respect to an analysis cluster average per cell exceeds Tosormintraf. Here, Tosormintraf is a predetermined threshold that represents a minimum fraction of traffic (i.e., served MRs of a cell/analysis cluster average of MRs per cell) that a cell must carry before it is eligible to be declared as an overshooter. This latter condition on cell c's traffic is for stable statistical inference purpose. It is noted that the "far away" judgment above for an MR is based on its TA distance ratio (with respect to the serving cell's planned radius) exceeding Factor1Upper. Here, Factor1Upper represents a predetermined threshold to compare the ratio of the TA based distance of MR to a planned radius of the serving cell and decide whether MR is far away.

Normalization of the counters using the total traffic (served MRs) of the serving cell s and its estimated neighbors N(s) is important to ensure the setting of standard thresholds invariant to traffic or the specific set of cells being analyzed.

Thresholds used for overshooting, such as Tos, can be learned by offline analysis of real field trial or market data. If labeled examples (by domain expert engineers) of overshooters are used to guide threshold setting, it is called supervised learning; otherwise it is called unsupervised learning (that looks at the groupings of the metrics and outliers to determine thresholds). Similarly, if automatic algorithms learn the thresholds, it is called machine learning.

Figure 16:
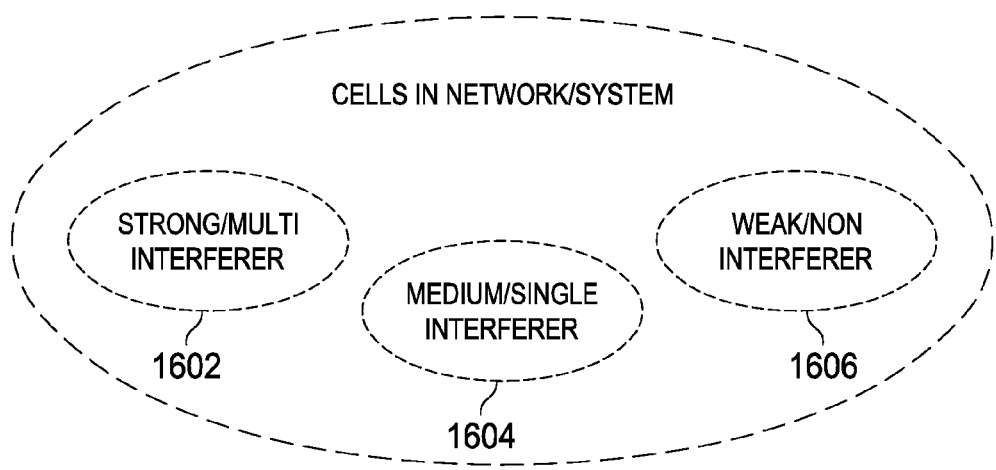
FIG. 16 shows the interference states that can be assigned to a cell.

FIG. 16 shows the interference states that can be assigned to a cell as determined in block 810 of FIG. 8. As shown in FIG. 16, a cell may be considered as being a strong/multi-interferer 1602, a medium/single-interferer 1604, or a weak/non-interferer 1606. Of course, this is merely one example. In other embodiments, there may be additional, intermediate interferer states between strong/multi-interferer 1602 and weak/non-interferer 1606 that represent differing levels of interference. A first cell may be an interfering cell to a second cell if a RSRP associated with the first cell in a MR of a UE device best served by the second cell is within a threshold range of an average RSRP reported by UE devices best served by the second cell.

Figure 17:
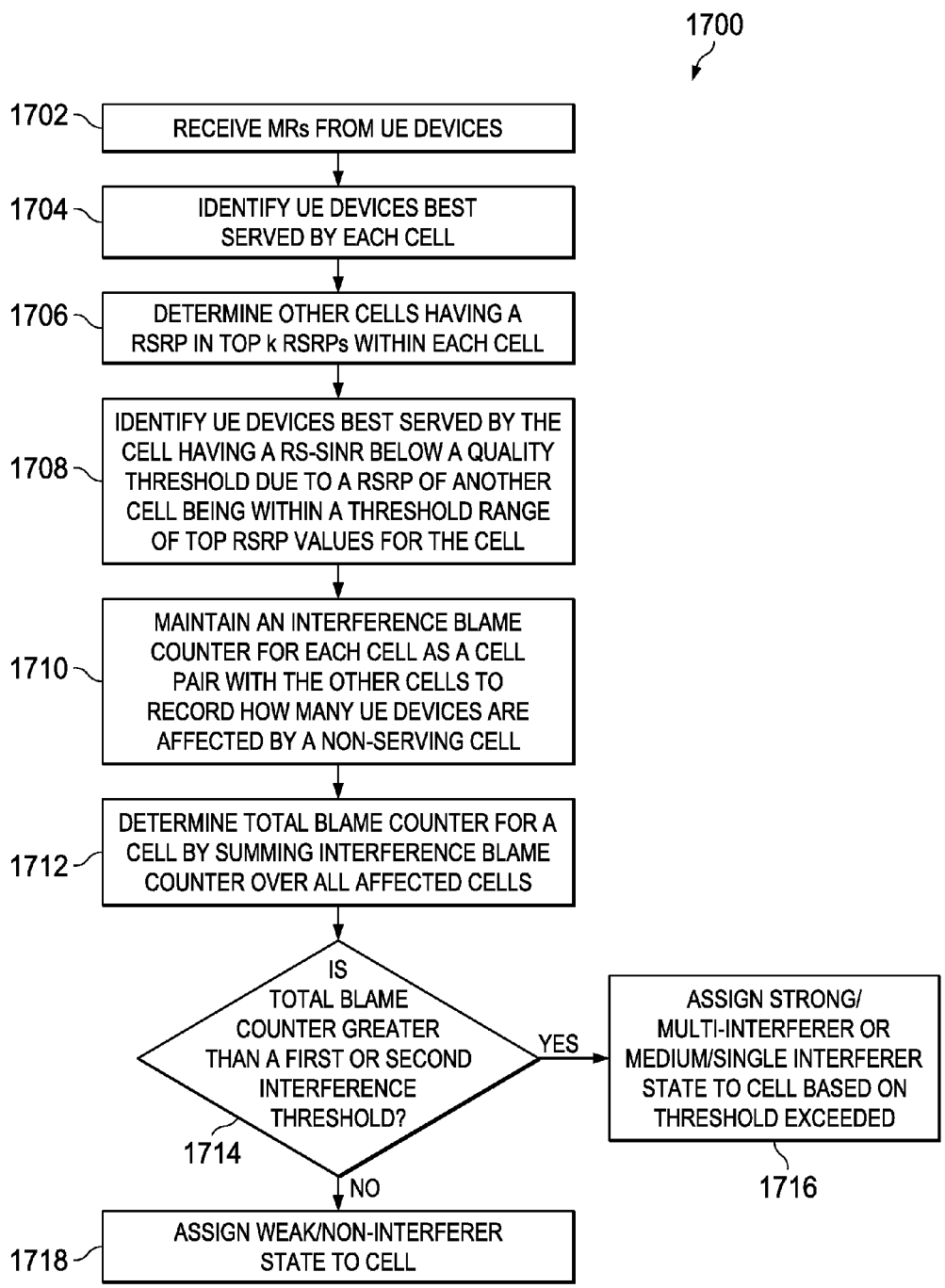
FIG. 17 shows a process for determining an interferer state of a cell.

FIG. 17 shows a process for determining an interferer state of a cell. Process 1700 begins at block 1702 with the receipt of MRs from UE devices for each cell. From the MRs, those UE devices best served by each cell are identified in block 1704. At block 1706, a determination is made in each cell if a RSRP associated with another cell is within a top k of RSRPs for the cell and/or within a reference range of an average RSRP in each cell. A cell having a RSRP within a top k of RSRPs for another cell may be an interferer to that cell. In block 1708, UE devices best served by each cell as having a RS-SINR below a quality threshold due to a RSRP of another cell being within a threshold range of top RSRP values for the cell are identified. An interference blame counter is maintained in block 1710 for each cell as a cell pair with the other cells to record how many UE devices are affected by a non-serving cell. A total blame counter for a cell is determined in block 1712 by summing interference blame counters over all affected cells. A check is made in block 1714 as to whether the total blame counter is greater than a first or second interference threshold. If the total blame counter is not greater than the first or second interference threshold, the cell is assigned a weak/non-interfering state at block 1716. If the total blame counter is greater than the first interference threshold but less than the second interference threshold, the cell is assigned a medium/single-interfering state at block 1718. If the total blame counter is greater than the second interference threshold, the cell is assigned a strong/multi-interferer state. The total blame counter may be normalized by the total number of UE devices served by all cells in the neighborhood of the cell being assigned an interferer state.

The embodiment of FIG. 17 described above is based on consideration of one interference feature or metric, namely the number of UE devices having an RS-SINR below a quality threshold. This is merely one example. In other embodiments, other or additional interference features may be used in the analysis, including a number of cells a particular cell affects significantly in terms of a number or percentage of affected UE devices or an average or median RSRP of a potential interferer cell MRs of UE devise served by neighbor cells. In some embodiments, multiple interference features may be considered against multiple corresponding thresholds. If multiple interference features are considered (each with a corresponding threshold), a clustering algorithm such as shown in FIGS. 3A-3E may be used to analyze the multiple interference features concurrently.

Figure 18:
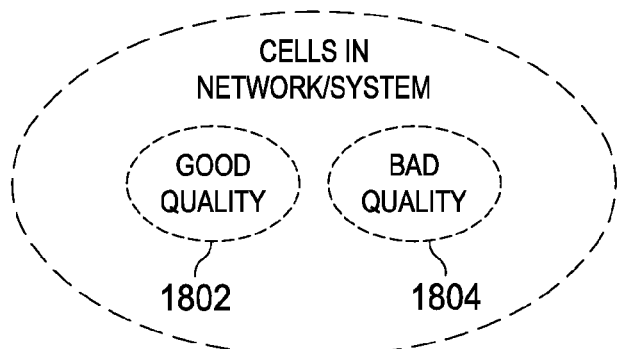
FIG. 18 shows the quality states that can be assigned to a cell.

FIG. 18 shows the quality states that can be assigned to a cell as determined in block 812 of FIG. 8. A cell may be considered as being of good quality 1802 or bad quality 1804. A particular cell with a certain percentage of good quality UE devices where the particular cell is the best server for the UE devices is assigned a good quality state. A particular cell with less than a certain percentage of good quality UE devices where the particular cell is the best server for the UE devices is assigned a bad quality state. A good quality UE device is one where the RS-SINR or RSRQ value is greater than a quality threshold value. The quality threshold may be fixed, dynamically adjusted, or learned in a supervised, semi-supervised, or unsupervised manner by correlating UE device RS-SINR or RSRQ against relevant key performance indicators (KPI) and key quality indicators (KQI) describing a UE device quality of experience (QoE). Of course, the quality states 1802-1804 shown in FIG. 18 are merely one example. In other embodiments, there may be one or more additional, intermediate quality states between good quality 1802 and bad quality 1804 based on intermediate thresholds of good quality UE devices.

Figure 19:
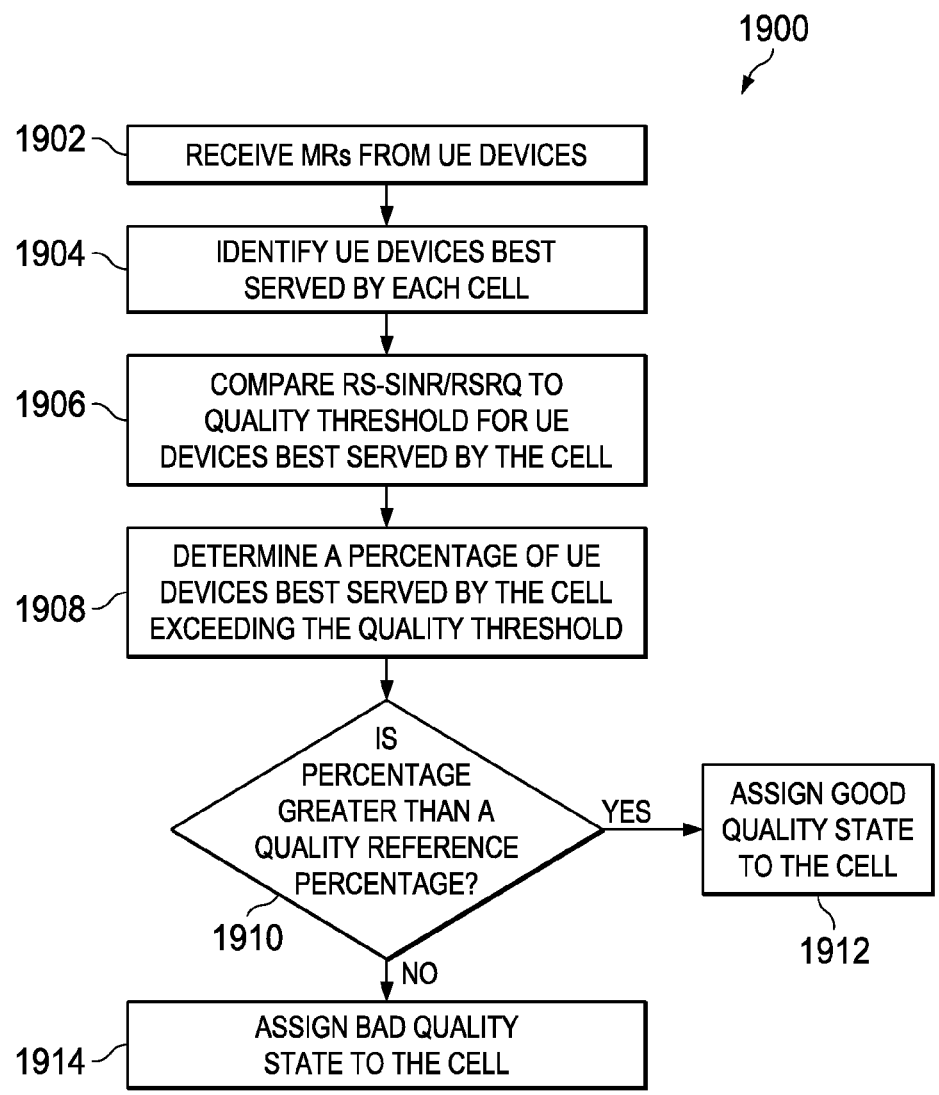
FIG. 19 shows a process for determining a quality state of a cell.

FIG. 19 shows a process 1900 for determining a quality state of a cell. Process 1900 begins at block 1902 with the receipt of MRs from UE devices. From the MRs, those UE devices best served by the cell are identified in block 1904. For the UE devices best served by the cell, the RS-SINR/RSRQ value from the MRs are compared to a quality threshold value at block 1906. A percentage of UE devices best served by the cell that exceed the quality threshold value is determined at block 1908. At block 1910, the percentage of UE devices exceeding the quality threshold value is compared to a quality reference percentage. If the percentage of UE devices exceeding the quality threshold value is greater than the quality reference percentage, the cell is assigned a good quality state at block 1912. If the percentage of UE devices exceeding the quality threshold value is not greater than the quality reference percentage, the cell is assigned a bad quality state at block 1914. The assignment of a good or bad quality state to the cell affects the adjustments to the antenna configuration parameters for the cell. The cell may be assigned a good or bad quality state in varying degrees based on how much the percentage is greater than or not greater than the quality reference percentage. Differing degrees of good and bad quality state may provide different adjustments to the antenna configuration parameters of the cell.

Solutions for Large Scale Near Real Time Network Optimization Problems

Embodiments of this disclosure provide a general approach for solving large scale near real time network optimization problems (e.g., SON use cases). Embodiments of this disclosure may divide large networks into subgroups of smaller networks, and then optimize control decisions for the subgroups using a simulated annealing technique. Simulated annealing (SA) is a generic probabilistic meta-heuristic approach for solving global optimization problems that locate a good approximation to the global optimum of a given function in a large search space. In an embodiment, a method may dynamically identify and/or sort problematic cells at the global or sub-group level, and optimize cells based on priority such that the more problematic cells are optimized first. In some embodiments, self learning solutions are executed online based real-time feedback (e.g., UE MRs, KPIs, mistakes, rewards). Self learning solutions may also be executed offline based on a simulation.

Embodiments of this disclosure may provide techniques for avoiding local optimization to obtain globally optimal, or near globally optimal, solutions. This can be achieved through simulated annealing (SA) based guided random search via online learning from experience with the system and proactive offline optimization via simulators, accepting worse solution according to some criterions (e.g., Metropolis), etc.

Embodiments of this disclosure provide autonomous, closed-loop, adaptive, self-learning techniques that are robust across different network implementations. Embodiment approaches may utilize minimal modeling assumptions, and may be insensitive to lack of UE location information and/or inaccurate engineering parameters.

Control parameters for the cluster of cells may be adapted using an embodiment autonomous adaptive simulated annealing algorithm. Aspects of this disclosure provide autonomous adaptive simulated annealing algorithms. An embodiment algorithm is described by the following ten steps.

The first step comprises obtaining an initial solution (S) and an initial temperature (T0). In one embodiment, the starting temperature (T0) is selected based on an objective or cost function during an offline simulation. In another embodiment, the starting temperature (T0) is selected by increasing the starting temperature (T0) until an acceptance ratio exceeds a threshold, e.g., ninety percent, etc.

The second step comprises evaluating the cost of the initial solution using constraints (e.g., thresholds and weights for parameters (e.g., RSRP, SINR) used in objective function). This may include a normalization process that considers the cost per cell, the ratio of total cost to the total number of UEs, and the ratio of cost to number of UEs per cell. The second step may also consider the cost per cell or per area (e.g., all cells or partial group of cells such as neighbors), cost percentage (e.g., ratio of cost per cell to UE number per cell), and distribution (e.g., weighted by cell).

The third step comprises generating a new solution (Snew). The new solution may be generated using various adaptive (e.g., on-line) algorithm algorithms, including a uniform algorithm, a guided random search (e.g., Gaussian, Cauchy). The new solution may also be generated via an offline simulation combined with reinforcement learning. Generating the new solution may include selecting which cell(s) are to be adjusted. The cells may be chosen randomly, using a heuristic approach, e.g., sorted by cost to UE no per cell, first m, exponential probability), or a using a hybrid approach (e.g., part random and part heuristic). The number of cells that are optimized may fixed (e.g., X number of cells), or adaptive (e.g., based on the priority or severity of problematic cells). One or more parameters may be adjusted per iteration. Various change/action/perturbation mechanisms may be applied to adjust the parameters to be adjusted. For example, parameters may be adjusted in the positive or negative direction. The adjustments can use different step size adjustment parameters, e.g., small step, large step, absolute step size, relative step size, fixed step-size/range, adaptive step-size/range depending on the temperature at system/cell level or offline simulation, etc.

The fourth step includes evaluating the cost of the new solution. The fifth step includes determining whether to select the new solution as the current solution. This decision may consider various criteria, and may be probability-based and/or threshold based. For example, the decision may consider criteria related to the cost of the new solution, e.g., difference between the cost of new solution and optimal cost, cost per UE or per cell, etc.

The sixth step determines whether an equilibrium condition (# of iterations carried out before update T) has not been reached. If not, then the technique reverts back to step three. The seventh step comprises learning from experience gained during the first six steps, e.g., feedback from the system, mistake, reward, etc. This step may update models and/or parameters, such as control parameters (e.g., system/cell level temperate Tn), propagation models used by simulators, engineering parameters, parameters/models for identifying problematic cells, generating new solution and accepting new solution, etc.

The eighth step determines whether a backward/safeguard condition has been met. If so, the technique back-steps to a previous solution according to some criteria. This step may be helpful in avoiding locally optimal solutions. The ninth step determines whether a termination criterion has been reached according to some criteria. If not, then the technique reverts back to step three. The tenth step returns all solutions and relevant parameters, e.g., Sbest, Cbest, S, C, Sall and Call.

Figure 20:
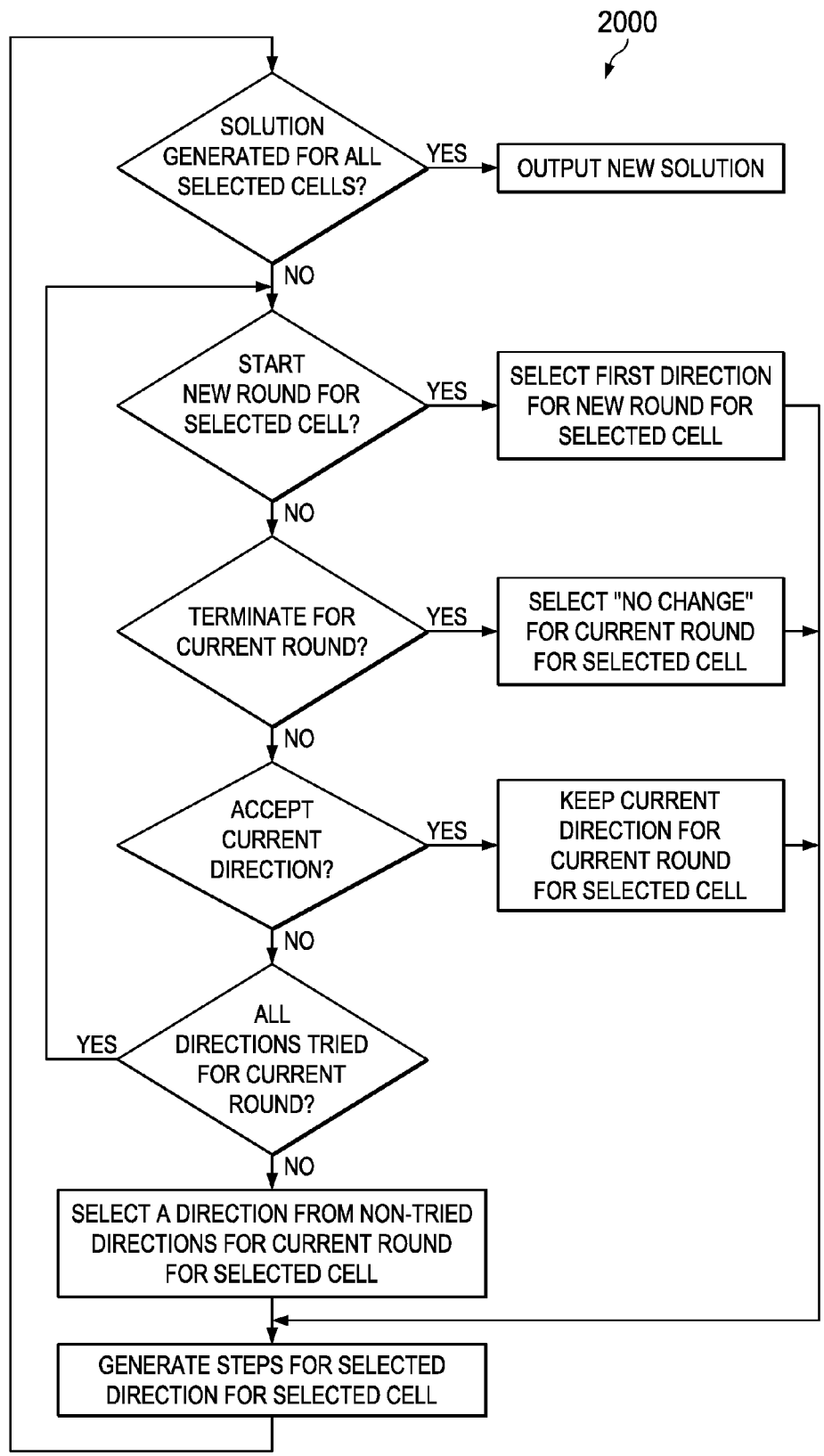
FIG. 20 illustrates a flowchart of an embodiment method for adjusting communication parameters for a subset of cells.

Aspects of this disclosure provide techniques for generating new solutions for selected cells during SA-based self learning. FIG. 20 illustrates an embodiment flowchart for generating new solutions for selected cells during SA-based self learning. As shown, the method 2000 begins by starting a new round of optimization for a selected cell. Various criteria may be used to determine when to start a new round of optimization. In some embodiments, groups of two or more cells may be optimized in parallel. In an embodiment, a new round of optimization may be started only after a certain number of cells in the group have finished the previous round of optimization. During the new round of optimization, a direction is selected for the cell. The possible directions may include randomly generated and/or pre-defined directions for RF parameters, e.g., electronic antenna tilt, power (up/0, down/0, 0/up, 0/down, 0/0), etc. The directions may be determined using adaptive online techniques, or via offline simulation. Various methods may be used to determine the direction, e.g., guided random, learning from experience (e.g., direction with maximum probability of positive gain), heuristic (e.g., expert system, whitebox), offline simulation (e.g., Netlab), predefined order of directions, adaptive (e.g., up-tilt if current eTilt<(max−min)/2), reinforcement learning, etc.

Thereafter, parameter(s) are adjusted based on a step size in the selected direction, after which a solution is generated. Next, the method 2000 determines whether to continue stepping in the current direction. If so, the parameters are adjusted once more in the selected direction, and a solution is generated. At some point, a determination is made to change the direction for the current cell, at which point parameters are adjusted in a different direction. Outputs are generated iteratively until a termination condition is reached, e.g., all directions have been considered, a threshold number of directions have been considered, etc. Thereafter, a new cell is selected, and directions for the new cell are evaluated to generate corresponding solutions. Cells in the selected subset are evaluated iteratively until another termination condition is reached, at which point a new solution is output. Termination conditions may occur after performance of a threshold number of iterations or rounds. Termination conditions may also include results-based criteria, e.g., negative gain, number of negative gains, number of rejections, etc.

FIG. 21 illustrates a graph of the results of simulations of the method 2000 described in FIG. 20. These results were obtained by starting a new round of adjustment without waiting for all cells to be adjusted in the previous round. Three rounds of adjustment were performed. FIG. 22 illustrates a graph of the results of simulations of the method 2000 described in FIG. 20. These results were obtained by starting a new round of adjustment only after all cells had been adjusted in the previous round.

Aspects of this disclosure provide techniques for dynamically adjusting cell-specific radio frequency (RF) configuration parameters (e.g., electrical antenna tilt, reference symbol (RS) pilot power, etc.) to optimize an objective function. In one embodiment, RF parameters of a single cell are adjusted to maximize a per-cell performance metric. In another embodiment, RF parameters for two or more cells are jointly adjusted to maximize a network performance metric, e.g., QoE in terms of coverage, capacity, etc.

In some embodiments, parameters are adjusted incrementally online. Parameters may be adjusted jointly for the different cells in a cluster, and the resultant feedback from UE measurement reports (MRs) may be observed continually in a closed loop for long term optimization. Real UE feedback (e.g., no propagation model estimate) in MRs to update the objective function, to identify cell state indicators, and to make step-wise parameter adjustments. In some embodiments, the objective function does not depend on UE location information.

As long as MRs (RSRP, RS-SINR or RSRQ) from representative UEs are available for a given parameter change, the objective function can be evaluated accurately. As such, the objective function may not require correct antenna tilt and power information. System objective functions and cell level metrics may be aggregations of UE state information (e.g., MRs, etc.) that don't require individual UE location for evaluation. Even if initial configuration parameters are inaccurate, they can be still adjusted in a meaningful direction using the fact that parameter changes lead to measurable changes in cell/system metrics.

Aspects of this disclosure provide adaptive simulated annealing (SA) techniques that combine online optimization of the real network via closed-loop SA-based guided random search and proactive offline optimization of relevant parameters and/or actions by efficiently exploring the solution space via simulated networks (e.g., Netlab, Unet) iteratively, in order to, learn from experiences, such as mistakes and rewards. This may allow actions to be selected based on the real-time feedback from the system. Embodiments may dynamically select and evolve the best possible actions for online optimization, which may allow the system to adapt to new unforeseen conditions or situations. Embodiments may also update the models and parameters used by SA and/or simulators based on online feedback from the system in real time, to provide fast convergence and to escape the trap of local optimization.

Aspects of this disclosure also provide embodiment SON optimization techniques that utilize an iterative learning approach to adjust wireless network configuration parameters. In particular, a controller iteratively generates and evaluates global solutions over a sequence of iterations. During this process, the controller uses experience obtained from evaluating global solutions during previous iterations when generating global solutions in subsequent iterations. This may be achieved by using the evaluation results to update parameters (e.g., topology model, traffic/usage patterns) of a heuristic/adaptive algorithm used to generate the global solutions. In this way, the controller learns more about the network (e.g., topology, conditions, traffic patterns, etc.) during each successive iteration, which ultimately allows the controller to more closely tailor global solutions to the network. As used herein, the term "global solution" refers to a set of local solutions for two or more wireless network coverage areas in a wireless network. Each "local solution" specifies one or more wireless configuration parameters for a particular wireless network coverage area. For example, in the context of CCO, a local solution may specify an antenna tilt of an access point in a wireless network coverage area and/or a transmit power level (e.g., uplink, downlink, or otherwise) for the wireless network coverage area. In some embodiments, the global solutions are evaluated during online implementation. In other embodiments, the global solutions are evaluated during offline simulation. In yet other embodiments, some global solutions are evaluated offline while others are evaluated online. For example, the best performing global solution obtained from a given number of iterative simulations may be implemented during an online test period. Global solutions may be generated in a manner that seeks to improve performance metrics of the worst performing cells. For example, wireless configuration parameters for a global solution may be selected in order improve performance metrics in wireless coverage areas associated with the highest costs.

Various techniques can be used to evaluate the global solutions. In some embodiments, each global solution is evaluated to determine whether it satisfies one or more global performance criteria, e.g., an overall cost, an average per-cell cost, etc. If the global solution does not satisfy the global performance criteria, then the controller may revert back to a previous global solution, e.g., a lowest cost global solution computed during an earlier iteration. If the global solution does satisfy the global performance criteria, then the controller may evaluate each local solution specified by the global solution to determine which local solutions satisfy corresponding local performance criteria. Different local performance criteria may be used to evaluate local solutions for different coverage areas. Local solutions that fail to satisfy their corresponding local performance criteria may be replaced with previous local solutions, e.g., a default local solution, a local solution defined by a global solution computed in a previous iteration, etc. In some embodiments, the global performance criteria is a relative benchmark established during a previous iteration (e.g., the lowest cost global solution computed prior to the current global solution), while the local performance criteria is an absolute benchmark, e.g., a minimum level of performance for a given cell.

In some embodiments, cost functions are used to evaluate global solution. The cost may be an overall cost for a set of coverage areas or an average per cell cost for a set of coverage areas. In the context of coverage and capacity optimization, a cost function for a global solution may include an RSRP parameter and an interference parameter, e.g., a SINR level, etc. In an embodiment, the RSRP component corresponds to a number of users reporting, or projected to report, an RSRP measurement below an RSRP threshold during a fixed period, and the interference component corresponds to a number of users reporting, or projected to report, an interference measurement above an interference threshold during the fixed period. In such an embodiment, the following cost function may be used: Cost=$0.5*$Num_UE(RSRP$\leq$Thr_rsrp)+$0.5*$Num_UE (INT$\geq$thr_int), where Num_UE(RSRP$\leq$Thr_rsrp) is the number of UEs reporting, or projected to report, RSRP levels below an RSRP threshold during a fixed period, and Num_UE(INT$\geq$thr_int) is the number of UEs reporting, or projected to report, interference levels below an interference threshold during the fixed period. In such an example, the interference levels may correspond to SINR levels obtained by measuring reference signals.

In some embodiments, some or all of the functions or processes of the one or more of the devices are implemented or supported by a computer program that is formed from computer readable program code and that is embodied in a computer readable medium. The phrase "code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. Upon execution, the computer program may detect core traces, convert the core traces into a hierarchical format, generate the gene function database, and determine preemption costs associated with the gene functions.

Adjusting Cell Configuration Parameters Based on Measurement Reports

Aspects of the present disclosure provide methods and apparatus for adjusting configuration parameters of a plurality of cells in a wireless network based on measurement reports (MRs) received during a data collection period of the wireless network, so that coverage and capacity of the wireless network may be improved. A configuration parameter of a cell may be an antenna tilt or a transmit power.

In some embodiments, labels are assigned to the plurality of cells based on the MRs and configuration parameters of the plurality of cells are adjusted according to the labels. In one embodiment, each of the plurality of cells are assigned two or more labels based on one or more MRs collected in the wireless network. The two or more status labels are associated with different cell status categories. In one embodiment, a cell status may be categorized as a coverage status, a quality status, an overshooter status, or an interference status. Each of the cell status categories may be further classified into different cell status types. For example, a quality status is classified into types of {good, bad}, or an interference status is classified into types of {strong, medium, weak}. A cell may be mapped to one of the cell status types corresponding to a cell status category based on MRs and is labeled by that type and category. A combination of the labels assigned to each of the cells in the wireless network reflects the current status of each corresponding cell with respect to different cell status categories, and is used to determine adjustment of one or more configuration parameters of each corresponding cell, for improving cell performance. In one embodiment, domain expertise, knowledge and experience are used to determine what actions to take to adjust the cells' configuration parameters based on the combinations of labels.

In some embodiments, blames are assigned to the plurality of cells based on the MRs, and configuration parameters of the plurality of cells are adjusted according to the blames. Blames are associated with MRs that do not satisfy a pre-defined set of performance criteria, which are referred to as bad or unsatisfactory MRs, and indicate responsibilities that one or more cells should take for the bad MRs. In one embodiment, bad MRs are identified from the collected MRs, and each bad MR is associated with one unit of blame. For each bad MR identified in the wireless network, fractional units of blame are assigned to responsible cells. If one cell is fully responsible for a bad MR, the cell is assigned a unit of blame. Thus the joint impacts of cell performance issues, such as problems related to coverage, quality or interference, resulted from cell's configuration is captured into the blames assigned to the cell corresponding to bad MRs in the wireless network. Blames assigned to each of the plurality of cells are used to determine adjustment of one or more configuration parameters of each corresponding cell, in order to improve status of each corresponding cell. In one embodiment, domain expertise, knowledge and experience are used to determine what actions to take to adjust the cells' configuration parameters based on the blames assigned to the cells.

In some embodiments, blames are classified into different blame categories for determining configuration parameter adjustment of the cells. The different blame categories indicate different manners to adjust one or more configuration parameters of the cells in order to reduce the values of blames. In one embodiment, a blame is classified into an up-blame or a down-blame, indicating an increase or a decrease of a configuration parameter is needed in order to reduce the blame value. In one embodiment, blames assigned to each of the cells are classified into an up-blame or a down-blame, and a sub-total up-blame value and a sub-total down-blame value are calculated by summing all up-blames and all down-blames, respectively, assigned to each corresponding cell. In one embodiment, the sub-total up-blame value and the sub-total down-blame value of a cell are used to calculate an up-action probability and a down-action probability of the cell. A configuration parameter of the cell may be increased when the up-action probability is greater than a first threshold, and may be decreased when the down-action probability is greater than a second threshold.

Conventional SON methods for CCO, such as the automatic cell planner (ACP), typically require costly drive tests and human verification to configure RF configuration parameters of a cell. For example, drive test (MT) or minimization of drive test (MDT) data, along with user equipment (UE) geo-location (AGPS) and accurate antenna configuration parameters are required to achieve an accurate propagation modeling based on which cell configuration parameters are adjusted. Additionally, these methods also require significant manual effort to be applied for configuring different types of cells, which results in high expenditure and complicated configuration process.

Aspects of the present disclosure provide methods and apparatus to generally optimize a cluster of cells in terms of coverage and capacity, by utilizing measurement reports (MRs) obtained from UEs served by the cells and experts' domain knowledge to determine configuration parameter adjustment of the cells. Embodiments of the present disclosure do not reply on UE AGPS and do not require accurate antenna configuration parameters of the cells.

A measurement report generally includes measurement results that a UE measures and provides for delivery to its serving cell regarding various measurement items the serving cell requests. For example, a measurement report includes measurement results about signal strength or quality of the serving cell. Typically, a measurement report includes a reference signal received power (RSRP) and a reference signal receive quality (RSRQ). A RSRP generally provides information about strength of a received reference signal, and a RSRQ indicates quality of a received reference signal. Measurement and calculation of a RSRQ may be based on a RSRP and a received signal strength indicator (RSSI). A RSSI includes information about a reference signal power from a serving cell of a UE as well as co-channel interference and noise, and can help in determining interference and noise information. As used herein, MRs sent by UEs served by a cell is referred to as MRs of the cell. Embodiments of this disclosure use RSRP and RSRQ reported to indicate reference signal strength and reference signal quality of a cell, respectively. However, the use of RSRP and RSRQ are merely for illustrative purpose, and any other measures for reference signal strength and reference signal quality of a cell may also be used. For example, a signal to interference and noise ratio (SINR) may be used to indicate reference signal quality of a cell. One of ordinary skill in the art would recognize many variations and alternatives of measures for reference signal strength and reference signal quality of a cell. These variations and alternatives are all within the scope of this disclosure without departing from the spirit of this disclosure.

A cell may be characterized by its cell status in different categories. For examples, a cell status may be a coverage status, a quality status, an interference status, or an overshooter status, etc. In some embodiments, cell statuses may be estimated or indicated based on information included in MRs. For example, a RSRP, or any other measure for reference signal strength, may be used to indicate coverage status of a cell at its edge, and a RSRQ, or an SINR, or any other measure for reference signal quality, may be used to indicate quality status within a cell coverage area. In some embodiments, a cell status in a category may be further classified into different status types. Status types corresponding to a cell status category may be, as an example, represented by {type 1, type 2 . . . type n}. For example, a coverage status is classified into types of {good, weak, weak edge only, weak interior/insufficient only, weak edge and interior/insufficient}. In some embodiments, a cell's coverage status is "good" when an average RSRP included in MRs of the cell is greater than a first threshold, and the cell's coverage status is "weak" when the average RSRP is less than a second threshold. A coverage status type of "weak interior only" may indicate that signal strength within a cell is less than a threshold, and "insufficient only" may indicate there is a gap between two cells and UEs in the gap are not sufficiently covered. A coverage status type of "weak edge and interior" may indicate signal strength within and at the edge of the cell is less than a threshold. In an example, a quality status may include types of {good quality, bad quality}.

In another example, an overshooter status is classified into two types: {yes (i.e., with overshooter), no (i.e., without overshooter)}. In another example, an interference status may be categorized into types of {interferer zero, interferer one, interferer more}, or {none, single, multiple} depending on the number of interferee cells (e.g., victim cells of an interference) affected. Alternatively, an interference status of a cell, which is identified as an interferer, may have interference status types of {strong interferer, medium interferer, weak interferer} based on the number of UEs/MRs which are affected by the interferer and/or the number of interferee cells. One of ordinary skill in the art would recognize many variations and alternatives for classifying cell status categories and for classifying a cell status into different types corresponding to a category. The terms of "label" and "status label" are used interchangeably throughout this disclosure.

A cell may be mapped to one of the status types corresponding to a cell status category utilizing information in MRs, and is labeled by that type and category. For example, a cell may be assigned a label of "weak" corresponding to its coverage status, and/or be assigned a label of "yes" corresponding to its overshooter status based on RSRP information included in MRs obtained. In one embodiment, a label assigned to a cell may be referred to as a problematic label for it indicates a performance, e.g., cell capacity or coverage, problem of the cell. For example, a label of "bad" quality status indicates there may be a quality issue in the cell, and a label of "strong" interference status indicates that a cell may cause interference problems to other cells. Thus labels assigned to cells provide information indicating problems of cells and also guides to adjust the cells' configurations. In some embodiments, labels assigned to a cell are used to determine whether and how the cell's configuration parameters are adjusted, in expectation of improving one or more labels of the cell, and consequently improving the cell performance and MRs received in future.

Figure 23:
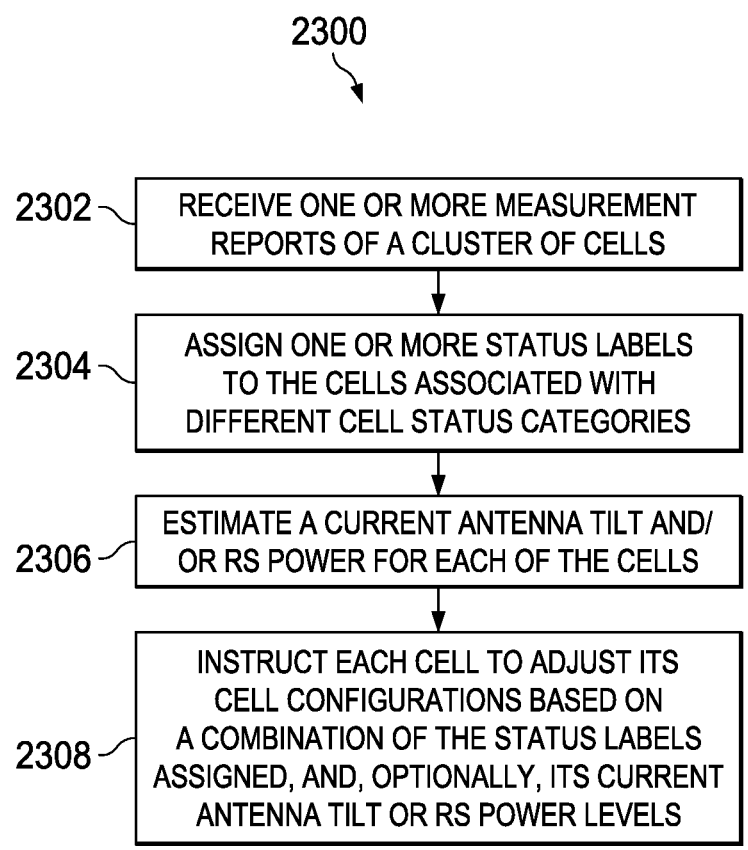
FIG. 23 illustrates a flowchart of an embodiment method for adjusting cell configurations in a wireless network.

FIG. 23 illustrates a flowchart of an embodiment method 2300 for improving coverage and capacity of a cluster of cells in a wireless network. The method 2300 may be performed by a network component, such as a communications controller or an evolved node B (eNodeB). The method 2300 starts at step 2302, where the network component receives one or more MRs. The MRs may be sent by one or more UEs served in the wireless network by one or more of the cluster of cells. The UEs may send the MRs periodically (e.g., whenever pilots are received), when and as configured for pilot measurement reporting, or whenever requested. In one embodiment, the network component also collects MDT and/or DT data in the wireless network.

At step 2304, each of the cluster of cells is assigned one or more status labels associated with different cell status categories based on the MRs, and optionally, the MDT/DT data. For example, each cell is assigned two labels corresponding to the coverage status and interference status. In another example, each cell is assigned four labels corresponding to the coverage status, the quality status, the interference status, and the overshooter status. What cell status category will be used to label the cells may depend on many factors, such as user experience, system load, number of user equipments, or impacting problems to be solved in the network. Since each cell status category may include different types, there may be various combination of labels assigned to a cell corresponding to the cell status categories used. For example, a cell may be labeled as "good" coverage, "bad" quality, and "no" overshooter. Alternatively, the cell may be labeled as "weak" coverage, "good" quality and "no" overshooter.

At step 2306, the network component estimates the current antenna tilt and/or RS power for each cell in the wireless network. In one embodiment, the current antenna tilt or RS power of a cell may be represented by: (original antenna tilt/RS power+change value). The original antenna tilt/RS power represents the antenna tilt value/RS power value of the cell at a point of time when the cell's configuration is set as original, and the change value represents increase or decrease of the cell's tilt or RS power with respect to its original value. In one example, the original values of each cell's antenna tilt and RS power and their change values over the time may be stored in a database. Thus a current value of a cell's antenna tilt or RS power may be obtained by adding the original value and a previous change value. In one embodiment, the estimation of the current antenna tilt or RS power for a cell may indicate a level of a value compared with the cell's original antenna tilt or RS power. For example, a cell's current antenna tilt may be estimated as "small", which indicates that the current antenna tilt is small compared with the original antenna tilt. In another example, a cell's current RS power may be estimated as "large" indicating the current RS power is large compared with the original RS power. In one embodiment, the level of a tilt/RS power value may be classified as "large", "moderate", "small", and "zero" which indicates there is no change. A person of ordinary skill in the art would recognize many variations for classifying the levels. In one embodiment, a cell's estimated antenna tilt and RS power may be represented by a vector: [antenna tilt level, RS power level]. For example, a cell's estimated antenna tilt and RS power may be [small, 0], [large, moderate], etc. The antenna tilt and RS power may also be taken into consideration when determining cell configuration parameter adjustment. For example, when a cell is assigned a label of "bad" quality and increase of transmit power of the cell is desired. However, if the current RS power is already "large", the transmit power of the cell may not be adjusted.

At step 2308, the network component instructs the cluster of cells to adjust their cell configuration parameters, such as their antenna tilts, transmit power, or both, based on status labels assigned to the cell. In one embodiment, a combination of labels assigned to each cell may be used to determine cell configuration parameter adjustment. For example, if a cell is labeled as "good" coverage, and "bad" quality, the transmit power of the cell may be increased. In another example, if a cell is labeled as "good" coverage and "strong" interference, the antenna tilt and/or transmit power of the cell may be decreased. In another embodiment, a combination of labels assigned to each cell and the current antenna tilt and/or RS power level of each corresponding cell are used to determine cell configuration adjustment. In the example where the cell is labeled as "good" coverage and "strong" interference, if the current antenna tilt level of the cell is "small", then the antennal tilt of the cell may be decreased by a small amount, which is a pre-defined level of antenna tilt amount. Alternatively, the antennal tilt of the cell may not be adjusted, and the transmit power of the cell may be decreased according to its current RS power level. In one embodiment, the network component may map a combination of the status labels assigned to a cell and the current antenna tilt and/or RS power levels of the cell to an action and assign the action to the cell. An action represents a change of one or more of a cell's configuration parameter, such as increase or decrease of the antenna tilt and/or RS power of the cell. An action may be assigned based on domain knowledge, experience or expertise in consideration of status labels assigned to a cell, current configuration of the cell, and other factors that may affect its cell status. Steps of 2302-2308 of the method 2300 may be performed iteratively, with each cell's configuration parameter(s) adjusted in multiple "small steps", for improving labels assigned to the cells.

In some embodiments, tables are used to indicate status labels and actions assigned to cells. FIGS. 24A-24C and FIGS. 25A-25C illustrate examples of tables for mapping status labels to actions for cells in a wireless network. Tables in FIGS. 24A-24C and FIGS. 25A-25C show status labels assigned to the cells, current antenna tilt and current RS power levels of the cells, and actions assigned to the cells for adjusting antenna tilt, RS power, or both. Actions for a cell are determined based on a combination of labels assigned to the cell and the cell's current antenna tilt and RS power levels. Each row represents labels and actions assigned to a cell. As shown, the cells are listed according to a particular problem, shown in the first column of "Case Name", observed based on MRs. That is, the "Case Name" column indicates a problematic label assigned to the cells corresponding to a cell status category. For example, the "Case Name" column of overshooter indicates these cells have an overshooter problem and their labels corresponding to the overshooter status are "Yes". In another example, the "Case Name" column of multi-interferer indicates that these cells have been identified as interferers of multiple interferees and have been assigned a label "multi-interferer" according to the interference status. The second to the fifth columns show labels assigned to each of the cells corresponding to the cover status, quality status, interference status and overshooter status, and the sixth and seventh columns are current antenna tilt and RS power levels estimated of the cells. Each of the cells is assigned an action to adjust its antenna tilt and/or RS power, as shown in the eighth and ninth columns.

Embodiment methods map UE level MR data to various disparate cell level labels, and further to actions for adjusting cell configuration parameters, resulting in non-linear mappings, since actions are determined based on various combinations of labels. The methods may also be error prone, because labels could be incorrectly assigned due to mapping quantization errors, e.g., a "weak" coverage cell may be assigned a "weak edge only" label. Actions determined based on the labels may also be wrong due to, e.g., poor mapping decisions and/or overall quantization errors. Further, a so called "tricky or ambiguous" combination of labels may be assigned to a cell, which makes it hard to determine an action. For example, when a cell is assigned labels of "multi-interferer" and "poor quality", it is hard to determine whether the cell's antenna tilt or RS power should be increased or decreased, and consequently hard to map an action to the combination of labels. Moreover, the methods may not quantitatively inform about how many UEs in the system are affected due to a cell's "multi-interferer" status, as well as how many "poor quality" statuses can be weighed against each other for choosing a specific action. Additionally, the methods do not provide ability to weigh a cell's "own" quality/coverage label against interference/overshoot labels of "other cells", and to estimate impact on stability of a wireless communications network when multiple cells interact with each other due to actions taken which are determined based on labels.

In some embodiments, a concept of "blame" is provided to indicate a responsibility a cell may take for each MR that does not satisfy a performance criterion of a wireless communications network. Such a MR may be referred to as a "bad" or "unsatisfactory" MR. In some embodiments, the system may pre-define a set of performance criteria. If a MR does not satisfy one of the set of criteria, the MR is marked as a bad or unsatisfactory MR; otherwise, it is a good MR. For example, the set of performance criteria includes a coverage criterion, e.g., having a RSRP, or any other measure for reference signal strength, greater than a first threshold, and a quality criterion, e.g., having a RSRQ, or any other measure for reference signal quality, greater than a second threshold.

When a RSRP included in a MR is not greater than the first threshold, the MR does not satisfy the coverage criterion and is bad, or when a RSRQ in the MR is not greater than the second threshold, the MR is bad. A person of ordinary skill in the art would recognize many variations and alternatives for defining the performance criteria by which MRs may be identified as good or bad. For each bad MR, there should be one or more cells responsible for such an MR and thus taking the blame for it, and a blame is assigned to a cell if the cell takes at least a partial responsibility for a bad MR. Each assigned blame may be associated with a blame value. In one embodiment, each bad MR is associated with one unit of blame. If one cell is fully responsible for the bad MR, this one cell takes one unit of blame. If multiple cells are responsible for the bad MR, these multiple cells share the one unit of blame. The cells may include a serving cell of the UE reporting the bad MR, a non-co-site neighbor cell of the serving cell, or other cells in the system.

Figure 26:
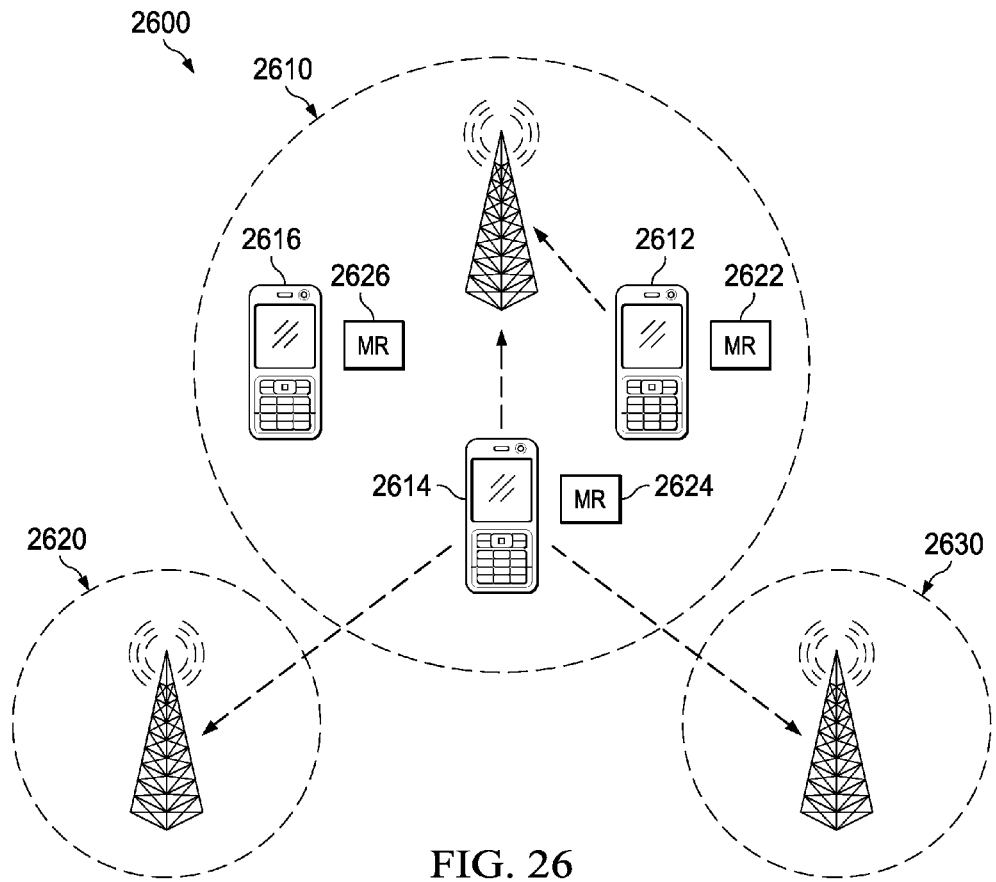
FIG. 26 illustrates a diagram of another embodiment wireless network.

FIG. 26 illustrates a diagram of an embodiment wireless communications network 2600 where blames are assigned to cells. As shown, the network 2600 includes cells 2610, 2620 and 2630 serving UEs in their respective coverage areas. Mobile devices 2612, 2614 and 2616 are within the coverage area of the cell 2610 and transmit MRs to the cell 2610. In this example, each of the mobile devices 2612 and 2614 reports a bad MR 2622 and a bad MR 2624, respectively, and the mobile device 2616 reports a good MR 2626. Each bad MR is associated with a unit of blame. By analysis of the MRs 2622-2626, the cell 2610 is fully responsible for the bad MR 2622, and one unit of blame (e.g., a blame value of "1") is assigned to the cell 2610. The cells 2620 and 2630 are not assigned any blame for the bad MR 2622 since they do not take any responsibility for it.

In one embodiment, the cells 2620 and 2630 may also be assigned blames for the bad MR 2622, with each having a blame value of "0". Cells 2610, 2620 and 2630 are responsible for the bad MR 2624 reported by the mobile device 2614, and share the responsibility equally, so each of the cells 2610, 2620 and 2630 are assigned ⅓ unit of blame. In another word, each of the cells 2610, 2620 and 2630 is assigned a blame with a value of "⅓". This may be the case when cells 2620 and 2630 cause interference on the mobile device 2614, while the cell 2610 has a low transmit power. The mobile device 2616's good MR 2626 is good and thus does not impose blames on any of the cells. In this example, the total blame value assigned to all the cells in the wireless communications system equals the number of bad MRs received, that is, (1+⅓+⅓+⅓)=2 (i.e., two bad MRs 2622 and 2624).

Figure 27:
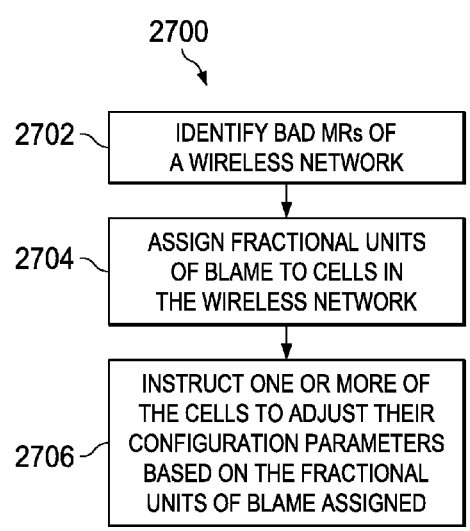
FIG. 27 illustrates a flowchart of an embodiment method for adjusting cell configurations in a wireless network.

By using the concept of blame, responsibilities of a cell for causing bad MRs in the wireless communications network are captured and identified, based on which corresponding adjustment to the cell's configuration parameters may be determined in order to reduce the blame values of the cell and consequently the number of bad MRs, thus the entire network performance is improved. FIG. 27 illustrates a flowchart of an embodiment method 2700 for adjusting cell configuration parameters in a wireless network based on blames. The method 2700 may be performed by a network component in the wireless network, such as a communications controller, or an eNodeB. At step 2702, the method 2700 identifies bad MRs, i.e., MRs failing to satisfy one of a set of performance criteria, from a plurality of MRs received in the wireless network, e.g., during a data collection time period. The plurality of MRs are measured and reported by UEs served by multiple cells in the wireless network, and may be transmitted by the UEs periodically or upon request. Each of the bad MR is associated with one unit of blame.

Figure 30:
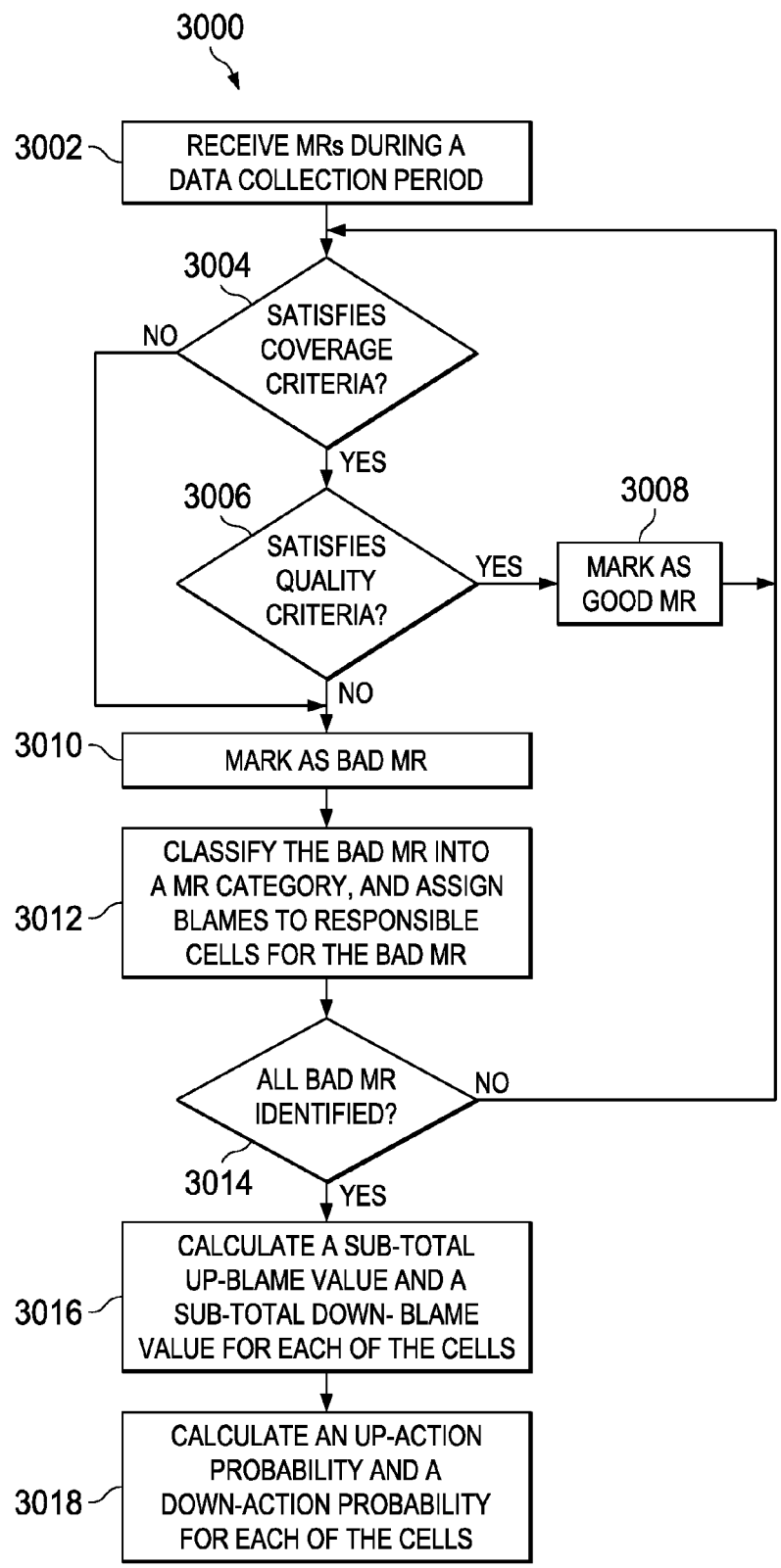
FIG. 30 illustrates a flowchart of another embodiment method for adjusting cell configurations in a wireless network.

At step 2704, for each of the identified bad MRs, the method 2700 assigns fractional units of blame to responsible cells. Thus for each of the bad MRs, a cell is assigned a blame associated with a blame value. The blame value may be "1" when the cell is fully responsible for the corresponding bad MR, may be "0" when the cell is not responsible for the corresponding bad MR, and may be between 0 and 1 when the cell is partially responsible for the corresponding bad MR. A blame corresponding to a bad MR may be assigned to a cell based on information included in the bad MR, such as a RSRP list, RSRQ and timing advance, topology information of the cell, and other information collected, such as MDT data. At step 2706, the method 2700 instructs one or more of the cells to adjust one or more of their configuration parameters based on their assigned blame values. Example configuration parameters include an antenna tilt, and a power parameter, such as a transmit power, etc. In one embodiment, blames assigned to a cell may be used to label the cell corresponding to different cell status categories, such as a coverage status or a quality status, taking into consideration of information, e.g., included in MRs received in the cell. The cell's configuration parameter may then be adjusted based on labels assigned to the cell, as illustrated in FIG. 30.

In some embodiments, a blame assigned to a cell according to a bad MR may be classified into different blame categories. The blame categories are associated with different manners for adjusting one or more cell configuration parameters in expectation of reducing the value of the blame and thus the number of bad MRs. In some embodiment, a blame may be classified into an up-blame or a down-blame. An up-blame or a down-blame indicates increase or decrease of one or more cell configuration parameters is desired for reducing the value of the up-blame. So the up-blame and down-blame corresponds to an increase-action (or up-action) and a decrease-action (or down-action), respectively, for adjusting one or more cell configuration parameters. In one example, a blame assigned to a cell is classified as an up-blame if increasing the antenna tilt, transmit power, or both of the cell is expected to reduce the associated blame value, and the blame is classified as a down-blame if decreasing the antenna tilt, transmit power, or both of the cell is expected to reduce the cell's blame values. For example, a cell may be assigned a down-blame with a value "⅕" or an up-blame with a value "1". In another example, a blame may be classified into three categories, where the first category indicates increase of both antenna tilt and transmit power are desired, the second category indicates decrease of both antenna tilt and transmit power are desired, and the third category indicates increase/decrease of an antenna tilt and decrease/increase of a transmit power. A person of ordinary skill in the art would recognize many variations and alternatives for defining the blame categories and adjusting a cell's configuration parameters.

Figure 28:
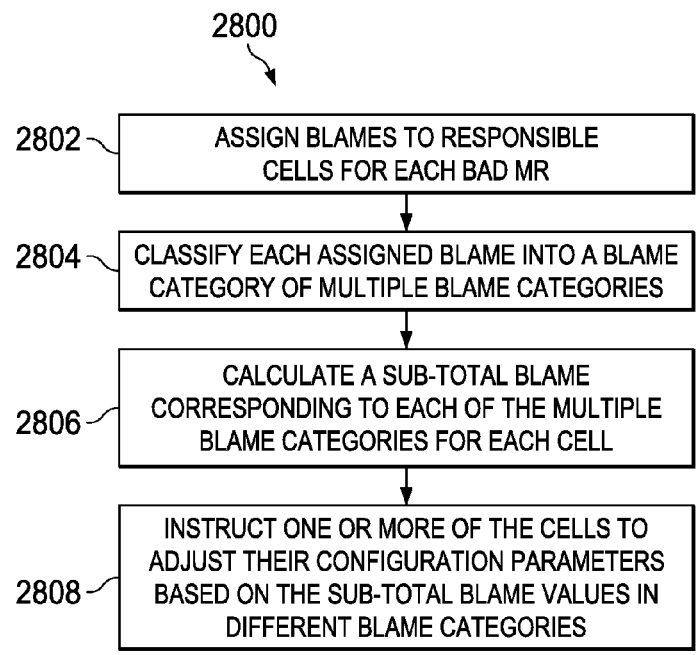
FIG. 28 illustrates a flowchart of another embodiment method for adjusting cell configurations in a wireless network.

Classifying blames assigned to cells into different categories is helpful in determining how configuration parameters of the cells may be adjusted based on blames. FIG. 28 illustrates a flowchart of an embodiment method 2800 for adjusting cell configuration parameters in a wireless network having multiple cells based on blames. At step 2802, the method 2800 assigns blames to responsible cells for each bad MR identified in the wireless network. Each bad MR is associated with one unit of blame, and responsible cells are assigned fractional units of blame for each bad MR. At step 2804, each of the assigned blames is classified into a blame category of multiple blame categories. For example, a blame is classified into either an up-blame or a down-blamed, as described above. Steps 2802 and 2804 are repeated for all bad MRs received during a data collection period of the wireless network. Thus responsibilities, i.e., blames for all bad MRs are assigned.

At step 2806, the method 2800 calculates, for each cell, a sub-total blame corresponding to each of the blame categories. In some embodiments, the method 2800 sums the fractional units of blame that are assigned to each cell and that fall into a corresponding blame category, by which a sub-total blame value of the corresponding blame category is obtained. Taking the up-blame and down-blame categories as an example, a sub-total up-blame value for a cell is calculated by summing all up-blame values assigned to the cell, and a sub-total down-blame value for the cell is also calculated by summing all down-blame values assigned to the cell. Thus for each of the cells, two sub-total blame values are calculated, which include a sub-total down-blame value and a sub-total up-blame value.

At step 2808, the method instructs one or more of the cells to adjust their configuration parameters based on the sub-total blame values in different blame categories. In some embodiments, action probabilities may be calculated and used to determine how a cell's configuration parameters are adjusted. For example, when a sub-total down-blame value and a sub-total up-blame value are obtained for each of the cells, an up-action probability $P_{up\text{-}action}$ and a down-action probability $P_{down\text{-}action}$ may be calculated for each cell as follows:

$$P_{up\text{-}action} = (\text{sub-total up-blame value})/(\text{total blame value}) \quad P_{down\text{-}action} = 1 - P_{up\text{-}action}$$

where the total blame value equals (sub-total down-blame value+sub-total up-blame value), the up-action probability indicates a probability of a need for a cell to increase one or more of its configuration parameters for reducing its blames (responsibilities) for bad MRs, and the down-action probability indicates a probability of a need for the cell to decrease its configuration parameters in order to reduce its responsibilities for bad MRs. In one embodiment, the up-action probability and the down-action probability are compared with a pre-defined up-action threshold $TP_{up}$ and a pre-defined down-action threshold $TP_{down}$, respectively, to determine actions to be taken to adjust a cell's configuration parameters. For example, if the up-action probability of a cell is greater than the $TP_{up}$, a configuration parameter of the cell, such as the antenna tilt or transmit power of the cell, may be increased. If the down-action probability of a cell is greater than the $TP_{down}$, a configuration parameter of the cell, may be decreased. Generally, the pre-defined up-action threshold $TP_{up}$ and the pre-defined down-action threshold $TP_{down}$ should be greater than or equal to 0.5. As such a cell is only eligible for adjusting its configuration parameters by either increasing or decreasing the configuration parameters. If neither of the up-action probability and the down-action probability of a cell is greater than the corresponding threshold $TP_{up}$ or $TP_{down}$, then no action will be taken to adjust the cell's configuration parameters.

Figure 29:
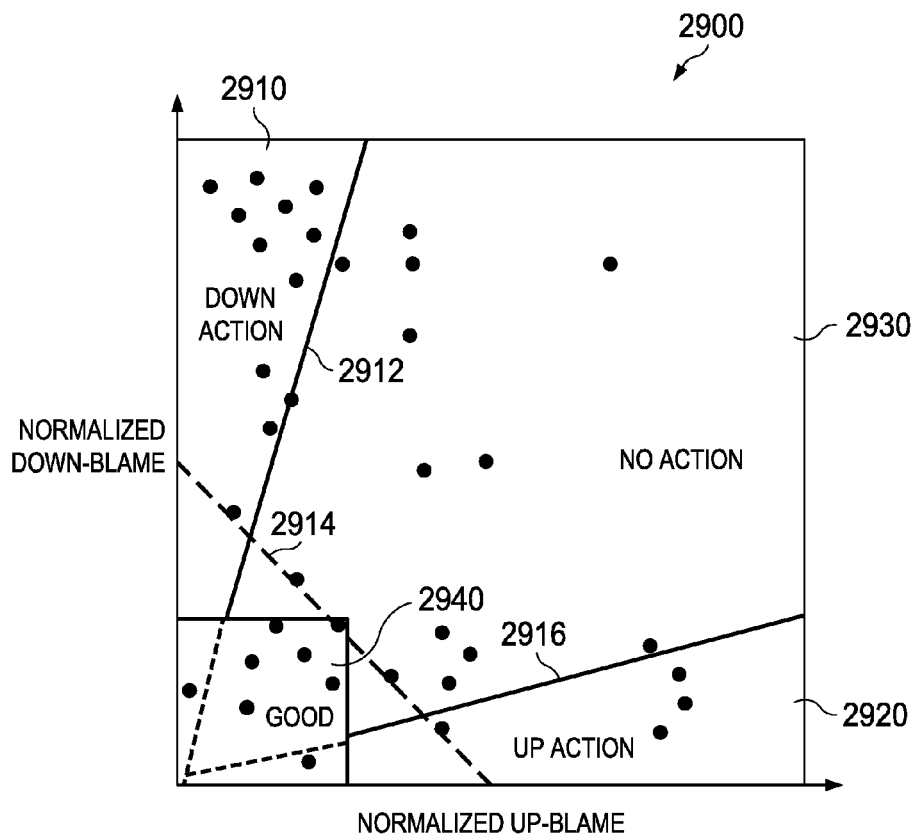
FIG. 29 illustrates a graph of an embodiment up-blame and down-blame space.

FIG. 29 illustrates a graph 2900 showing an embodiment up-blame and down-blame space, where analysis may be performed to determine actions for adjusting a cell's configuration parameters. The horizontal axis of the graph 2900 represents a normalized up-blame and the vertical axis represents a normalized down-blame. Each point in the graph represents a cell. As shown, the up-blame and down-blame space is divided into zones 2910, 2920, 2930 and 2940. Zone 2910 is a down-action zone, indicating cells in this zone have a down-action probability greater than a pre-defined down-action threshold $TP_{down}$. These cells generally have a high confidence to perform a down-action, i.e., decreasing a configuration parameter of the cells, with expectation of reducing their blame values. Zone 2920 is an up-action zone, indicating cells in this zone have an up-action probability greater than a pre-defined up-action threshold $TP_{up}$. Similarly, these cells also have a generally high confidence to perform an up-action to increase their configuration parameters. Zone 2930 is a no-action zone, where cells in this zone do not adjust their configuration parameters, since neither their down-action probabilities nor up-action probabilities are greater than the pre-defined thresholds. Cells in zone 2930 may have low confidence to determine an action for adjusting their parameters. Zone 2940 is a good zone, which indicates cells in this zone do not need to adjust their configuration parameters. This may be the case when cells in the zone 2940 are not responsible for any bad MRs, or when the cells have very small up-blame and down-blame values, even if their down-action probabilities or up-action probabilities exceed the corresponding pre-defined threshold. Cells on line 2912 are those having a down-action probability equal to the pre-defined down-action threshold $TP_{down}$. Cells on the line 2916 have an up-action probability equal to the pre-defined up-action threshold $TP_{up}$. Cells on line 2912 and line 2916 may or may not adjust their configuration parameters. Cells on line 2914 are those that have equal total blame values, which is the sum of the up-blame values and the down-blame values assigned to each of the cells in this example.

FIG. 30 illustrates a flowchart of another embodiment method 3000 for adjusting cell configuration parameters in a wireless network having multiple cells based on blames. Generally, the method 3000 receives a plurality of MRs for the cells, identifies bad MRs for each of the cells using a set of pre-defined performance criteria of the wireless network, and assigns blames to responsible cells for each of the bad MRs based on analysis of the corresponding bad MRs and other information, such as cell topology, antenna parameters, etc. In this example, two blame categories, namely, down-blame and up-blame are used for assigning blames. The two blame categories are used only for illustrative purpose and should not be interpreted as limiting the scope of the claims. The method 3000 starts with step 3002, where the method 3000 receives MRs of the wireless network during a data collection period given a fixed configuration of the cells. A UE may transmits a MR to its serving cell periodically (e.g., whenever pilots are received), when and as configured for pilot measurement reporting, or whenever requested. In one embodiment, the method 3000 also collects other information, such as MDT data and topology information of each cell, which may be useful for assigning blames to the cells.

At step 3004, for each MR of a cell, the method 3000 determines whether the MR satisfies a cell coverage criteria, e.g., whether a RSRP, or any other measure for reference signal strength, included in the MR is greater than or equals a first threshold T1. If the RSRP is greater than or equals the first threshold T1, then the method 3000 continues to determine whether the MR satisfies a cell quality criteria at step 3006, e.g., whether a RSRQ, or any other measure for reference signal quality, included in the MR is greater than or equals a second threshold T2. If the MR also satisfies the quality criteria, i.e., the RSRQ is greater than or equals the second threshold T2, the MR is marked as a good MR at step 3008 and no blame will be assigned to any cell for this good MR. The method then goes back to step 3004 to determine whether a next MR of the cell is good or bad. The method may record the number of good MRs for each cell, which may be used to estimate performance of the wireless network.

If the MR does not satisfy the cell coverage criteria at step 3004, or if the MR satisfies the cell coverage criteria at step 3004 but fails to satisfy the cell quality criteria at the step 3006, the MR is marked bad at step 3010. At step 3012, the method 3000 classifies the bad MR into one of multiple MR categories, and assigns blames for the bad MR to responsible cells. Bad MRs are classified into different categories so that responsible cells may be identified and appropriate blame values may be assigned. In one embodiment, a bad MR is classified into four categories: weak coverage with non-co-site neighbor, weak coverage without non-co-site neighbor, poor quality with non-co-site neighbor, and poor quality without non-co-site neighbor. The weak coverage indicates that the MR fails the cell coverage criteria, and the poor quality indicates that the MR fails the cell quality criteria.

A non-co-site neighbor of a cell is a neighbor of the cell which does not share the same base station with the cell. When a bad MR of a cell includes RSRP information of its neighbors, i.e., the cell has non-co-site neighbors, interference or overshooting of its neighbors may be considered when assigning blames for this bad MR. Each MR category may be further classified into different sub-categories, so that blames may be assigned appropriately to responsible cells. For example, the weak coverage without non-co-site neighbor is classified into sub-categories of weak interior and insufficient coverage. Domain expertise, knowledge and experience may be used to define different MR categories and sub-categories. A person of ordinary skill in the art would recognize many variations, alternatives and modifications for categorizing bad MRs for blame assignment.

Figure 31:
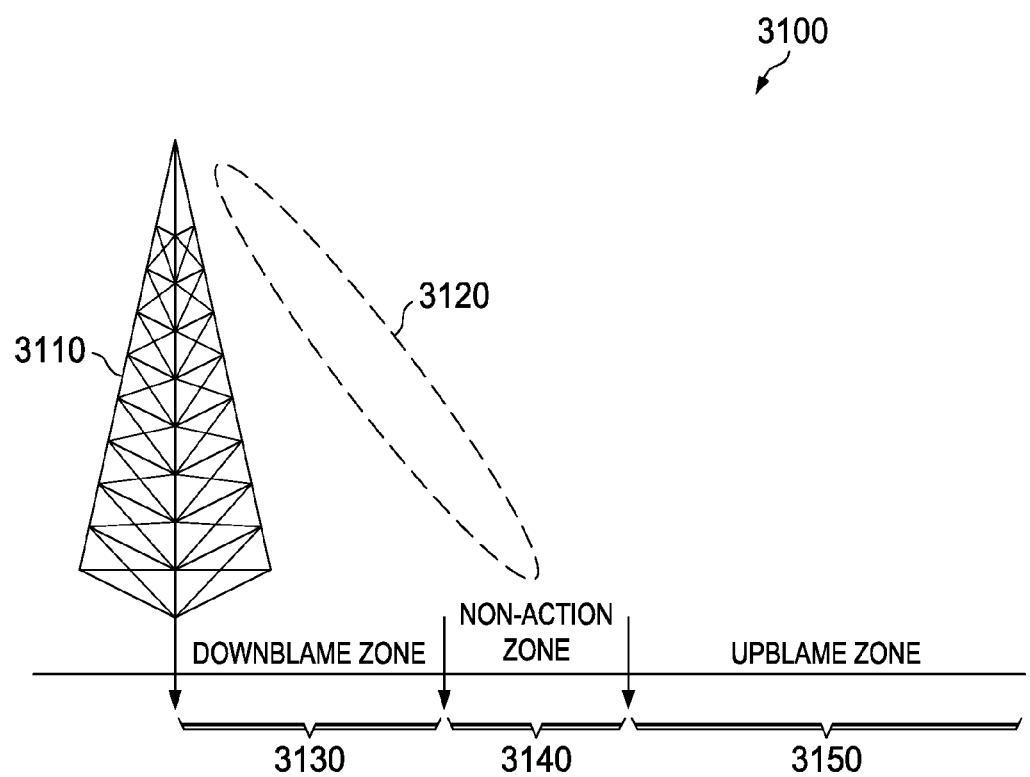
FIG. 31 illustrates a diagram of an embodiment antenna radiation coverage zone.

Blames for a bad MR may be assigned to responsible cells based on information included in the MR, such as the RSRP list, RSRQ, timing advance which may indicate distance of the UE reporting a bad MR to the cell (referred to as distance of the bad MR), topology information of the cell, information about the cell antenna, such as the main lobe radius and planned radius, and other information. FIG. 31 illustrates a diagram of an embodiment antenna radiation coverage zone 3100 of a cell. As shown, an antenna 3110 of the cell has a main lobe or main beam 3120 for communications.

In an example when a bad MR is in a category of weak coverage with non-co-site neighbor, if the timing advance of the bad MR indicates that the distance of the bad MR falls in the downblame zone 3130, e.g., when the distance is less than a pre-defined down-blame distance threshold, a down-blame with a blame value "1" may be assigned to the cell. This is because the cell needs to decrease its antenna tilt in order to provide sufficient coverage to the bad MR (i.e., the UE reporting the bad MR) which is closer to the antenna 3110 of the cell. If the timing advance of the bad MR indicates that the distance of the bad MR falls in the upblame zone 3150, an up-blame with a blame value "1" may be assigned to the cell, indicating an increased antenna tilt of the cell is desired for providing coverage to a MR far away from the antenna 3110. If the distance of the bad MR falls in the non-action zone 3140, the blame is not assigned. In this case, the blame for the bad MR is unknown, since it is not clear what causes the bad MR.

In some embodiments, for various reasons, a blame corresponding to a bad MR of a cell is left un-assigned due to uncertainty or unknown root causes. In one embodiment, this un-assigned blame is accounted for in the total blame of the cell (so that the total blame value of the cell is conserved, and the total blame value of the wireless network is conserved). In another embodiment, the un-assigned blames of a cell are divided as additional up-blames and down-blames according to a ratio of the up-blames and down-blames to the total assigned blame value of the cell, and are allocated to the final sub-total up-blame value and the final sub-total down-blame value of the cell. For example, a cell has n1 un-assigned blames (i.e., the un-assigned blame values are n1), a sub-total up-blame value x1 and a sub-total down-blame value y1. The total blame value of the cell is (n1+x1+y1), and the total assigned blame value of the cell is (x1+y1). The final sub-total up-blame value may be calculated by: x1+[x1/(x1+y1)]*n1, and the final sub-total down-blame value is equal to (total blame value of the cell−final sub-total up-blame value), which is: (n1+x1+y1)−{x1+[x1/(x1+y1)]*n1}. This ensures that the up-action probability and the down-action probability of each cell remains the same regardless of whether the un-assigned blames are re-assigned or not.

Referring back to FIG. 30, after blames of a bad MR in the cell are assigned to responsible cells, the method 3000 will check whether all bad MRs of the cells in the wireless network are identified at step 3014. If not, the method 3000 goes back to step 3004 to identify the next bad MR of the cell, or a next bad MR of a next cell if all bad MRs of the cell are identified and have blames assigned. The steps of 3004-3014 are repeated for each MR received in each of the cells in the wireless network. When all bad MRs received in the wireless network during the data collection period are identified and corresponding blames are assigned, the method 3000 proceeds to step 3016, where the method 3000 calculates a sub-total up-blame value and a sub-total down-blame value for each of the cells. Calculation of the sub-total up-blame value and the sub-total down-blame value may take into account of the un-assigned blames of each corresponding cell. At step 3018, the method 3000 calculates an up-action probability and a down-action probability for each of the cells, based on which an action may be assigned to the cells for adjusting configuration parameters of the cells.

Aspects of this disclosure may provide advantages over conventional automatic cell planner (ACP) solutions, which typically require minimization of drive test (MDT) data with UE geo-location (AGPS) and accurate antenna configuration parameters to achieve accurate propagation modeling. Notably, systems for providing UE geo-location information and accurate antenna configuration parameters may be costly and require human verification. Accordingly, embodiment techniques provide cost savings by reconfiguring RF parameters without relying on UE geo-location and/or antenna configuration feedback information.

Aspects of this disclosure may maximize CCO objective functions under constrained inputs. In some embodiments, techniques may utilize continuous closed loop measurement report (MR) feedback from a network. Drive tests (DT) and MDT data may also be used. Embodiment techniques may adjust RF configuration parameters without access to UE geo-location (AGPS), and without access to accurate antenna configuration parameters. Hence, embodiment techniques may offer similar accuracy to ACP CCO, but at a much lower cost.

Aspects of this disclosure provide a SON CCO algorithm. Embodiment algorithms may calculate cell level features or blame metrics from MRs. Embodiment Algorithms may label coverage/quality/interference/overshoot statuses that provide mappings for "intuitively correct" adjustment decisions based on domain knowledge applied simultaneously on multiple cells. This may allow the algorithm to substantially increase performance in a relatively short time frame. Embodiment algorithms may characterize a cell's coverage status as good, weak, weak edge only, weak interior/insufficient only, weak edge and interior/insufficient. Embodiment algorithms may characterize a cell's interference status as multiple interferer, single interferer, or non-interferer.

Aspects of this disclosure may provide a first phase of analytics assisted SON algorithms for CCO to achieve machine learned cell labels in addition to engineering knowledge guidelines for iterative action steps. This phase may be based at least partially on cell level features abstracted from MR data, labels or metrics of blame (e.g., multi-interferer, single/medium interferer, over-shooter, etc.), which may be gleaned using unsupervised or semi-supervised learning methods. Aspects of this disclosure may provide a feedback loop for UE MRs that sample the network state.

A clustering, machine learning algorithm that processes real-time local data and historical global data that represents key cell features as points in a multi-dimensional space, and which groups similar points together. Aspects of this disclosure may provide cell bottleneck labeling or blame metric assignment. A Cell (a point) is given a label based on cluster membership, e.g., non-interferer vs. multiple interferer, non-over-shooter vs. over-shooter. Alternatively, numerical blame metric and related blame action metric may be assigned.

Aspects of this disclosure may provide action rules that govern small step changes to cell parameters (power/tilt) in the "correct" direction. In white-box phase, engineering knowledge guides small step action based on machine learned cell labels or blame action metrics. Actions are designed to increase the score with high probability initially.

Aspects of this disclosure may provide an AA SON Approach that uses automatic software programming: to learn (online) the environment via real-time feedback (of UE MRs and cell KPIs) and analytics; to abstract the UE MR level information to cell level labels and metrics mapping to domain expertise guided incremental actions for optimizing configuration. Aspects of this disclosure provide a generalizable framework that is extendable to a variety of use cases, e.g., load balancing. Embodiment algorithms may provide significant improvement in 10-20 iterations. Labeling and blame metrics show good correlation with actual interferers, over-shooters, coverage/quality challenged cells etc.

Embodiment algorithms may calculates cell level features or blame metrics from MRs, as well as label cells based on their coverage/quality/interference/overshoot status.

Aspects of this disclosure provide an embodiment algorithm (version 2). The embodiment algorithm may be configured to record all positive NormBAM(j) metrics gathered from multiple scenarios in a global database and cluster them (1-D) into different levels, e.g., three levels. The embodiment algorithm may also be configured to map positive clusters to actions: The lowest magnitude clusters may be mapped to no action; the middle clusters may be mapped to a single parameter action (e.g., antenna down-tilt) by one step, and the highest clusters may be mapped to multiple or joint parameters (e.g., down-tilt and transmit power reduction) by one step each. The embodiment algorithm may also cluster negatives in a global database. Specifically, the embodiment algorithm may record all negative NormBAM(j) metrics in the global database and cluster them into multiple levels, e.g., three levels.

The embodiment algorithm may also map negative clusters to actions. For example, lowest magnitude clusters may be mapped to no action; middle clusters may be mapped to a single parameter (e.g., antenna up-tilt); and high clusters may be mapped to joint parameters (e.g., antenna up, power-up). The embodiment algorithm may also filter actions based on a current state. For example, the final action may be an adjustment of the action based on the above cluster mapping, and may depend on the coarse current estimated state (configuration). If a single parameter action is suggested (down-tilt or power-down), and current total tilt is estimated to be already high then the action may adjust the power. If current power is also already low, then no actions may be taken.

The embodiment algorithm may divide problems UEs/MRs into the following mutually exclusive categories:

Category 0 UEs/MRs have a weak coverage problem (best serving RSRP<−105 dBm). Category 0 UEs/MRs may be further divided into category 0.1 UEs/MRs that have weak edge coverage; and Category 0.2 UEs/MRs are those that are not in Category 0.1. Category 0.1 UEs may be defined as the second best RSRP>=best serving RSRP−6 dB. One unit of blame for UE u in category 0.1 is assigned to its own best serving cell i (self blame). The sign is positive because weak edge coverage is mitigated by up-tilt and thus have weak interior/insufficient coverage. One unit of blame may be assigned for each UE in category 0.2 based on its own best serving cell (e.g., self-blame). Typically weak interior versus insufficient coverage results in opposite actions (down-tilt vs. up-tilt). If COD triggers COC on a cell, then weak insufficient coverage can result with a positive sign for blame with action of up-tilt/up-power for mitigation.

Category 1 UEs/MRs are those not in Category 0 that have the problem of poor quality (e.g., SINR<3 dB) due to a combination of serving cell weakness and other cell interference and is further divided into sub-categories: Initially, self blame S(RSRP(i)) is assigned to serving cell i depending on its strength using a sigmoidal function to compute the blame: S(x) is S(x)→1 as x→−105 dBm from above and S(x)=1 for x<=−105 dBm and similarly, S(x)→0 as x→−95 dBm from below and S(x)=0 for x>=−95 dBm; also at the mid-point: S(−100)=½. The remaining (other) blame 1−S(RSRP(i)) is divided among interfering cells, if any, based on the following categories: Category 1.1 UEs/MRs are those not in category 0 reporting the second best RSRP>=best serving RSRP−3 dB. For a UE u best served by cell i, let $C_{1.1}(u)$ be the set of all other cells such that their RSRP>=RSRP(i)−3 dB. Then the remaining (other) blame for u's poor quality=(1−S(RSRP(i))/|$C_{1.1}(u)$| is equally divided between these other cells. Thus if there is only one such cell, it is assigned the remaining blame regarding u. The rationale here is that even a single cell at more than half the power of the best server will likely cause the SINR to drop below 3 dB.

Category 1.2 UEs/MRs are those not in categories 0 or 1.1 reporting the second best RSRP>=best serving RSRP−6 dB. For a UE u best served by cell i, let $C_{1.2}(u)$ be the set of all other cells such that their RSRP>=RSRP(i)−6 dB. Then the remaining (other) blame for UE's poor quality=min(1/2,1/|$C_{1.2}(u)$|)*(1−S(RSRP(i)) is equally divided between these other cells. Thus if there are two or more such other cells, they are assigned to share the remaining (other) blame regarding u equally. The rationale here is that just two cells at more than quarter the power each of the best server will cause the SINR to drop below 3 dB. Note that if there is only one such other cell then its assignment is capped at half the remaining blame—the unaccounted blame is left unassigned as an approximation.

Category 1.3 UEs/MRs are those not in categories 0 or 1.1 or 1.2 reporting the second best RSRP>=best serving RSRP−9 dB. For a UE u best served by cell i, let $C_{1.3}(u)$ be the set of all other cells such that their RSRP>=RSRP(i)−9 dB. Then the remaining (other) blame for UE's poor quality=min(1/4,1/|$C_{1.3}(u)$|))*(1−S(RSRP(i)) is equally divided between these other cells. Thus if there are four or more such other cells, they are assigned to share the remaining (other) blame regarding u equally. The rationale here is that four cells at more than an eighth power each of the best server will cause the SINR to drop below 3 dB. Note that if there is only one, two or three such other cells then their assignment is capped at a quarter of the remaining blame—the unaccounted blame is left unassigned as an approximation. Category 2 UEs/MRs are those not in Category 0 or 1 that have the problem of poor quality (SINR<3 dB).

Category 2 UEs/MRs are those not in categories 0 or 1. Self blame S (RSRP(i)) is assigned to a serving cell in a similar manner to category 1 UEs. Such UEs do not have a clearly responsible interferer to assign remaining (other) blame and so the unaccounted blame is left unassigned as an approximation. Such instances are hopefully low—yet our algorithm will monitor the numbers of such UEs and their accumulated unassigned blame at cell and system level.

Figures 32, 33:
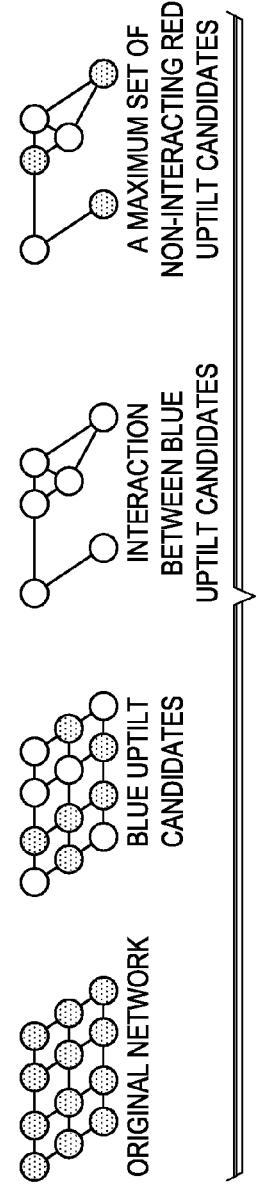
FIG. 32 illustrates a table of an embodiment blame counter matrix.
FIG. 33 illustrates a diagram of a graph problem & solution visualization.

Embodiment algorithms may assign a blame counter matrix to cells. FIG. 32 illustrates an embodiment blame counter matrix. The rules for assigning blame metrics to cells are as follows:

Every best serving cell i has a set of served UEs/MRs $S_i$; $S_i=S_{i,good}$ U $S_{i,problem}$ (disjoint union); $S_{i,problem}=S_{i,0.1}$ U $S_{i,0.2}$ U $S_{i,1.1}$ U $S_{i,1.2}$ U $S_{i,1.3}$ U $S_{i,2}$(disjoint union);

Each of the UEs/MRs u belonging to a problem sub-category is associated with a group of cells in the system that are assigned blame;

For category 0 UEs, the serving cell takes all the blame and for category 1 UEs, some other cells also share part of the blame;

For a fixed serving cell i and every cell j in the system, every served UE/MR of i with a problem distributes the blame (one unit maximum) for its problem across several or all js (including i);

For a given pair of cells i and j, accumulate the individual blame accorded to j over all UEs/MRs served by i and record in the B(i,j) entry of the blame matrix; B(i,i) along the diagonal is the self blame.

Category 0 and 2.1 UEs contribute to only self blame whereas Category 1 UEs contribute to other blame as well;

For any given i (fixing a row), summation over j of B(i,j) is the row-sum that is roughly equal to the number of problem UEs served by i (could be less because some blame may be unassigned) related to cell level O.F; and The sum of all row-sums is roughly equal to the total number of problem UEs in the system' For any given j (fixing a column), summation over i of B(i,j) is the column-sum that is roughly equal to the number of problem UEs caused by j. This is the Blame Metric of cell j, BM(j).

Instead of using the blame metric directly for action, some embodiment algorithms may use the blame action metric to exploit the fact that for self-blame, the action is typically opposite (up-tilt/power-up) to that of the action to mitigate other-blame (down-tilt/power-down). Reflecting this opposite action, the Blame Action Metric of cell j is (for example) defined as: BAM(j)=$\Sigma_{i<>j}$ B(i,j)−B(j,j) (same cell blame is negative weighted); BAM(j)=$\Sigma_{<>j,\ eNB(i)<>eNB(j)}$ B(i,j)−B(j,j) (other cells of the same eNB are zero weighted); Normalize BAM(j) by the total number of UEs in the cluster formed by j and all its neighbors (can use neighbor list or infer it based on significant BM(i,j) values: NormBAM(j)=BAM(j)/Number of UEs in j and all of its RF neighbors. If NormBAM(j) is small in magnitude, there may be no action on cell j. It is possible to normalize BM(j) to yield NormBM(j). NormBM(j) provides some information about the cell. For instance, if a cell j has high NormBM(j) but low NormBAM (j) then that cell is in a very "tricky" or "ambiguous" action situation where its numerous problem UEs are requiring conflicting actions that essentially cancel out. If a cell has both of them high, then that cell is a problem cell but with a clear action for resolution. If a cell has both of them low, then that cell is not a problem cell.

Aspects of this disclosure may use an action rule for mapping a NormBAM metric to actions. Clustering of Positives in Global Database: All positive NormBAM(j) metrics gathered from multiple scenarios may be recorded in a global database and clustered into multiple levels, e.g., three levels. Mapping Positive Clusters to Actions: The lowest magnitude clusters map to no action; the middle cluster maps to single parameter action (e.g., antenna down-tilt) by one step and the highest cluster maps to joint parameter (e.g., down-tilt and power-down) action by one step each. Clustering of Negatives in Global Database:

Negative NormBAM(j) metrics may be clustered in the global database and cluster them into multiple levels, e.g., three levels. Mapping Negative Clusters to Actions: Lowest magnitude cluster implies no action; middle one to single parameter action (Antenna up-tilt preferred) by one step and highest cluster maps to joint parameter (up) action by a step each. Filtering Actions Based on Current State: The final action is an adjustment of the action based on the above cluster mapping that depends on the coarse current estimated state (configuration) For example, if single parameter action is suggested (down-tilt or power-down), and current total tilt is estimated to be already high then power-down is done. If current power is also already low, then no action is taken.

Aspects of this disclosure may use semi-supervised learning (EM) to augment clustering for improved thresholding of the NormBAM metric, e.g., NormBAMs of good performing cells (low interferer, high quality, good coverage) taken from optimized configurations can provide labeled training examples in the "no action" range of points. The "dead zone" range of "no action" configuration states can be narrowed to be next to nothing (to essentially allow tilt and power actions to be unconstrained except for max and min allowed e-tilts and powers). In other words, if e-tilt range allowed by the vendor is [0, 12] degrees, then we may prescribe the small range of tilt as (−inf, 0], the moderate range as (0, 12) and the high range as [12, inf).

Embodiment algorithms may provide ways to deal with overshooting cells. They may be discovered by a similar learning procedure of the algorithm (version 1). The first way is to incorporate overshooting into the blame metric. More specifically, after assigning blame in category 0.x, we consider a new category 0.3 in which falls those UEs/MRs that are served by cell i but should not be (since i is an overshooter or overloaded). Thus when the serving cell (of a UE/MR at "large" distance) is itself the overshooter, we decrement B(i,i) by 1 keeping in mind that B(i,i) positively influences up-tilt/power-up (or increment B(j,i) by 1 where j is the strongest local cell). If an overshoot UE/MR (overlap at "large" distance) falls in category 1.x, we can continue the blame sharing as before or punitively assign all "remaining" or full blame to the overshooting cell (i.e., increment B(i,j) by 1−S(RSRP(i)) or 1 for each UE/MR served by cell i that is overlapped by overshooting cell j). We also optionally add a category 3.1 of blame assignment for overshoot UEs/MRs not falling under categories 0 or 1 (by adding/subtracting a new unit of blame to other/self over-shooters), i.e., even if that UE/MR reports no coverage/quality issues. The second way is to provide a separate Label for overshooter: If cell j is deemed overshooter and Action prescribed for cell j based on BAM(j) is down-tilt/power-down, then do nothing further. If Action prescribed for cell j based on BAM(j) is do nothing, then modify to single parameter down-tilt/power-down. If Action prescribed for cell j based on BAM(j) is up-tilt/power-up then cancel it to no action.

Embodiment algorithms may provide actions for configuring cells having excessive up-tilt and power-up parameters. The up-tilt/power-up action arises from a need to improve a cell's own coverage or quality. A consequence of this is the interference increase in UE/MRs served by neighboring cells and/or overshoot problems. Such action is selected to correct any imbalance between selfishness (for improving current served UEs' problems) and cooperation (for improving current interfered UEs of other cells). However, such action does not account for the consequent increase in number of interfered UEs in other cells. Several cells in the same area (neighbors of each other or have common neighbors) being up-tilted/powered-up at the same time may lend a multiplier effect to such increase in interfered UEs and worsen quality. This can create instability in system performance when successive similar actions run away (due to competition between neighbors) or successive opposite actions on a cell engender oscillations with no meaningful improvement.

Embodiment algorithms may address this issue by implementing the following steps. Construct an interaction graph GU of up-tilt/power-up candidate cell nodes with edges between them if they are neighbors or have significantly interacting common neighbors. Use the B(i,j) matrix (e.g., blame metric) as a guideline for figuring out "significant" interacting neighbors. In other words, the adjacency matrix AU(i,j) for graph GU is a function of B(i,j), B(i, neighbor of j) and B(neighbor of i, j). Note that GU is not the original network graph NG. GU has a subset of nodes of NG but with a superset of edges given a node. The complementary graph GU' replaces edges with non-edges and non-edges with edges. The problem is then to find the Maximum Clique of GU' (largest complete sub-graph or largest set of mutually inter-connected nodes). Maximum Clique is known to be an NP Hard Problem. Use a suitable heuristic for maximal clique (with high degree vertices for a sub-optimal solution: R implementations for max clique; GU"=approximate Max Clique of GU' is a limited set of cells that can be used for Up-tilt/power-up Actions with reduced worry of unstable interaction that could increase interference Embodiment algorithms may mitigate instability by picking separated cells for Down-tilt/Power-Down. Specifically, a problem may exist for those cells in the system identified for down-tilt/power-down, as identifying the largest subset of them such that they are not direct neighbors may cause down-tilting to open up edge holes.

Embodiment algorithms may address this issue by implementing the following steps. Construct an interaction graph GD of down-tilt/power-down candidate cell nodes with edges between them if they are neighbors. Use the B(i,j) matrix, i.e., blame metric as a guideline for figuring out neighbors. In other words, the adjacency matrix AD(i,j) for graph GD is a function of B(i,j). Note that GD is not the original network graph NG. GD has a subset of nodes of NG with same edges given a node. The complementary graph GD' replaces edges with non-edges and non-edges with edges The problem is then to find the Maximum Clique of GD' (largest complete sub-graph or largest set of mutually inter-connected nodes). Maximum Clique is known to be an NP Hard Problem. Use a good heuristic for maximal clique (with high degree vertices) for sub-optimal solution: R implementations for max clique: GD"=approximate Max Clique of GD' is a limited set of cells that can be used for down-tilt/power-down Actions with reduced worry of unstable interaction that could cause coverage/quality holes. FIG. 33 illustrates a diagram of a Graph Problem & Solution Visualization.

Figure 34:
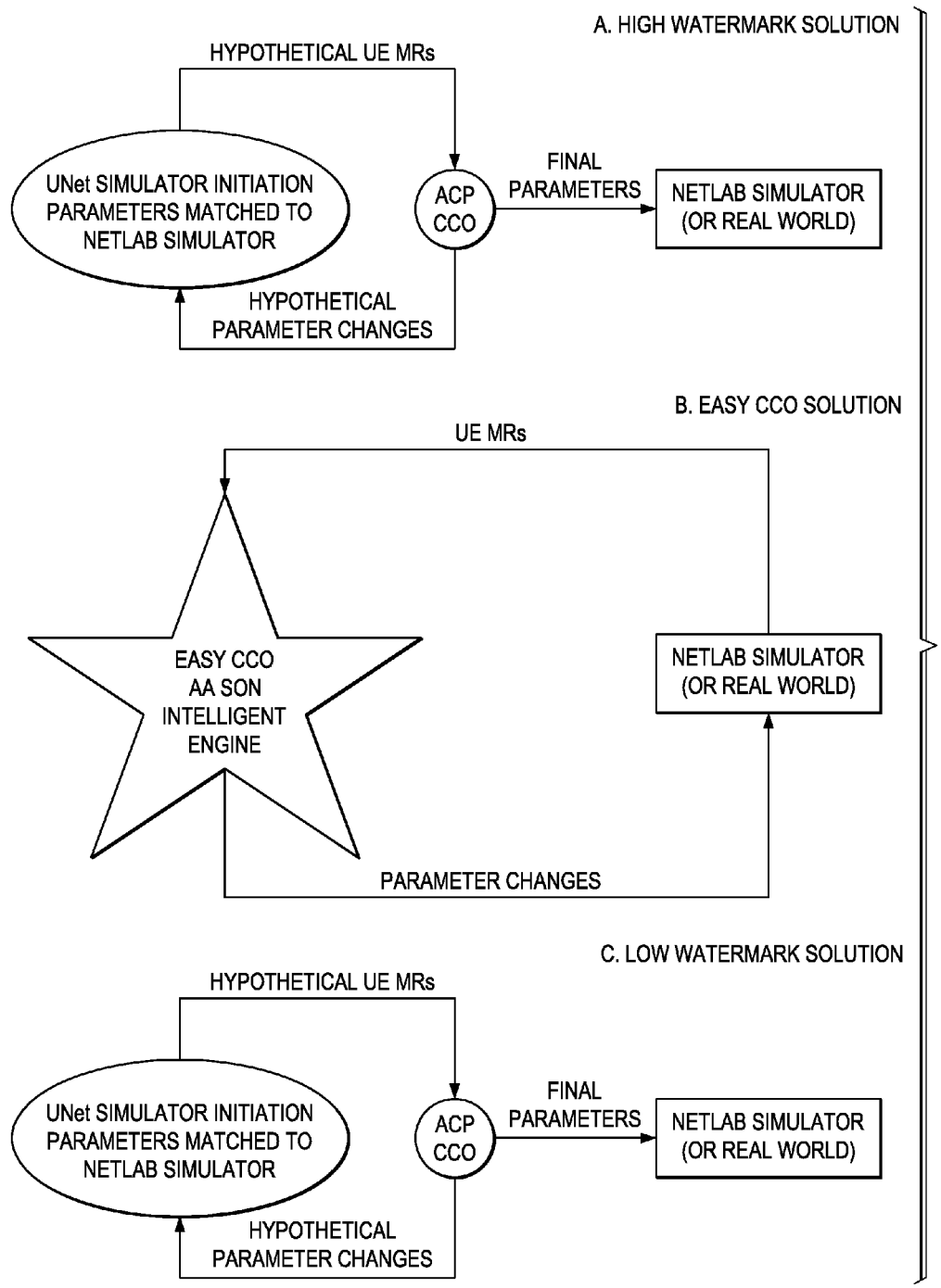
FIG. 34 illustrates a flowchart of an embodiment method for operating a CCO interface.

Embodiment algorithms may learn from mistakes through maximizing gain in NormBM(j) and resultant M-out-of-N cell tuning. Usually NormBM(j) is a good indicator of cells that are root causes of problem UEs. Action Cells may have High NormBM(j). Actions on Cells are chosen with the expectation that their NormBM(j) is reduced (step-by-step). NormBM(j) reduction is tied to System Objective Function Improvement. However, actions taken on chosen cells are not guaranteed to reduce their NormBM(j) due to unknown hidden variables. In practice, NormBM(j) may not drop consistently or may even grow (due to interactions and hidden variable impacts). The algorithm may learn which cells j under which configurations under which current NormBM(j) and NormBAM(j) (action) values produce the largest reduction (Gain) in NormBM(j) on average. Initially target precisely such cells for WB action (M-out-of-N for Whitebox). Cells that produce extreme/sustained negative gain may be removed from Whitebox list first for no action and then passed on to Blackbox for Oppositional, Exploitative and Explorative Action. FIG. 34 illustrates a flowchart of a method for operating a CCO interface. Additional details regarding aspects of this disclosure are provided in the Appendix filed herewith.

Figure 35:
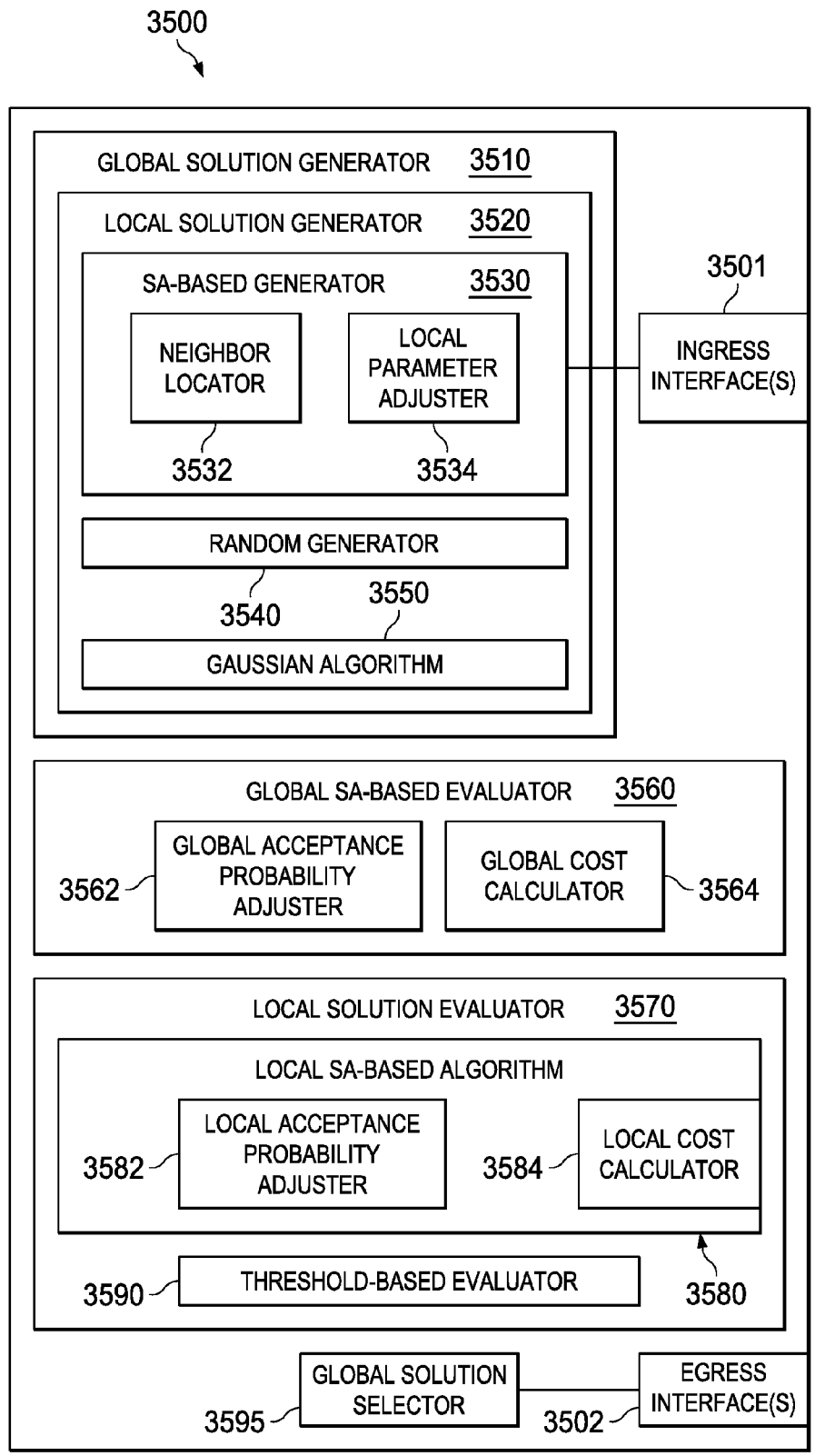
FIG. 35 illustrates a diagram of an embodiment controller adapted to adjust wireless configuration parameters in a wireless network.

FIG. 35 illustrates a block diagram of an embodiment controller 3500 adapted to iteratively generate and evaluate global solutions. As shown, the embodiment controller 3500 includes one or more ingress interfaces 3501, one or more egress interfaces 3502, a global solution generator 3510, an SA-based global solution evaluator 3560, a local solution evaluator 3570, and a global solution selector 3595. The one or more ingress interfaces 3501 may be configured to receive information (e.g., measurement reports, etc.) from devices (e.g., APs) in a wireless network, and the one or more egress interfaces 3502 may be configured to send local solutions to devices (e.g., APs) in the wireless network. The global solution generator 3510 may include hardware and/or software adapted to generate global solutions based at least in part on information received over the one or more ingress interfaces 3501.

In this example, the global solution generator 3510 includes a local solution generator 3520. The local solution generator 3520 may include hardware and/or software adapted to generate local solutions based at least in part on information received over the one or more ingress interfaces 3501. The local solution generator 3520 may be capable of generating local solutions in a variety of different ways. For example, the local solution generator 3520 may use an SA-based generator 3520 to generate local solutions in accordance with an SA-based algorithm. In such an example, the local solution generator 3520 may use a local parameter adjustment unit 3534 to set and/or adjust a step size and/or step direction for one or more wireless configuration parameters in a local solution. The local solution generator 3520 may then use a neighbor locator to generate a new local solution based on a current local solution and the step size/directions set by the local parameter adjustment unit 3534. As another example, the local solution generator 3520 may use a random generator 3540 to randomly select wireless configuration parameters of a new local solution. As another example, the local solution generator 3520 may generate a new local solution based on Gaussian algorithm 3550.

The SA-based global solution evaluator 3560 may include hardware and/or software adapted to evaluate global solutions generated by the global solution generator 3510 in accordance with a SA-based algorithm. In this example, the SA-based global solution evaluator 3560 includes a global acceptance probability adjuster 3562 adapted to set and/or adjust a global acceptance probability of the SA-based algorithm and a global cost calculator 3564 adapted to calculate a global cost based on an objective function.

The local solution evaluator 3570 may include hardware and/or software adapted to evaluate local solutions. In some embodiments, the local solution evaluator 3570 may evaluate local solutions based on an SA-based algorithm 3580. In such embodiments, the local solution is evaluated based on a function of a cost computed by the local cost calculator 3584 and an acceptance probability set by the local acceptance adjuster 3582. In other embodiments, the local solution evaluator 3570 may evaluate local solutions based on a cost threshold using the threshold based evaluator 3590.

The global solution selector 3595 may include hardware and/or software adapted to select one of the global solutions that was evaluated during a sequence of iterations. As mentioned above, components of the embodiment controller 3500 may be hardware, software, or a combination thereof. Each component may be referred to as a unit or module. In one embodiment, one or more components of the embodiment controller 3500 are integrated circuits, such as field programmable gate arrays (FPGAs) or application-specific integrated circuits (ASICs).

Figure 36:
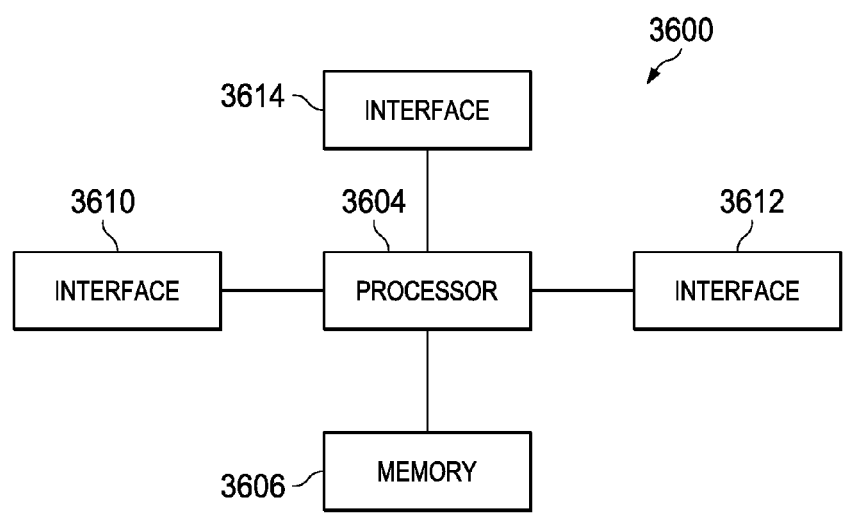
FIG. 36 illustrates a diagram of an embodiment processing system.

FIG. 36 illustrates a block diagram of an embodiment processing system 3600 for performing methods described herein, which may be installed in a host device. As shown, the processing system 3600 includes a processor 3604, a memory 3606, and interfaces 3610-3614, which may (or may not) be arranged as shown in FIG. 36. The processor 3604 may be any component or collection of components adapted to perform computations and/or other processing related tasks, and the memory 3606 may be any component or collection of components adapted to store programming and/or instructions for execution by the processor 3604. In an embodiment, the memory 3606 includes a non-transitory computer readable medium. The interfaces 3610, 3612, 3614 may be any component or collection of components that allow the processing system 3600 to communicate with other devices/components and/or a user. For example, one or more of the interfaces 3610, 3612, 3614 may be adapted to communicate data, control, or management messages from the processor 3604 to applications installed on the host device and/or a remote device. As another example, one or more of the interfaces 3610, 3612, 3614 may be adapted to allow a user or user device (e.g., personal computer (PC), etc.) to interact/communicate with the processing system 3600. The processing system 3600 may include additional components not depicted in FIG. 36, such as long term storage (e.g., non-volatile memory, etc.).

In some embodiments, the processing system 3600 is included in a network device that is accessing, or part otherwise of, a telecommunications network. In one example, the processing system 3600 is in a network-side device in a wireless or wireline telecommunications network, such as a base station, a relay station, a scheduler, a controller, a gateway, a router, an applications server, or any other device in the telecommunications network. In other embodiments, the processing system 3600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 37:
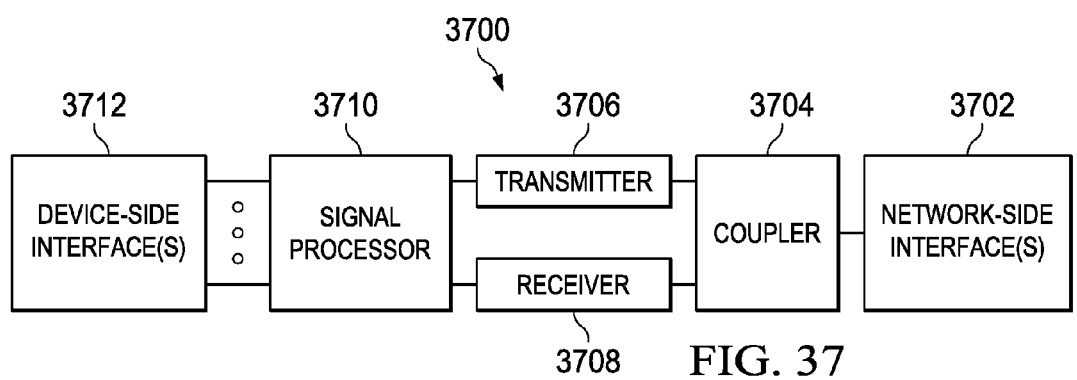
FIG. 37 illustrates a diagram of an embodiment transceiver.

In some embodiments, one or more of the interfaces 3610, 3612, 3614 connects the processing system 3600 to a transceiver adapted to transmit and receive signaling over the telecommunications network. FIG. 37 illustrates a block diagram of a transceiver 3700 adapted to transmit and receive signaling over a telecommunications network. The transceiver 3700 may be installed in a host device. As shown, the transceiver 3700 comprises a network-side interface 3702, a coupler 3704, a transmitter 3706, a receiver 3708, a signal processor 3710, and a device-side interface 3712. The network-side interface 3702 may include any component or collection of components adapted to transmit or receive signaling over a wireless or wireline telecommunications network. The coupler 3704 may include any component or collection of components adapted to facilitate bi-directional communication over the network-side interface 3702. The transmitter 3706 may include any component or collection of components (e.g., up-converter, power amplifier, etc.) adapted to convert a baseband signal into a modulated carrier signal suitable for transmission over the network-side interface 3702. The receiver 3708 may include any component or collection of components (e.g., down-converter, low noise amplifier, etc.) adapted to convert a carrier signal received over the network-side interface 3702 into a baseband signal. The signal processor 3710 may include any component or collection of components adapted to convert a baseband signal into a data signal suitable for communication over the device-side interface(s) 3712, or vice-versa. The device-side interface(s) 3712 may include any component or collection of components adapted to communicate data-signals between the signal processor 3710 and components within the host device (e.g., the processing system 3600, local area network (LAN) ports, etc.).

The transceiver 3700 may transmit and receive signaling over any type of communications medium. In some embodiments, the transceiver 3700 transmits and receives signaling over a wireless medium. For example, the transceiver 3700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 3702 comprises one or more antenna/radiating elements. For example, the network-side interface 3702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 3700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The following references are related to subject matter of the present application. Each of these references is incorporated herein by reference in its entirety:

2008 International Symposium on Telecommunications publication entitled "A Modified Very Fast Simulated Annealing Algorithm"

Signal Processing Journal Publication entitled "Adaptive simulated annealing for optimization in signal processing applications"

Areso pamphlet entitled "The Critical Importance of Subscriber-centric Location Data for SON Use Cases"

Reverb Networks publication entitled "Antenna Based Self Optimizing Networks for Coverage and Capacity Optimization IEEE publication entitled "UMTS Optimum Cell Load Balancing for Inhomogeneous Traffic Patterns"

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adjusting communication parameters in a multi-cell wireless network, the method comprising:
   iteratively generating and evaluating global solutions for a wireless network over a sequence of iterations, each of the global solutions including multiple local solutions that specify wireless configuration parameters for local coverage areas in the wireless network, wherein each of the global solutions are evaluated using a simulated annealing based (SA-based) optimization algorithm, wherein at least some of the local solutions are evaluated separately from the corresponding global solution according to local performance criteria, and wherein iteratively generating and evaluating the global solutions comprises:
      evaluating each of the global solutions during a corresponding iteration using the SA-based optimization algorithm; and
      evaluating local solutions in corresponding global solutions that satisfy a global performance criteria;
   selecting one of the global solutions when an output condition is reached; and
   sending local solutions in the selected global solution to access points (APs) in the wireless network.

2. The method of claim 1, wherein evaluating the local solutions in the corresponding global solutions that satisfy the global performance criteria comprises:
   determining whether the local solutions satisfy a local performance criteria; and
   replacing, in the corresponding global solutions, local solutions that fail to satisfy the local performance criteria with previous local solutions.

3. The method of claim 2, wherein determining whether the local solutions satisfy a local performance criteria comprises determining whether a cost of the local solution exceeds a threshold.

4. The method of claim 2, wherein determining whether the local solutions satisfy a local performance criteria comprises determining whether a function of a cost of the local solution and a local temperature parameter of the SA-based optimization algorithm exceeds a threshold.

5. The method of claim 1, wherein iteratively generating and evaluating the global solutions further comprises:
updating a global temperature parameter of the SA-based optimization algorithm based on an evaluation of a global solution during an instant iteration; and
updating one or more local temperature parameters of the SA-based optimization algorithm based on evaluations of one or more local solutions during the instant iteration.

6. The method of claim 5, wherein the updated global temperature parameter defines a global acceptance probability used to evaluate global solutions during subsequent iterations, and
wherein the one or more updated local temperature parameters define local step sizes and directions for modifying wireless parameters of current local solutions when generating new local solutions during subsequent iterations.

7. The method of claim 5, wherein the updated global temperature parameter defines a global acceptance probability used to evaluate global solutions during subsequent iterations, and
wherein the one or more updated local temperature parameters define local acceptance probability used to evaluate local solutions during subsequent iterations.

8. The method of claim 1, wherein iteratively generating and evaluating the global solutions over the sequence of iterations further comprises:
generating a first new global solution during a first iteration by finding neighbors of current local solutions in a current global solution;
identifying one or more new local solutions in the first new global solution that fail to satisfy local performance criteria;
replacing, in the first new global solution, the one or more new local solutions with corresponding ones of the current local solutions from the current global solution, thereby obtaining a modified global solution that includes at least one new local solution and at least one current local solution; and
generating a second new global solution during a second iteration by finding neighbors of local solutions in the modified global solution.

9. The method of claim 1, wherein the SA-based optimization algorithm is a coverage and capacity optimization (CCO) algorithm, and wherein the global solutions specify antenna tilts and transmit power levels for local coverage areas in the wireless network.

10. The method of claim 1, wherein the SA-based optimization algorithm is an inter-cell interference coordination (ICIC) optimization algorithm, and wherein the global solutions specify one or more of a sub-band power factor, edge-to-center boundary, and transmit power levels for local coverage areas in the wireless network.

11. The method of claim 1, wherein the optimization algorithm is a mobility optimization algorithm, and wherein the global solutions specify handover parameters for the local coverage areas.

12. The method of claim 1, wherein the local solutions and the global solution are evaluated in the wireless network during test periods.

13. A controller comprising:
a processor; and
a non-transitory computer readable storage medium storing programming for execution by the processor, the programming including instructions to:
iteratively generate and evaluate global solutions for a wireless network over a sequence of iterations, each of the global solutions including multiple local solutions that specify wireless configuration parameters for local coverage areas in the wireless network, wherein each of the global solutions are evaluated using a simulated annealing based (SA-based) optimization algorithm, wherein at least some of the local solutions are evaluated separately from the corresponding global solution according to local performance criteria, and wherein iteratively generating and evaluating the global solutions comprises:
evaluating each of the global solutions during a corresponding iteration using the SA-based optimization algorithm; and
evaluating local solutions in corresponding global solutions that satisfy a global performance criteria;
select one of the global solutions when an output condition is reached; and
send local solutions in the selected global solution to access points (APs) in the wireless network.

14. The controller of claim 13, wherein the instructions to evaluate the local solutions in corresponding global solutions that satisfy the global performance criteria includes instructions to:
determine whether the local solutions satisfy a local performance criteria; and
replace, in the corresponding global solutions, local solutions that fail to satisfy the local performance criteria with previous local solutions.

15. The controller of claim 13, wherein the instructions to iteratively generate and evaluate the global solutions further include instructions to:
update a global temperature parameter of the SA-based optimization algorithm based on an evaluation of a global solution during an instant iteration, wherein the updated global temperature parameter defines a global acceptance probability used to evaluate global solutions during subsequent iterations; and
update one or more local temperature parameters of the SA-based optimization algorithm based on evaluations of one or more local solutions during the instant iteration, wherein the one or more updated local temperature parameters define local step sizes and directions for modifying wireless parameters of current local solutions when generating new local solutions during subsequent iterations.

16. The controller of claim 13, wherein the updated global temperature parameter defines a global acceptance probability used to evaluate global solutions during subsequent iterations, and
wherein the one or more updated local temperature parameters define local acceptance probability used to evaluate local solutions during subsequent iterations.

17. A method for iteratively modifying wireless configuration parameters in a wireless network over a sequence of intervals, the method comprising:
selecting subsets of local coverage areas in the wireless network, each of the subsets of local coverage areas corresponding to a different subset of intervals in the sequence of intervals;
iteratively generating and evaluating, during each subset of intervals, local solutions for the corresponding subset of local coverage areas using a simulated annealing based (SA-based) optimization algorithm without modifying wireless configuration parameters of local coverage areas that are excluded from the corresponding subset of local coverage areas during the corresponding subset of intervals;

selecting a set of local solutions when an output condition is reached, wherein selecting the subsets of local coverage areas in the wireless network comprises calculating costs associated with wireless transmissions in the local coverage areas prior to each subset of intervals, and selecting local coverage areas having a cost exceeding a threshold for inclusion in the corresponding subset of local coverage areas; and sending the selected set of local solutions specified by a selected global solution to access points (APs) in the wireless network.

18. The method of claim 17, wherein each subset of local coverage areas includes fewer than all local coverage areas in the wireless network.

19. An apparatus comprising:

a processor; and a non-transitory computer readable storage medium storing programming for execution by the processor, the programming including instructions to:

select subsets of local coverage areas in a wireless network, each of the subsets of local coverage areas corresponding to a different subset of intervals in a sequence of intervals;

iteratively generate and evaluate, during each subset of intervals, local solutions for the corresponding subset of local coverage areas using a simulated annealing based (SA-based) optimization algorithm without modifying wireless configuration parameters of local coverage areas that are excluded from the corresponding subset of local coverage areas during the corresponding subset of intervals;

select a set of local solutions when an output condition is reached, wherein the instructions to select the subsets of local coverage areas in the wireless network include instructions to calculate costs associated with wireless transmissions in the local coverage areas prior to each subset of intervals, and select local coverage areas having a cost exceeding a threshold for inclusion in the corresponding subset of local coverage areas; and send the selected set of local solutions specified by a selected global solution to access points (APs) in the wireless network.

20. The apparatus of claim 19, wherein each subset of local coverage areas includes fewer than all local coverage areas in the wireless network.

* * * * *